United States Patent
Jakubowski et al.

(10) Patent No.: US 8,815,971 B2
(45) Date of Patent: *Aug. 26, 2014

(54) CONTROL OVER CONTROLLED RADICAL POLYMERIZATION PROCESSES

(75) Inventors: Wojciech Jakubowski, Pittsburgh, PA (US); James Spanswick, Pittsburgh, PA (US)

(73) Assignee: ATRP Solutions, Inc., Pittsburgh, PA (US)

( * ) Notice: Subject to any disclaimer, the term of this patent is extended or adjusted under 35 U.S.C. 154(b) by 456 days.

This patent is subject to a terminal disclaimer.

(21) Appl. No.: 12/653,937

(22) Filed: Dec. 18, 2009

(65) Prior Publication Data

US 2011/0082230 A1  Apr. 7, 2011

Related U.S. Application Data

(60) Provisional application No. 61/203,387, filed on Dec. 22, 2008.

(51) Int. Cl.
| | |
|---|---|
| *C08F 20/12* | (2006.01) |
| *C08F 20/14* | (2006.01) |
| *C08F 2/38* | (2006.01) |
| *C08F 4/40* | (2006.01) |
| *C08F 220/14* | (2006.01) |
| *C08F 2/50* | (2006.01) |
| *C08F 220/18* | (2006.01) |
| *C08F 2/40* | (2006.01) |
| *C08F 4/00* | (2006.01) |

(52) U.S. Cl.
CPC ... *C08F 2/38* (2013.01); *C08F 4/40* (2013.01); *C08F 220/14* (2013.01); *C08F 2/50* (2013.01); *C08F 220/18* (2013.01); *C08F 2/40* (2013.01); *C08F 4/00* (2013.01)
USPC .......... 522/182; 522/188; 526/90; 526/219; 526/219.6; 526/236; 526/237; 526/238; 526/319; 526/346; 526/347

(58) Field of Classification Search
CPC ...... C08F 20/14; C08F 112/08; C08F 120/14; C08F 120/12
USPC ........... 526/90, 308, 236, 237, 238; 522/182, 522/188
See application file for complete search history.

(56) References Cited

U.S. PATENT DOCUMENTS

| | | | |
|---|---|---|---|
| 4,386,135 A | 5/1983 | Campbell et al. | |
| 4,409,120 A | 10/1983 | Martia | |
| 4,847,328 A | 7/1989 | Hutchins et al. | |
| 5,240,963 A | 8/1993 | Domb et al. | |
| 5,362,813 A | 11/1994 | Antonelli et al. | |
| 5,486,563 A | 1/1996 | Sutherland | |
| 5,545,342 A | 8/1996 | Beagle et al. | |
| 5,545,504 A | 8/1996 | Keoshkerian et al. | |
| 5,594,072 A | 1/1997 | Handlin, Jr. et al. | |
| 5,612,107 A | 3/1997 | Sangani et al. | |
| 5,631,015 A | 5/1997 | Bezwada et al. | |
| 5,639,831 A | 6/1997 | Himes et al. | |
| 5,653,992 A | 8/1997 | Bezwada et al. | |
| 5,728,469 A | 3/1998 | Mann et al. | |
| 5,763,548 A | 6/1998 | Matyjaszewski et al. | |
| 5,789,487 A | 8/1998 | Matyjaszewski et al. | |
| 5,807,937 A | 9/1998 | Matyjaszewski et al. | |
| 5,933,695 A | 8/1999 | Henry et al. | |
| 5,945,491 A | 8/1999 | Matyjaszewski et al. | |
| 5,994,457 A * | 11/1999 | Stanger et al. | 524/800 |
| 6,103,361 A | 8/2000 | Batzar et al. | |
| 6,111,022 A * | 8/2000 | Matyjaszewski et al. | 525/238 |
| 6,111,055 A | 8/2000 | Berger et al. | |
| 6,121,371 A | 9/2000 | Matyjaszewski et al. | |
| 6,124,411 A | 9/2000 | Matyjaszewski et al. | |
| 6,127,445 A | 10/2000 | Kutal et al. | |
| 6,162,882 A | 12/2000 | Matyjaszewski et al. | |
| 6,210,524 B1 | 4/2001 | Josephy | |
| 6,221,399 B1 | 4/2001 | Rolfes et al. | |
| 6,252,014 B1 | 6/2001 | Knauss | |
| 6,336,966 B1 | 1/2002 | Coca et al. | |
| 6,407,187 B1 | 6/2002 | Matyjaszewski et al. | |
| 6,455,623 B1 | 9/2002 | Howard | |
| 6,461,631 B1 | 10/2002 | Dunn et al. | |
| 6,465,091 B1 | 10/2002 | Ou-Yang | |
| 6,476,079 B1 | 11/2002 | Jukarainen et al. | |

(Continued)

FOREIGN PATENT DOCUMENTS

| | | |
|---|---|---|
| DE | 102005041528 | 3/2007 |
| EP | 0422805 | 4/1991 |
| EP | 1197498 | 4/2002 |
| JP | 2006-104282 | 4/2006 |
| JP | 2007-512418 | 5/2007 |
| JP | 2007-527463 | 9/2007 |
| WO | WO 2005087819 A1 * | 9/2005 |
| WO | WO 2005/113031 | 12/2005 |
| WO | WO 2005/116097 | 12/2005 |
| WO | WO 2007025310 A1 * | 3/2007 |
| WO | WO 2009/033974 | 3/2009 |
| WO | WO 2009/155303 | 12/2009 |
| WO | WO 2010/111708 | 9/2010 |

OTHER PUBLICATIONS

Matyjaszewski et al., "Atom transfer radical polymerization of styrene catalyzed by copper carboxylate complexes", 1998, Macromol. Chem. Phys., 199, pp. 2289-2292.*

(Continued)

*Primary Examiner* — Nicole M Buie-Hatcher
(74) *Attorney, Agent, or Firm* — Jones Day

(57) ABSTRACT

A procedure for improved temperature control in controlled radical polymerization processes is disclosed. The procedure is directed at controlling the concentration of the persistent radical in ATRP and NMP polymerizations procedures and the concentration of radicals in a RAFT polymerization process by feeding a reducing agent or radical precursor continuously or intermittently to the reaction medium through one of more ports.

20 Claims, 44 Drawing Sheets

(56) References Cited

U.S. PATENT DOCUMENTS

| | | |
|---|---|---|
| 6,512,060 B1 | 1/2003 | Matyjaszewski et al. |
| 6,528,080 B2 | 3/2003 | Dunn et al. |
| 6,538,091 B1 | 3/2003 | Matyjaszewski et al. |
| 6,541,580 B1 | 4/2003 | Matyjaszewski et al. |
| 6,555,237 B1 | 4/2003 | Chen et al. |
| 6,558,805 B2 | 5/2003 | Khadir et al. |
| 6,624,262 B2 | 9/2003 | Matyjaszewski et al. |
| 6,624,263 B2 | 9/2003 | Matyjaszewski et al. |
| 6,626,950 B2 | 9/2003 | Brown et al. |
| 6,627,314 B2 | 9/2003 | Matyjaszewski et al. |
| 6,685,957 B1 | 2/2004 | Bezemer et al. |
| 6,692,770 B2 | 2/2004 | Gustavsson et al. |
| 6,706,288 B2 | 3/2004 | Gustavsson et al. |
| 6,759,491 B2 | 7/2004 | Matyjaszewski et al. |
| 6,764,731 B2 | 7/2004 | Savoca et al. |
| 6,784,397 B2 | 8/2004 | Li et al. |
| 6,790,919 B2 | 9/2004 | Matyjaszewski et al. |
| 6,887,962 B2 | 5/2005 | Matyjaszewski et al. |
| 6,919,405 B2 | 7/2005 | Kinning et al. |
| 6,939,505 B2 | 9/2005 | Musso et al. |
| 7,019,082 B2 | 3/2006 | Matyjaszewski et al. |
| 7,049,373 B2 | 5/2006 | Matyjaszewski et al. |
| 7,056,455 B2 | 6/2006 | Matyjaszewski et al. |
| 7,064,166 B2 | 6/2006 | Matyjaszewski et al. |
| 7,081,486 B2 * | 7/2006 | Imai et al. .................. 522/60 |
| 7,105,175 B2 | 9/2006 | Schwarz |
| 7,105,181 B2 | 9/2006 | Gustavsson et al. |
| 7,125,938 B2 | 10/2006 | Matyjaszewski et al. |
| 7,153,821 B2 | 12/2006 | Blokzijl et al. |
| 7,157,530 B2 | 1/2007 | Matyjaszewski et al. |
| 7,163,697 B2 | 1/2007 | Hanes et al. |
| 7,186,759 B2 | 3/2007 | Seppälä et al. |
| 7,229,687 B2 | 6/2007 | Kinning et al. |
| 7,235,261 B2 | 6/2007 | Smith et al. |
| 7,241,455 B2 | 7/2007 | Richard |
| 7,316,811 B2 | 1/2008 | Zhao et al. |
| 7,341,720 B2 | 3/2008 | Stefano |
| 7,381,418 B2 | 6/2008 | Richard |
| 7,517,914 B2 | 4/2009 | Richard |
| 7,537,781 B2 | 5/2009 | Richard |
| 7,585,932 B2 * | 9/2009 | Byers et al. ................. 528/376 |
| 7,592,021 B2 | 9/2009 | Shankar et al. |
| 7,612,029 B2 | 11/2009 | Foland et al. |
| 7,713,539 B2 | 5/2010 | Strickler et al. |
| 8,404,788 B2 * | 3/2013 | Matyjaszewski et al. .... 526/111 |
| 2002/0044976 A1 | 4/2002 | Gustavsson et al. |
| 2002/0082543 A1 | 6/2002 | Park et al. |
| 2002/0090398 A1 | 7/2002 | Dunn et al. |
| 2002/0155309 A1 | 10/2002 | Li et al. |
| 2002/0155310 A1 | 10/2002 | Li et al. |
| 2003/0003127 A1 | 1/2003 | Brown et al. |
| 2003/0004578 A1 | 1/2003 | Brown et al. |
| 2003/0018154 A1 | 1/2003 | Khadir et al. |
| 2003/0054185 A1 | 3/2003 | Ottersbach et al. |
| 2003/0086895 A1 | 5/2003 | Hanes et al. |
| 2003/0091630 A1 | 5/2003 | Louie-Helm et al. |
| 2003/0104052 A1 | 6/2003 | Berner et al. |
| 2003/0133985 A1 | 7/2003 | Louie-Helm et al. |
| 2003/0138579 A1 | 7/2003 | Savoca et al. |
| 2003/0152622 A1 | 8/2003 | Louie-Helm et al. |
| 2003/0153457 A1 | 8/2003 | Nemoto et al. |
| 2003/0158076 A1 | 8/2003 | Rodrigues |
| 2003/0158344 A1 | 8/2003 | Rodriques et al. |
| 2003/0173720 A1 | 9/2003 | Musso et al. |
| 2003/0203000 A1 | 10/2003 | Schwarz et al. |
| 2003/0211167 A1 | 11/2003 | Gustavsson et al. |
| 2003/0220254 A1 | 11/2003 | Khan et al. |
| 2003/0235602 A1 | 12/2003 | Schwarz |
| 2003/0235603 A1 | 12/2003 | Schwarz et al. |
| 2003/0236513 A1 | 12/2003 | Schwarz et al. |
| 2003/0236514 A1 | 12/2003 | Schwarz et al. |
| 2004/0001891 A1 | 1/2004 | Smith et al. |
| 2004/0006153 A1 | 1/2004 | Seppälä et al. |
| 2004/0023987 A1 | 2/2004 | Hata et al. |
| 2004/0068078 A1 | 4/2004 | Milbocker |
| 2004/0086544 A1 | 5/2004 | Bezemer et al. |
| 2004/0115281 A1 | 6/2004 | Gustavsson et al. |
| 2004/0126576 A1 | 7/2004 | Kinning et al. |
| 2004/0156899 A1 | 8/2004 | Louie-Helm et al. |
| 2004/0161403 A1 | 8/2004 | Zhao et al. |
| 2004/0171513 A1 | 9/2004 | Bloksijl et al. |
| 2004/0175406 A1 | 9/2004 | Schwarz |
| 2004/0185105 A1 | 9/2004 | Berner et al. |
| 2004/0202691 A1 | 10/2004 | Richard |
| 2004/0234571 A1 | 11/2004 | Jang |
| 2005/0025800 A1 | 2/2005 | Tan |
| 2005/0025801 A1 | 2/2005 | Richard et al. |
| 2005/0064011 A1 | 3/2005 | Song et al. |
| 2005/0113515 A1 | 5/2005 | Sutton et al. |
| 2005/0181014 A1 | 8/2005 | Richard |
| 2005/0181015 A1 | 8/2005 | Zhong |
| 2005/0214531 A1 | 9/2005 | Kinning et al. |
| 2005/0233062 A1 | 10/2005 | Hossainy et al. |
| 2005/0244640 A1 | 11/2005 | Riswick et al. |
| 2006/0013849 A1 | 1/2006 | Strickler et al. |
| 2006/0018951 A1 | 1/2006 | Maniar et al. |
| 2006/0024357 A1 | 2/2006 | Carpenter et al. |
| 2006/0051390 A1 | 3/2006 | Schwarz |
| 2006/0068378 A1 | 3/2006 | Mirkin et al. |
| 2006/0089474 A1 | 4/2006 | Yamazaki et al. |
| 2006/0111529 A1 * | 5/2006 | Boevenbrink et al. ..... 526/218.1 |
| 2006/0121076 A1 | 6/2006 | Ranade et al. |
| 2006/0121085 A1 | 6/2006 | Warren et al. |
| 2006/0147490 A1 | 7/2006 | Bowden et al. |
| 2006/0159619 A1 | 7/2006 | Becker et al. |
| 2006/0165753 A1 | 7/2006 | Richard |
| 2006/0188486 A1 | 8/2006 | Carpenter et al. |
| 2006/0210604 A1 | 9/2006 | Dadey et al. |
| 2006/0222681 A1 | 10/2006 | Richard |
| 2006/0228348 A1 | 10/2006 | Stefano |
| 2007/0003599 A1 | 1/2007 | Schwarz |
| 2007/0020307 A1 | 1/2007 | Zhong et al. |
| 2007/0135532 A1 | 6/2007 | Seppälä et al. |
| 2007/0160561 A1 | 7/2007 | Ouali et al. |
| 2007/0212418 A1 | 9/2007 | Ahlheim |
| 2007/0219330 A1 | 9/2007 | Haddleton et al. |
| 2007/0238634 A1 | 10/2007 | Foland et al. |
| 2007/0254010 A1 | 11/2007 | Richard |
| 2007/0260015 A1 | 11/2007 | Stork et al. |
| 2007/0275027 A1 | 11/2007 | Wen et al. |
| 2007/0275080 A1 | 11/2007 | Laulicht et al. |
| 2007/0275082 A1 | 11/2007 | Lee et al. |
| 2007/0276101 A1 * | 11/2007 | Matyjaszewski et al. ...... 526/96 |
| 2007/0280992 A1 | 12/2007 | Margaron et al. |
| 2007/0281031 A1 | 12/2007 | Yang |
| 2007/0299227 A1 | 12/2007 | Gopferich et al. |
| 2007/0299238 A1 | 12/2007 | Gopferich et al. |
| 2007/0299240 A1 | 12/2007 | Gopferich et al. |
| 2008/0112898 A1 | 5/2008 | Schiemann et al. |
| 2008/0114128 A1 | 5/2008 | Destarac et al. |
| 2008/0131395 A1 | 6/2008 | Wellinghoff et al. |
| 2008/0132580 A1 | 6/2008 | Mandavilli et al. |
| 2008/0149348 A1 | 6/2008 | DiFoggio et al. |
| 2008/0226658 A1 | 9/2008 | Stefano |
| 2008/0280037 A1 | 11/2008 | Sheridan et al. |
| 2008/0280086 A1 | 11/2008 | Sheridan et al. |
| 2008/0286333 A1 | 11/2008 | Kangas et al. |
| 2008/0299168 A1 | 12/2008 | Dadey et al. |
| 2008/0311173 A1 | 12/2008 | Schwarz et al. |
| 2009/0087493 A1 | 4/2009 | Dai et al. |
| 2009/0092650 A1 | 4/2009 | Warren et al. |
| 2009/0098079 A1 | 4/2009 | Schiemann et al. |
| 2009/0098183 A1 | 4/2009 | Detamore et al. |
| 2009/0099151 A1 | 4/2009 | Jain et al. |
| 2009/0130172 A1 | 5/2009 | Dankers et al. |
| 2009/0142313 A1 | 6/2009 | Talling et al. |
| 2009/0171024 A1 | 7/2009 | Jakubowski et al. |
| 2009/0176951 A1 * | 7/2009 | Matyjaszewski et al. .... 526/200 |
| 2009/0181094 A1 | 7/2009 | Sheu |
| 2009/0291106 A1 | 11/2009 | Gopferich et al. |
| 2009/0312505 A1 * | 12/2009 | Matyjaszewski et al. ...... 526/90 |
| 2009/0326645 A1 | 12/2009 | Pacetti et al. |
| 2010/0086597 A1 | 4/2010 | Woo et al. |
| 2010/0092535 A1 | 4/2010 | Cook et al. |

(56) References Cited

U.S. PATENT DOCUMENTS

| | | |
|---|---|---|
| 2010/0120637 A1 | 5/2010 | Bendejacq et al. |
| 2010/0120970 A1 | 5/2010 | Biggs et al. |
| 2010/0204418 A1 | 8/2010 | Marc et al. |
| 2010/0273949 A1 | 10/2010 | Jakubowski et al. |

OTHER PUBLICATIONS

Zhang et al., "Effect of Cu(II) on the Kinetics of the Homogeneous Atom Transfer Radical Polymerization of Methyl Methacrylate", 2001, Macromolecules, 34, pp. 6169-6173.*

Adkins, Chinessa T. et al. "Synthesis of Star Polymer Architectures with Site-Isolated Chromophore Cores," *Macromolecules* 41 (2008) 3472-3480.

Ali, Monzur et al. "Synthetic Approaches to Uniform Polymers" *Advanced Drug Delivery Reviews* 58 (2006) 1671- 1687.

Allen, Barry J. "Clinical Trials of Targeted Alpha Therapy for Cancer" *Rev.Recent Clin.Trials* 3:3 (2008) 185-191.

Baek, Kyung-Youl et al. "Core-Functionalized Star Polymers by Transition Metal-Catalyzed Living Radical Polymerization. 1 Synthesis and Characterization of Star Polymers with PMMA Arms and Amide Cores," *Macromolecules* 34 (2001) 7629-7635.

Baek, Kyung-Youl et al. "Star-Shaped Polymers by Metal-Catalyzed Living Radical Polymerization. 1. Design of Ru(II)-Based Systems and Divinyl Linking Agents," *Macromolecules* 34 (2001) 215-221.

Baek, Kyung-Youl et al. "Star Poly(methyl methacrylate) with End-Functionalized Arm Chains by Ruthenium-Catalyzed Living Radical Polymerization," *J. Polm. Sci. Part A: Polym. Chem.* 40 (2002) 1972-1982.

Baek, Kyung-Youl et al. "Synthesis of Star-Shaped Copolymers with Methyl Methacrylate and *n*-Butyl Methacrylate by Metal-Catalyzed Living Radical Polymerization: Block and Random Copolymer Arms and Microgel Cores," *J. Polm. Sci. Part A: Polym. Chem.* 40 (2002) 633-641.

Baek, Kyung-Youl et al. "Star-Shaped Polymers by Ru(II)-Catalyzed Living Radical Polymerization. II. Effective Reaction Conditions and Characterization by Multi-Angle Laser Light Scattering/Size Exclusion Chromatography and Small-Angle X-Ray Scattering," *J. Polm. Sci. Part A: Polym. Chem.* 40 (2002) 2245-2255.

Beers, Kathryn L. et al. "The Synthesis of Densely Grafted Copolymers by Atom Transfer Radical Polymerization" *Macromolecules* 31:26 (1998) 9413-9415.

Beers, Kathryn L. et al. "Atom Transfer Radical Polymerization of 2-Hydroxyethyl Methacrylate" *Macromolecules* 32:18 (1999) 5772-5776.

Bencherif, Sidi A. et al. "Cell-Adhesive Star Polymers Prepared by ATRP," *Biomacromolecules* 10 (2010) 1795-1803.

Bi, Le-Khac et al. "Synthesis and Properties of Block Copolymers. 3. Polystyrene-Polydiene Star Block Copolymers," *Macromolecules* 9:5 (Sep.-Oct. 1976) 732-742.

Blainey, J. D. "The Renal Excretion of Higher Molecular Weight Substances" *Enzymes in Urine and Kidney Proceedings: Curr. Probl. Clin. Biochem.* 2 (1968) 85-100.

Blencowe, Anton et al. "Synthesis of Buckminsterfullerene $C_{60}$ Functionalised Core Cross-Linked Star Polymers," *Polymer* 49 (2008) 825-830.

Bontempo, Debora et al. "Cysteine-Reactive Polymers Synthesized by Atom Transfer Radical Polymerization for Conjugation to Proteins" *J. Am. Chem. Soc.* 126:47 (2004) 15372-15373.

Bosman, Anton W. et al. "High-Throughput Synthesis of Nanoscale Materials: Structural Optimization of Functionalized One-Step Star Polymers," *J. Am. Chem. Soc.* 123 (2001) 6461-6462.

Bosman, Anton W. et al. "A Modular Approach Toward Functionalized Three-Dimensional Macromolecules: From Synthetic Concepts to Practical Applications," *J. Am. Chem. Soc.* 125 (2003) 715-728.

Bouilhac, Cécile et al. "Functionalized Star-Like Polystyrenes as Organic Supports of a Tridentate Bis(imino)pyridinyliron/Aluminic Derivative Catalytic System for Ethylene Polymerization," *Macromol. Rapid Commun.* 26 (2005) 1619-1625.

Bouilhac, Cécile et al. "Benzophenone-Functionalized, Starlike Polystyrenes as Organic Supports for a Tridentate Bis(imino)pyridinyliron/Trimethylaluminum Catalytic System for Ethylene Polymerization," *J. Polm. Sci. Part A: Polym. Chem.* 44 (2006) 6997-7007.

Braunecker, W. A. et al. *Progress in Polymer Science* 33 (2008) 165.

Burke, Sandra E. et al. "Zotarolimus (ABT-578) Eluting Stents" *Advanced Drug Delivery Reviews* 58 (2006) 437-446.

Chari, Ravi V. J. "Targeted Cancer Therapy : Conferring Specificity to Cytotoxic Drugs" *Acc. Chem. Res.* 41:1 (2008) 98-107.

Chong, Y. K et al. "Thiocarbonylthio End Group Removal from RAFT-Synthesized Polymers by Radical-Induced Reduction," *Macromolecules* 40:13 (May 22, 2007) 4446-4455.

Connal, Luke A. et al. "Synthesis of Dendron Functionalized Core Cross-Linked Star Polymers," *Macromolecules* 40 (2007) 7855-7863.

Daugherty, Ann L. et al. "Formulation and Delivery Issues for Monoclonal Antibody Therapeutics" *Adv. Drug Deliv Rev.* 58 (2006) 686-706.

Du, Jianzhong et al. "Preparation of Poly(ethylene oxide) Star Polymers and Poly(ethylene oxide)-Polystyrene Heteroarm Star Polymers by Atom Transfer Radical Polymerization," *J. Polm. Sci. Part A: Polym. Chem.* 42 (2004) 2263-2271.

Du, Jianzhong et al. "PCL Star Polymer, PCL-PS Heteroarm Star Polymer by ATRP, and Core-Carboxylated PS Star Polymer Thereof," *Macromolecules* 37 (2004) 3588-3594.

Ferrari, Mauro, "Cancer Nanotechnology : Opportunities and Challenges" *Nature Reviews Cancer* 5 (2005) 161-171.

Froidevaux, Sylvie et al. "A Gallium-Labeled DOTA-α-Melanocyte-Stimulating Hormone Analog for PET Imaging of Melanoma Metastases" *J Nucl Med.* 45:1 (2004) 116-123.

Fukukawa, Ken-ichi et al. "Synthesis and Characterization of Core-Shell Star Copolymers for In Vivo PET Imaging Applications," *Biomacromolecules* 9 (2008) 1329-1339.

Furukawa, Taiichi et al. "Synthesis and Characterization of Poly(ethylene oxide) Star Polymers Possessing a Tertiary Amino Group at Each Arm End by Organized Polymerization Using Macromonomers," *Journal of Colloid and Interface Science* 253 (2002) 465-469.

Furukawa, Taiichi et al. "Synthesis and Viscoelastic Behavior of Multiarm Star Polyelectrolytes," *Macromolecules* 38 (2005) 2911-2917.

Gao, Haifeng et al. "Synthesis of Degradable Miktoarm Star Copolymers via Atom Transfer Radical Polymerization," *Macromolecules* 38:14 (2005) 5995-6004.

Gao, Haifeng et al. "Characterization of Linear and 3-Arm Star Block Copolymers by Liquid Chromatography at Critical Conditions," *Macromol. Chem. Phys.* 207 (2006) 1709-1717.

Gao, Haifeng et al. "Structural Control in ATRP Synthesis of Star Polymers Using the Arm-First Method," *Macromolecules* 39:9 (2006) 3154-3160.

Gao, Haifeng et al. "Low Polydispersity Star Polymers via Cross-Linking Macromonomers by ATRP," *J. Am. Chem. Soc.* 128 (2006) 15111-15113.

Gao, Haifeng et al. "Low-Polydispersity Star Polymers with Core Functionality by Cross-Linking Macromonomers Using Functional ATRP Initiators," *Macromolecules* 40 (2007) 399-401.

Gao, Haifeng et al. "Arm-First Method as a Simple and General Method for Synthesis of Miktoarm Star Copolymers," *J. Am. Chem. Soc.* 129:38 (2007) 11828-11834.

Gao, Haifeng et al. "Synthesis of Low-Polydispersity Miktoarm Star Copolymers Via a Simple 'Arm-First' Method: Macromonomers as Arm Precursors," *Macromolecules* 41:12 (2008) 4250-4257.

Gao, Haifeng et al. "Synthesis of Functional Polymers with Controlled Architecture by CRP of Monomers in the Presence of Cross-Linkers: From Stars to Gels," *Progress in Polymer Science* 34:4 (2009) 317-350.

Gao, Haifeng et al. "Modular Approaches to Star and Miktoarm Star Polymers by ATRP of Cross-Linkers," *Macromol. Symp.* 291-292 (2010) 12-16.

Goh, Tor Kit et al. "Highly Efficient Synthesis of Low Polydispersity Corss Cross-Linked Star Polymers by Ru-Catalyzed Living Radical Polymerization," *Macromol. Rapid Commun.* 32 (2011) 456-461.

(56) References Cited

OTHER PUBLICATIONS

Hadjichristidis, Nikos "Synhesis of Miktoarm Star (μ-Star) Polymers," *J. Polym. Sci, Part A: Polym. Chem.* 37 (1999).

Hadjichristidis, Nikos et al. "Macromolecular Architectures by Living and Controlled/Living Polymerizations," *Prog. Polym. Sci.* 31 (2006) 1068-1132.

Hamann, Philip R. et al. "A Calicheamicin Conjugate with a Fully Humanized Anti-MUC1 Antibody Shows Potent Antitumor Effects in Breast and Ovarian Tumor Xenografts" *Bioconjugate Chem.* 16 (2005) 354-360.

Held, Daniela et al. "Synthesis and Solution Properties of Star-Shaped Poly(*tert*-butyl acrylate)," *Macromol. Symp.* 157 (2000) 225-237.

Hietala, Sami et al. "Synthesis and Rheological Properties of an Associative Star Polymer in Aqueous Solutions," *Polymer* 48 (2007) 4087-4096.

Hietala, Sami et al. "Rheological Properties of Associative Star Polymers in Aqueous Solutions: Effect of Hydrophone Length and Polymer Topology," *Macromolecules* 42 (2009) 1726-1732.

Huang, Jinyu et al. "Synthesis and Characterization of Copolymers of 5,6-benzo-2-methylene-1,3-dioxepane and *n*-butyl acrylate" *Polymer* 46 (2005) 11698-11706.

Ishizu, Koji et al. "Synthesis of Star Polymers by Organized Polymerization of Macromonomers," *Polymer* 36:21 (1995) 4155-4157.

Iatridi, Zacharoula et al. "Phase Behavior and Self-Assembly of $PS_n(P2VP-b-PAA)_n$ Multiarmed Multisegmented Star Terpolymers with Ampholytic Arms," *Polym. Chem.* (2011) DOI:10.1039/c1py00090—8 pages.

Ishizu, Koji et al. "Synthesis of Amphiphilic Star Block Copolymers Via Diethyldithiocarbamate-Mediated Living Radical Polymerization," J. Polm. Sci. Part A: Polym. Chem. 44 (2006) 3321-3327.

Jankova, K. et al. "Novel Fluorinated Block Copolymer Architectures Fuelled by Atom Transfer Radical Polymerization," *Journal of Fluorine Chemistry* 126:2 (Dec. 10, 2004) 241-250.

Jones, M.C. et al. "Self-Assembled Nanocages for Hydrophilic Guest Molecules," *J. Am. Chem. Soc.* 128:45 (Oct. 21, 2006) 14599-14605.

Kafouris, Demetris et al. "Synthesis and Characterization of Star Polymers and Cross-Linked Star Polymer Model Networks with Cores Based on an Asymmetric, Hydrolyzable Dimethacrylate Cross-Linker," *Chem. Mater.* 18 (2006) 85-93.

Kelly, Marcus P. et al. "Tumor Targeting by a Multivalent Single-Chain Fv (scFv) Anti-Lewis Y Antibody Construct" *Cancer Biother. Radiopharm.* 23:4 (2008) 411-424.

Koda, Yuta et al. "Fluorinated Microgel-Core Star Polymers as Fluorous Compartments for Molecular Recognition," *Macromolecules* 44 (2011) 4574-4578.

Kowalczuk-Bleja, A. et al. "Core-Shell Polyacrylate and Polystyrene-Block-Polyacrylate Stars," *Polymer* 46:19 (2005).

Kreutzer, Georg et al. "Water-Soluble, Unimolecular Containers Based on Amphiphilic Multiarm Star Block Copolymers," *Macromolecules* 39 (2006) 4507-4516.

Lee, Cameron C. et al. "Designing Dendrimers for Biological Applications" *Nature Biotech.* 23 :12 (2005) 1517-1526.

Lee, Cameron C. et al. "A Single Dose of Doxorubicin-Functionalized Bow-Tie Dendrimer Cures Mice Bearing C-26 Colon Carcinomas" *PNAS* 103 :45 (2006) 16649-16654.

Lee, Hyung-Jae et al. "Controlled Anionic Synthesis of Star-Shaped Polystyrene by the Incremental Additional of Divinylbenzene," *J. Polm. Sci. Part A: Polym. Chem.* 43 (2005) 870-878.

Li, Wenwen et al. "Uniform PEO Star Polymers Synthesized in Water via Free Radical Polymerization or Atom Transfer Radical Polymerization," *Macromol. Rapid Commun.* 31 (2010) 74-81.

Liu, Jun et al. "Reversible Self-Association Increases the Viscosity of a Concentrated Monoclonal Antibody in Aqueous Solution" *J Pharm Sci.* 94:9 (2005) 1928-1940.

Liu, Pingwei et al. "'Arm-First' Synthesis of Core-Cross-Linked Multiarm Star Polyethylenes by Coupling Palladium-Catalyzed Ethylene 'Living' Polymerization with Atom-Transfer Radical Polymerization," *Macromolecules* 44 (2011) A-O.

Matyjaszewski, Krzysztof et al. "Synthesis of Well-Defined Azido and Amino End-Functionalized Polystyrene by Atom Transfer Radical Polymerization" *Macromol. Rapid Commun.* 18 (1997) 1057-1066.

Matyjaszewski, Krzysztof et al. "Atom Transfer Radical Polymerization" *Chem. Rev.* 101:9 (2001) 2921-2990.

Matyjaszewski, Krzysztof "The Synthesis of Functional Star Copolymers as an Illustration of the Importance of Controlling Polymer Structures in the Design of New Materials," *Polym. Int.* 52 (2003) 1559-1565.

McCarthy, Patrick et al. "Grafting Chromatographic Stationary Phase Substrates by Atom Transfer Radical Polymerization" Controlled/Living Radical Polymerization, Chapter 18, *ACS Symposium Series* 944 (2006) 252-268.

McCormick, Charles L. et al. "Synthetic Routes to Stimuli-Responsive Micelles, Vesicles, and Surfaces via Controlled/Living Radical Polymerization" *Polymer Reviews* 46 (2006) 421-443.

Moad, Graeme et al. "Synthesis of Novel Architectures by Radical Polymerization with Reversible Addition Fragmentation Chain Transfer (RAFT Polymerization)," *Macromol. Symp.* 192 (2003) 1-12.

Moad, Graeme et al. "Radical Addition-Fragmentation Chemistry in Polymer Synthesis" *Polymer* 49 (2008) 1079-1131.

Narumi, Atsushi et al. "Glycoconjugated Polymer. 3. Synthesis and Amphiphilic Property of Core-Glycoconjugated Star-Shaped Polystyrene," *Macromolecules* 35 (2002) 699-705.

Narumi, Atsushi et al. "Star-Shaped Polystyrenes with Glycoconjugated Periphery and Interior: Synthesis and Entrapment of Hydrophilic Molecule," *J. Polm. Sci. Part A: Polym. Chem.* 43 (2005) 4373-4381.

Oh, Jung K. et al. "Inverse Miniemulsion ATRP: A New Method for Synthesis and Functionalization of Well-Defined Water-Soluble/Cross-Linked Polymeric Particles" *J. Am. Chem. Soc.* 128 (2006) 5578-5584.

Pan, Dipanjan et al. "Shell Cross-Linked Nanoparticles Designed to Target Angiogenic Blood Vessels via $\alpha_\nu\beta_3$ Receptor-Ligand Interactions" *Macromolecules* 37:19 (2004) 7109-7115.

Pang, Xinchang et al. "Novel Amphiphilic Multi-Arm, Star-Like Block Copolymers as Unimolecular Micelles," *Macromolecules* 44 (2011) 3746-3752.

Pasquale, Anthony J. et al. "Synthesis of Star-Shaped Polystyrenes via Nitroxide-Mediated Stable Free-Radical Polymerization," *J. Polm. Sol. Part A: Polym. Chem.* 39 (2001) 216-223.

Polakis, Paul "Arming Antibodies for Cancer Therapy" *Current Opinion in Pharmacology* 5 (2005) 382-387.

Rosenberg, Amy S. "Effects of Protein Aggregates: An Immunologic Perspective" *AAPS J.* 8:3 (2006) E501-E507.

Rosi, Nathaniel L. et al. "Nanostructures in Biodiagnostics" *Chem Rev.* 105 (2005) 1547-1562.

Sciannamea, Valerie et al. "In-Situ Nitroxide-Mediated Radical Polymerization (NMP) Processes: Their Understanding and Optimization" *Chem. Rev.* 108:3 (2008) 1104-1126.

Shire, Steven J. et al. "Challenges in the Development of High Protein Concentration Formulations" *J. Pharm. Sci.* 93:6 (2005) 1390-1402.

Spiniello, Marisa et al. "Synthesis and Characterization of Fluorescently Labeled Core Cross-Linked Star Polymers," *J. Polm. Sci. Part A: Polym. Chem.* 46 (2008) 2422-2432.

Taton, Daniel et al. "Controlled Polymerizations as Tools for the Design of Star-Like and Dendrimer-Like Polymers," *Polym. Int.* 55 (2006) 1138-1145.

Terashima, Takaya et al. "Polymer Catalysts from Polymerization Catalysts: Direct Encapsulation of Metal Catalyst into Star Polymer Core During Metal-Catalyzed Living Radical Polymerization," *J. Am. Chem. Soc.* 125 (2003) 5288-5289.

Terashima, Takaya et al. "In Situ and Time-Resolved Small-Angle Neutron Scattering Observation of Star Polymer Formation via Arm-Linking Reaction in Ruthenium-Catalyzed Living Radical Polymerization," *Macromolecules* 43 (2010) 8218-8232.

Themistou, Efrosyni et al. "Synthesis and Characterization of Star Polymers and Cross-Linked Star Polymer Model Networks Containing a Novel, Silicon-Based, Hydrolyzable Cross-Linker," *Macromolecules* 37 (2004) 6734-6743.

(56) References Cited

OTHER PUBLICATIONS

Themistou, Efrosyni et al. "Synthesis and Characterization of Polymer Networks and Star Polymers Containing a Novel, Hydrolyzable Acetal-Based Dimethacrylate Cross-Linker," *Macromolecules* 39 (2006) 73-80.

Tsarevsky, Nicolay V. et al. "Reversible Redox Cleavage/Coupling of Polystyrene with Disulfide or Thiol Groups Prepared by Atom Transfer Radical Polymerization" *Macromolecules* 35 (2002) 9009-9014.

Tsarevsky, Nicolay V. et al. "Deactivation Efficiency and Degree of Control Over Polymerization in ATRP in Protic Solvents " *Macromolecules* 37 (2004) 9768-9778.

Tsarevsky, Nicolay V. et al. "Controlled Synthesis of Polymers with Ionic or Ionizable Groups Using Atom Transfer Radical Polymerization" *Polyelectrolytes and Polyzwitterions*, Chapter 5, ACS Symposium Series 937 (2006) 79-94.

Tsarevsky, Nicolay V. et al. "Graft Copolymers by a Combination of ATRP and Two Different Consecutive Click Reactions" *Macromolecules* 40:13 (2007) 4439-4445.

Tsoukatos, Thodoris et al. "Star-Branched Polystyrenes by Nitroxide Living Free-Radical Polymerization," *J. Polm. Sci. Part A: Polym. Chem.* 39 (2001) 320-325.

Van Camp, Wim et al. "Effect of Crosslinker Multiplicity on the Gel Point in ATRP," *J. Polym. Sci., Part A: Polymer Chemistry* 48 (2010) 2016-2023.

Wang, Fei et al. "Synthesis and Evaluation of a Star Amphiphilic Block Copolymer from Poly($\epsilon$-caprolactone) and Poly(ethylene glycol) as a Potential Drug Delivery Carrier," *Bioconjugate Chem.* 16 (2005) 397-405.

Wang, Jin-Shan et al. "Controlled/'Living' Radical Polymerization. Atom Transfer Radical Polymerization in the Presence of Transition-Metal Complexes" *J. Am. Chem. Soc.* 117 (1995) 5614-5615.

Wiltshire, James T. et al. "Selectively Degradable Core Cross-Linked Star Polymers," *Macromolecules* 39 (2006) 9018-9027.

Xia, Jianhui et al. "Synthesis of Star-Shaped Polystyrene by Atom Transfer Radical Polymerization Using an 'Arm First' Approach," *Macromolecules* 32 (1999) 4482-4484.

Yoo, Mikyong et al. "Photophysical Characterization of Conformational Rearrangements for Amphiphilic 6-Arm Star Block Copolymers in Selective Solvent Mixtures," *Macromolecules* 36:1 (2003) 268-271.

York, Adam W. et al. "Advances in the Synthesis of Amphiphilic Block Copolymers via Raft Polymerization: Stimuli-Responsive Drug and Gene Delivery" *Advanced Drug Delivery Reviews* 60 (2008) 1018-1036.

Zhang, Xuan et al. "End-Functional Poly(tert-butyl acrylate) Star Polymers by Controlled Radical Polymerization," *Macromolecules* 33 (2000) 2340-2345.

Zhang, Genhua et al. "Preparation of Star Polymers Based on Polystyrene or Poly(styrene-*b*-*N*-isopropyl acrylamide) and Divinylbenzene Via Reversible Addition-Fragmentation Chain Transfer Polymerization," *Polymer* 46 (2005) 2802-2810.

Zheng, Yu et al. "Biodegradable Core—Shell Materials via RAFT and ROP: Characterization and Comparison of Hyperbranched and Microgel Particles," *Macromolecules* 44 (2011) 1347-1354.

Office Action mailed Dec. 3, 2013 in corresponding Japanese Patent Application No. 2012-544469 (with English Translation provided).

Shaver et al. "Organometallic Intermediates in the Controlled Radical Polymerization of Styrene by a-Diimine Iron Catalysts"; Organometallics, 26 (2007) 4725-4730.

Gromada et al. "Simultaneous Reverse and Normal Initiation in Atom Transfer Radical Polymerization", Macromolecules 34 (2001) 7664-7671.

\* cited by examiner

CONTROL OVER CONTROLLED RADICAL POLYMERIZATION PROCESSES

CROSS-REFERENCE TO RELATED APPLICATION

This application claims priority under 35 U.S.C. §19(e) to provisional application Ser. No. 61/203,387, filed Dec. 22, 2008, incorporated herein by reference in its entirety.

TECHNICAL FIELD OF THE INVENTION

Three controlled radical polymerization (CRP) procedures are presently broadly utilized for the synthesis of high performance functional materials. They are: atom transfer radical polymerization (ATRP), reversible addition fragmentation transfer (RAFT) and nitroxide mediated polymerization (NMP). Procedures for improved levels of control over various CRP processes for radically (co)polymerizable monomers are disclosed. The improvements are focused on defining industrially scalable procedures with reduced environmental impact for the three CRP procedures. In the case of atom transfer radical polymerization (ATRP) the improved process is conducted in the presence of low parts per million of a transition metal catalyst complex and a high degree of control is attained by running the reaction under conditions of controlled addition/activation of a reducing agent/radical initiator. In the case of RAFT overall control is improved by conducting the reaction under conditions of controlled addition/activation of the radical initiator. The rate of polymerization in a nitroxide mediated polymerization (NMP) is controlled under conditions of controlled addition/activation of a radical initiator to control the concentration of the persistent radical.

BACKGROUND

Many high-performance materials, particularly segmented copolymers or composite structures, require controlled synthesis of polymers from functional monomers employing well defined initiators. [*Macromolecular Engineering. Precise Synthesis, Materials Properties, Applications*; Wiley-VCH: Weinheim, 2007.] For optimal performance in many applications the materials also require controlled processing taking into account the size and topology of phase separated domains and the dynamics of testing response rates.

Access to well-defined block copolymers was opened by Szwarc in the 1950's [*Nature* 1956, 176, 1168-1169] by the development of living anionic polymerization. The biggest limitation of this technique is its sensitivity to impurities (moisture, carbon dioxide) and even mild electrophiles, which limits the process to a narrow range of monomers. The reaction medium and all components have to be extensively purified before polymerization, thus preparation of functional block copolymers or other well-defined polymeric materials in high purity can be challenging. Nevertheless, anionic polymerization, which was first implemented in an academic setting, was quickly adapted on an industrial scale and ultimately led to the mass production of several well-defined block copolymers, such as polystyrene-b-polybutadiene-b-polystyrene, performing as a thermoplastic elastomer. [*Thermoplastic Elastomers*, 3rd Ed.; Hanser: Munich, 2004]

The fast industrial adaptation of such a challenging technique may be explained by the fact that anionic polymerization was the first and, indeed only example of a living polymerization process for more than three decades, that allowed for the synthesis of previously inaccessible well defined high-performance materials from a very narrow selection of vinyl monomers. Nevertheless materials based on modified block copolymers with properties that were desired in many applications, were the main driving force for scaling up anionic polymerization processes. [Ionic Polymerization and Living Polymers; Chapman and Hall, New York, 1993, ISBN 0-412-03661-4.]

In late 1970's to early 1990's, living carbocationic polymerization was discovered and optimized. [*Adv. Polym. Sci.* 1980, 37, 1-144.] However this procedure is just as sensitive to impurities as anionic polymerization and the range of polymerizable monomers for both techniques was essentially limited to non-polar vinyl monomers.

While many earlier attempts were made to develop controlled radical polymerization (CRP) processes the critical advances were made in the mid 1990's. CRP can be applied to the polymerization of functional monomers and hence preparation of many different site specific functional (co)polymers under mild conditions became feasible. [*Materials Today* 2005, 8, 26-33 and *Handbook of Radical Polymerization*; Wiley Interscience: Hoboken, 2002.] From a commercial point of view, CRP processes can be conducted at convenient temperatures, do not require extensive purification of the monomers or solvents and can be conducted in bulk, solution, aqueous suspension, emulsion, etc. CRP allows the preparation of polymers with predetermined molecular weights, low polydispersity and controlled composition, and topology. Radical polymerization is much more tolerant of functional groups than ionic polymerization processes and a broader range of unsaturated monomers can be polymerized providing materials with site specific functionality. In addition, copolymerization reactions, which are generally challenging for ionic polymerizations due to large differences in reactivity ratios of monomers under ionic polymerization conditions, are easy to perform using radical based CRP. This provides an opportunity to synthesize polymeric materials with predetermined molecular weight (MW), low polydispersity (PDI), controlled composition, site specific functionalities, selected chain topology and composite structures that can be employed to incorporate bio- or inorganic species into the final product.

The three most studied, and commercially promising, methods of controlling radical polymerization are nitroxide mediated polymerization (NMP), [*Chemical Reviews* 2001, 101, 3661-3688] atom transfer radical polymerization (ATRP), [*J. Chem. Rev.* 2001, 101, 2921-2990; *Progress in Polymer Science* 2007, 32, 93-146.] and degenerative transfer with dithioesters via reversible addition-fragmentation chain transfer polymerization (RAFT). [*Progress in Polymer Science* 2007, 32, 283-351] Each of these methods relies on establishment of a dynamic equilibrium between a low concentration of active propagating chains and a predominant amount of dormant chains that are unable to propagate or terminate as a means of extending the lifetime of the propagating chains.

The simple four component atom transfer radical polymerization (ATRP) process, shown below in Scheme 1, was discovered by Matyjaszewski at Carnegie Mellon University and he and his coworkers have disclosed ATRP, and many improvements to the basic ATRP process, in a number of patents and patent applications [U.S. Pat. Nos. 5,763,546; 5,807,937; 5,789,487; 5,945,491; 6,111,022; 6,121,371; 6,124,411; 6,162,882; 6,624,262; 6,407,187; 6,512,060; 6,627,314; 6,790,919; 7,019,082; 7,049,373; 7,064,166; 7,157,530 and U.S. patent application Ser. Nos. 09/534,827; PCT/US04/09905; PCT/US05/007264; PCT/US05/007265; PCT/US06/33152, PCT/US2006/033792 and PCT/US2006/

048656] all of which are herein incorporated by reference. Based on the number of publications ATRP has emerged as the preferred process for controlled/living polymerization of radically (co)polymerizable monomers. Typically, an ATRP process comprises use of a transition metal complex that acts as a catalyst for the controlled polymerization of radically (co)polymerizable monomers from an initiator with one or more transferable atoms or groups. Suitable initiators are frequently substituted alkyl halides attached to a low molecular weight molecule with an additional non-initiating functionality, a low molecular weight initiator or macroinitiator with two or more transferable atoms or groups or a solid inorganic or organic material with tethered initiating groups. The transition metal catalyst participates in a repetitive redox reaction whereby the lower oxidation state transition metal complex ($M_t^n$/Ligand) homolytically removes a transferable atom or group from an initiator molecule or dormant polymer chain, $P_n$-X, to Form the Active Propagating Species, $P^{\bullet}_n$, in an Activating Reaction with a Rate of Activation $k_a$ which propagates at a rate $k_p$ before the higher oxidation state transition metal complex (X-$M_t^{n+1}$/Ligand) deactivates the active propagating species, $P^{\bullet}_n$, by donating back a transferable atom or group to the active chain end, rate $k_{da}$, not necessarily the same atom or group from the same transition metal complex. (Scheme 1)

Scheme 1. General mechanism for the ATRP process

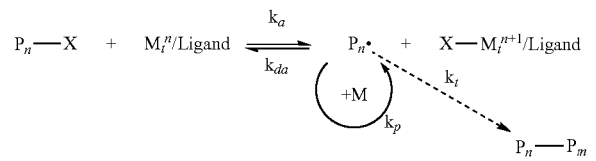

The catalyst is not bound to the chain end, as in coordination polymerization, and can therefore be used in a controlled/living polymerization process at sub-stoichiometric amounts relative to the initiator. Nevertheless, as a consequence of radical-radical termination reactions, proceeding with a rate=$k_t$ in Scheme 1, forming $P_n$-$P_m$ dead chains and an excess of X-$M_t^{n+1}$/Ligand.

Examples of the spectrum of new well-defined polymeric materials prepared using ATRP in the past decade include block copolymers, branched polymers, polymeric stars, brushes, and networks, each with pre-determinable site specific functionality as well as hybrids with inorganic materials or bio-conjugates. However, its widespread commercial utilization is still limited. [*Chem. Rev.* 2007, 107, 2270-2299.] Nevertheless, these custom fabricated materials have potential to improve the performance of a multitude of commercial products in the areas of personal care and cosmetics, detergents and surfactants, paints, pigments and coatings, adhesives, thermoplastic elastomers, biocompatible materials and drug delivery systems if a cost effective, environmentally benign, scalable process can be defined.

The initially defined normal ATRP process requires a high catalyst concentration, often approaching 0.1 M in bulk monomer polymerization reactions, typical concentrations range from 0.5% to 1 mol % vs. monomer, [*Handbook of Radical Polymerization*; Wiley Interscience: Hoboken, 2002] to overcome the effects of continuous buildup of ATRP's equivalent of the persistent radical (X-$M_t^{n+1}$/Ligand). [*Journal of the American Chemical Society* 1986, 108, 3925-3927 and *Macromolecules* 1997, 30, 5666-5672.] The high levels of catalyst employed in the initial ATRP reactions, even those involving more active catalyst complexes, were required to overcome the effects of unavoidable increase in the concentration of the higher oxidation state catalyst due to unavoidable radical-radical termination reactions. Since the final reactor product contained between 1,000 and 10,000 ppm of the transition metal complex, the resulting polymer has a strong color and could be mildly toxic. This level of catalyst has to be removed from the final polymer prior to use in most applications. The added production costs associated with adsorption or extraction of the catalyst in addition to isolation and recycle of organic solvents have slowed industrial acceptance of ATRP to produce materials desired by the marketplace. An additional problem of industrial relevance involves the use of the more recently developed highly active (i.e., very reducing) ATRP catalysts. Special handling procedures are often required to remove all oxygen and oxidants from these systems prior to addition of the rapidly oxidizable catalyst complex. The energy used in these purification process(es) and/or the need of rigorously deoxygenated systems contributes to the generation of chemical waste and adds cost. These are the major factors which constrain the commercial application of ATRP.

Recent advances in ATRP by the present inventors in conjunction with one of the inventors of ATRP, K. Matyjaszewski, have been disclosed in patent applications PCT/US2006/048656 published as WO 2007/075817, hereby incorporated by reference including further incorporation of references disclosed therein to define the state of the art in ATRP and definitions for some of the language used herein. In that application it was disclosed that the concentration of the catalyst used for an ATRP can be reduced to 1-100 ppm by addition of a reducing agent, or a free radical initiator, that acts throughout the reaction to continuously regenerate the lower oxidation state activator from accumulating higher oxidation state deactivator, Scheme 2. Some suitable reducing agents listed in incorporated references include; sulfites, bisulfites, thiosulfites, mercaptans, hydroxylamines, amines, hydrazine ($N_2H_4$), phenylhydrazine ($PhNHNH_2$), hydrazones, hydroquinone, food preservatives, flavonoids, beta carotene, vitamin A, α-tocopherols, vitamin E, propyl gallate, octyl gallate, BHA, BHT, propionic acids, ascorbic acid, sorbates, reducing sugars, sugars comprising an aldehyde group, glucose, lactose, fructose, dextrose, potassium tartrate, nitrites, nitrites, dextrin, aldehydes, glycine, and many antioxidants.

Scheme 2. Proposed mechanism for activator regenerated by electron transfer for atom transfer radical polymerization (ARGET ATRP).

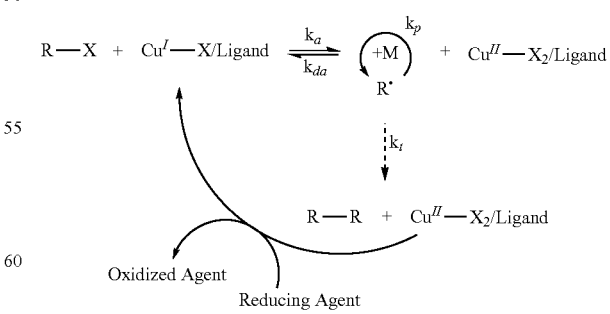

This improvement in ATRP was called ARGET ATRP because the Activator was continuously ReGenerated by Electron Transfer. In Scheme 2 the regeneration is conducted by addition of a reducing agent but the deactivator can also be reduced by addition of a free radical initiator in a process called ICAR (Initiators for Continuous Activator Regeneration) ATRP.

These novel initiation/catalyst reactivation procedures allow a decrease in the amount of catalyst needed to drive a controlled ATRP to high conversion from 10,000 ppm employed in classical ATRP to, in some cases, 10 ppm or less where catalyst removal or recycling would be unwarranted for many industrial applications.

Furthermore ARGET/ICAR ATRP processes can start with the oxidatively stable, easy to handle and store $Cu^{II}$ species, as it is reduced in situ to the $Cu^{I}$ state. Furthermore, the level of control in the disclosed ICAR/ARGET ATRP processes are essentially unaffected by an excess (still small amount compared to initiator) of the reducing agent to continuously regenerate the lower oxidation state activator when/if it is oxidized in the presence of limited amounts of air. [*Langmuir* 2007, 23, 4528-4531.]

Chain-end functionality in a normal ATRP may be lost by a combination of radical-radical termination reactions and by side reactions between growing radicals and the catalyst complex; $Cu^{I}$ (oxidation of radical to carbocation) or $Cu^{II}$ species (reduction of radical to carbanion). Therefore another important feature of the new ARGET/ICAR catalytic systems is the suppression/reduction of side reactions due to the use of a low concentration of the transition metal complex. Reduced catalyst-based side reactions in ICAR and ARGET ATRP allow synthesis of higher molecular weight polymers and polymers with higher chain-end functionality which may allow the preparation of pure, certainly purer, block copolymers.

It was envisioned to be a simple robust procedure.

In application PCT/US2006/048656 the re-activator was added to the reaction in a single addition and control was exerted over the reaction by continuous adjustment of $K_{ATRP}$ in the presence of excess reducing agent. Successful polymerization was achieved on the laboratory scale, 10-50 mL Schlenk flasks, for common monomers such as methyl methacrylate (MMA), butyl acrylate (nBA), styrene (St) and acrylonitrile (AN). The successful synthesis of block copolymers from common monomers such as MMA, nBA, MA and St was reported.

The critical phrase in the above paragraph discloses the scale at which the innovative work to define the improved procedures was conducted: 10-50 mL. When the procedures disclosed in PCT/US2006/048656 were scaled up some critical process disadvantages accompanying the improvements made in application became apparent:

a) slow reactions (especially for methacrylates, styrenes)
b) exothermic process (especially for acrylates) requiring
c) the need of precise temperature control
d) limited information for scale up and automation of process.

Procedures to overcome these limitations, particularly at larger scale, are disclosed herein. Indeed in one embodiment of the invention disclosed controlled radical polymerization processes where the rate of addition of a reducing agent/radical initiator is continuously adjusted allows conversion of monomer to polymer to exceed 80%, preferably exceed 90% and optimally exceed 95%.

SUMMARY OF INVENTION

One embodiment of the polymerization processes of the present invention are directed to polymerizing free radically polymerizable monomers in the presence of a polymerization medium initially comprising at least one transition metal catalyst and an atom transfer radical polymerization initiator. The polymerization medium may additionally comprise a reducing agent or a radical initiator. Sufficient ligand should be added to the reaction medium to modify solubility and activity of the transition metal catalyst. The one or more reducing agents or radical initiators may be added initially or during the polymerization process in a continuous or intermittent manner or activated in an intermittent manner. The polymerization process may further comprise reacting the reducing agent with at least one of the transition metal catalyst in an oxidized state further comprising a radically transferable atom or group to form a compound that does not participate significantly in control of the polymerization process. A transition metal in the zero oxidation state can be employed as a reducing agent.

Another embodiment of the disclosed process is directed towards continuous control over the concentration of the persistent radical in a NMP. In this embodiment the rate of decomposition of the initiator added continuously or intermittently to the reaction is selected to match the rate of radical/radical termination reactions that would otherwise build up the concentration of the stable free radical and reduce the rate of propagation.

A further embodiment of the disclosed process concerns RAFT polymerizations. In a RAFT polymerization the rate of polymerization is controlled by the rate of decomposition of the added initiator. Normally all of the initiator is added to the reaction at the beginning of the reaction and this could lead to an increased rate of initiator decomposition if the temperature of the reaction is not well controlled throughout the polymerization vessel during each stage of the reaction. As noted for ICAR ATRP continuous addition of the initiator and monitoring of the temperature of the reaction provides information on, if and when addition of the initiator should be stopped in order to retain control over the reaction.

Embodiments of the polymerization process of the present invention include bulk polymerization processes, polymerization processes performed in a solvent, polymerization processes conducted from solid surfaces, biphasic polymerization process including emulsion polymerization processes, mini-emulsion polymerization processes, microemulsion processes, reverse emulsion polymerization processes, and suspension polymerization processes. In such biphasic polymerization processes the polymerization processes may further comprise at least one of a suspending medium, a surfactant or reactive surfactant, and a monomer phase comprising at least a portion of the radically polymerizable monomers.

It must be noted that, as used in this specification and the appended claims, the singular forms "a," "and," and "the" include plural referents unless the context clearly dictates otherwise. Thus, for example, reference to "a polymer" may include more than one polymer or copolymers.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

It is to be understood that this invention is not limited to specific compositions, components or process steps disclosed herein, as such may vary. It is also to be understood that the terminology used herein is for the purpose of describing particular embodiments only, and is not intended to be limiting.

This disclosed procedures provide a means to optimize and automate the polymerization processes by exercising continuous control over the ratio of activator/deactivator, concentration of persistent radical or concentration of initiator present in a CRP.

The advantages of the disclosed 'starve feeding/activation' method include:
 a) use of lower amounts of catalyst and radical initiator or reducing agent,
 b) reduced need for precise temperature control,
 c) higher reaction temperature, which allows higher conversions in a shorter time with reduced amounts of solvents,
 d) the potential for automation of the whole process, and
 e) the development of safe scalable processes for exothermic polymerization reactions, although heat removal is still a requirement.

The resulting expansion of the utilization of the proposed system for CRP will allow a reduced cost for purification of the products, a significant decrease in waste and improve safety by providing an additional means to control reaction temperature. Furthermore the rate of addition of a reducing agent/radical initiator can be continuously adjusted to allow the conversion of monomer to polymer to exceed 80%, preferably exceed 90% and optimally exceed 95% by taking into consideration the viscosity of the reaction medium and the rate of diffusion of the added reducing agent.

In the following examples, and discussion of examples, ATRP is employed as an exemplary CRP but the disclosed procedures can be applied to NMP and RAFT as indicated above.

BRIEF DESCRIPTION OF THE FIGURES

The following figures exemplify aspects of the disclosed process but do not limit the scope of the process to the examples discussed.

FIG. 9. Polymerization of MMA targeting low degree of polymerization, wherein:
FIG. 9A is the kinetic plot;
FIG. 9B shows the molecular weight and PDI vs. conversion;
and
 FIG. 9C GPC traces for ICAR ATRP of MMA with feeding of AIBN (experiment 08-006-165). Conditions: MMA/DEBMM/CuBr$_2$/TPMA/AIBN=100/1/0.005/0.025/- ; in bulk [MMA]=8.9 mol/L, 50 ppm of Cu, T=90° C. Feeding rate slow: 0.002 mol equivalent of AIBN vs. DEBMM in 1 h (AIBN in 40 ml of solvent to 850 ml of the reaction solution).

FIG. 10. Polymerization of MMA targeting high degree of polymerization, wherein:
 FIG. 10A is a kinetic plot,
 FIG. 10B shows the molecular weight and PDI vs. conversion; and
 FIG. 10C GPC trace for ICAR ATRP of MMA with feeding of V-70 (experiment 08-006-180). Conditions: MMA/DEBMM/CuBr$_2$/TPMA/V-70=1000/1/0.05/0.1/- ; in bulk [MMA]=8.9 mol/L, 50 ppm of Cu, T=80° C. Feeding rate slow: 0.004 mol equivalent of V-70 vs. DEBMM in 1 h (V-70 in 40 ml of solvent to 850 ml of the reaction solution).

FIG. 11. Computer simulation of polymerization of n-butyl acrylate, wherein:
 FIGS. 11A-C) are with feeding of AIBN; and
 FIGS. 11D-F) are without feeding of AIBN. Conditions for ICAR ATRP of nBA with feeding of AIBN: nBA/DEBMM/CuBr$_2$/TPMA/AIBN=100/1/0.005/0.005/-; in bulk [nBA]=7.0 mol/L, 50 ppm of Cu, T=90° C. Feeding rate fast: 0.03 mol equivalent of AIBN vs. DEBMM in 6 h (AIBN in 90 ml of solvent to 1 L of the reaction solution). Comments: simulated polymerization reached 99.2% conversion in 1.7 h (PDI=1.13; chain-end functionality=99%); there is a short indiction period but reaction was very fast and well controlles; amount of AIBN added after 1.7 h was 0.0086 mol equivalents vs. initiator.

Conditions for ICAR ATRP of nBA without feeding of AIBN: nBA/DEBMM/CuBr$_2$/TPMA/AIBN=100/1/0.005/0.005/0.03; in bulk [nBA]=7.0 mol/L, 50 ppm of Cu, T=90° C. Comments: simulated polymerization reached 99.2% conversion in 28 minutes (PDI=1.38; chain-end functionality = 99%); polymerization was extremely fast and resulted in polymer with relatively broad molecular weight distribution (PDI=1.6-2.2 for lower conversions).

Figure 13:
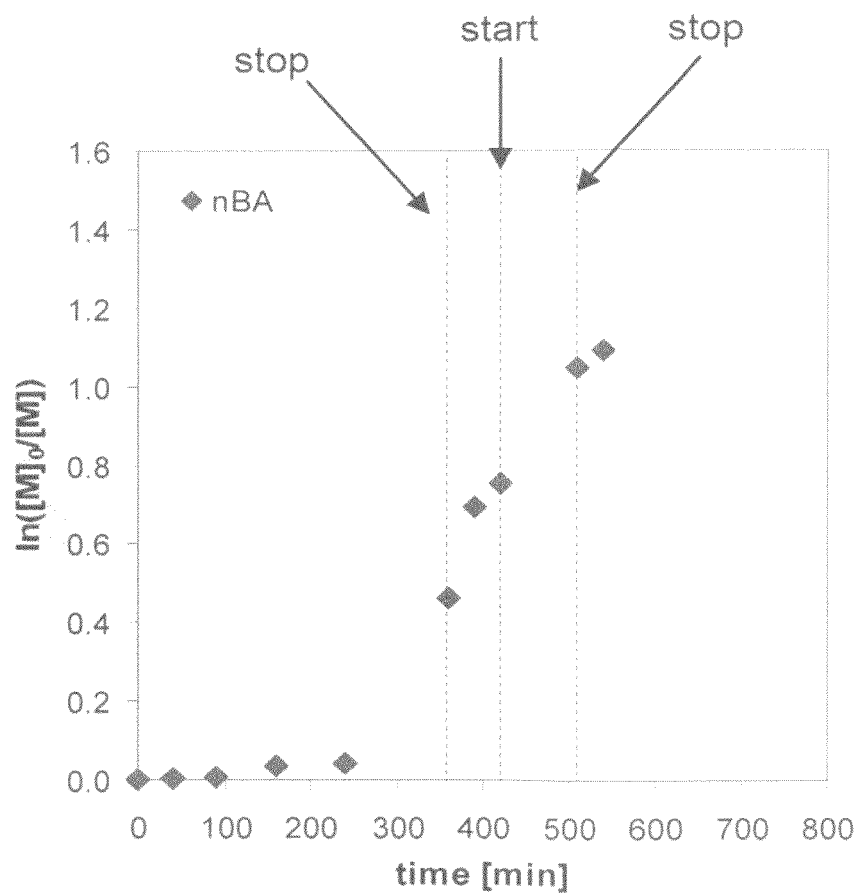
Figure 13:
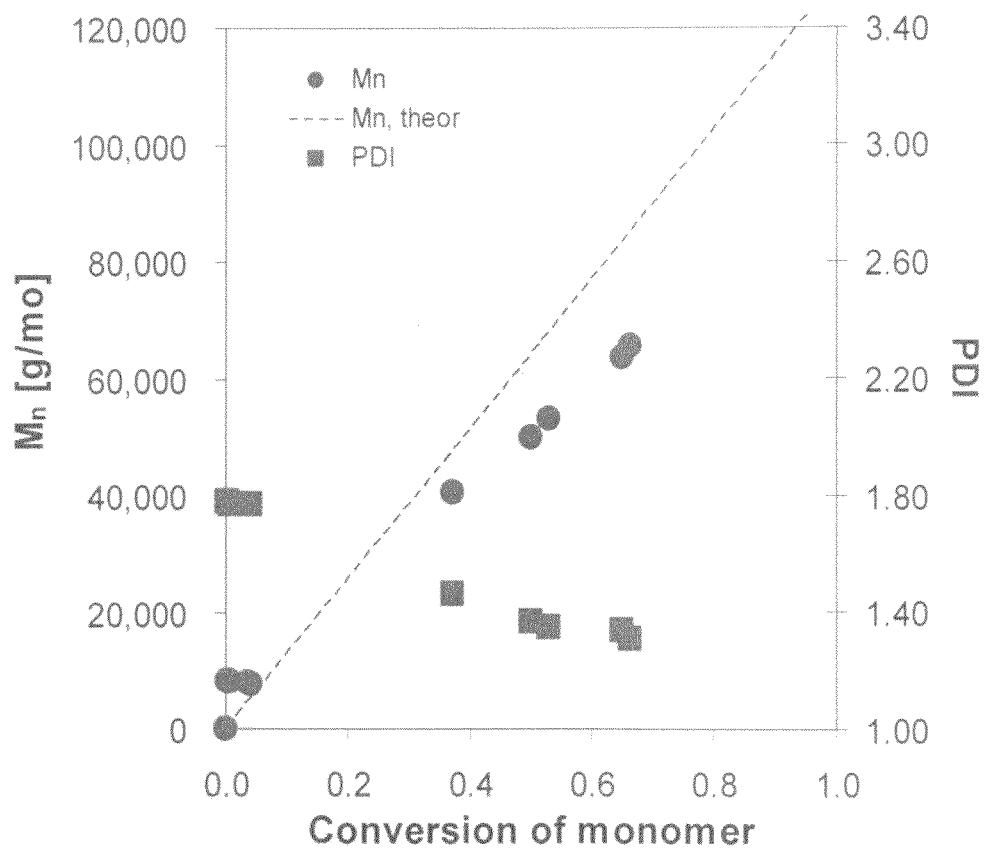
Figure 13:
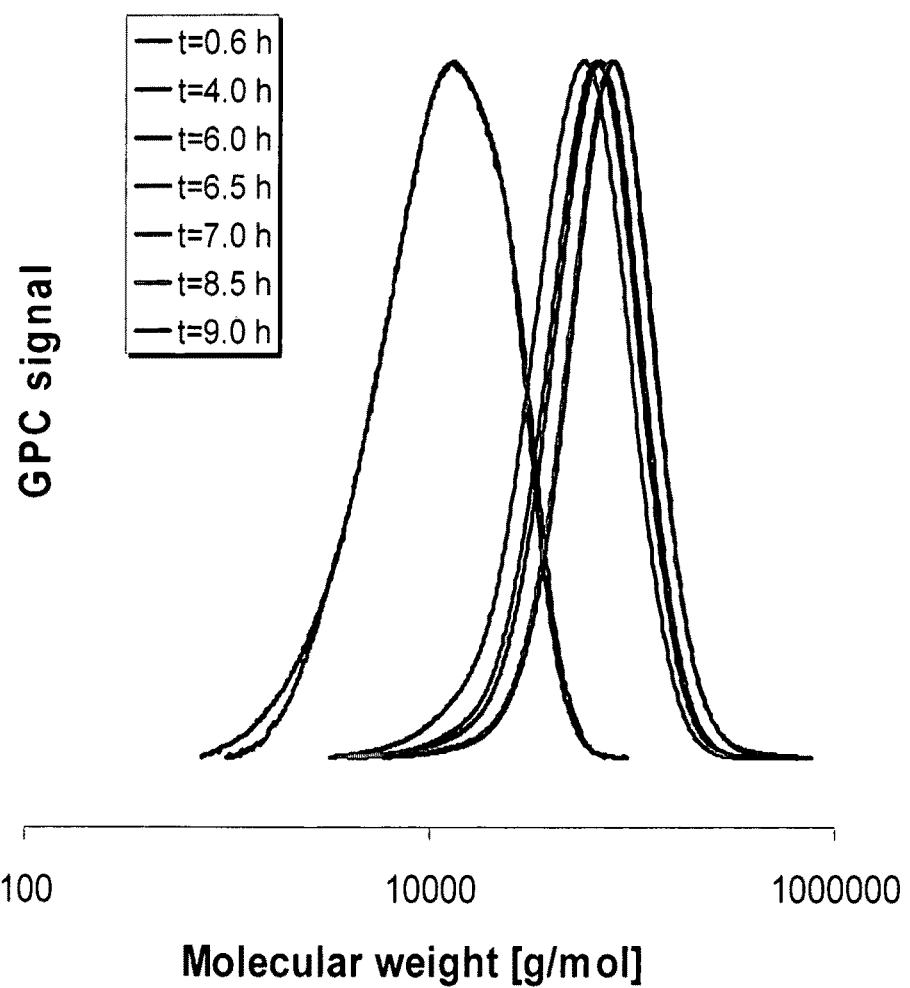
Figure 14:
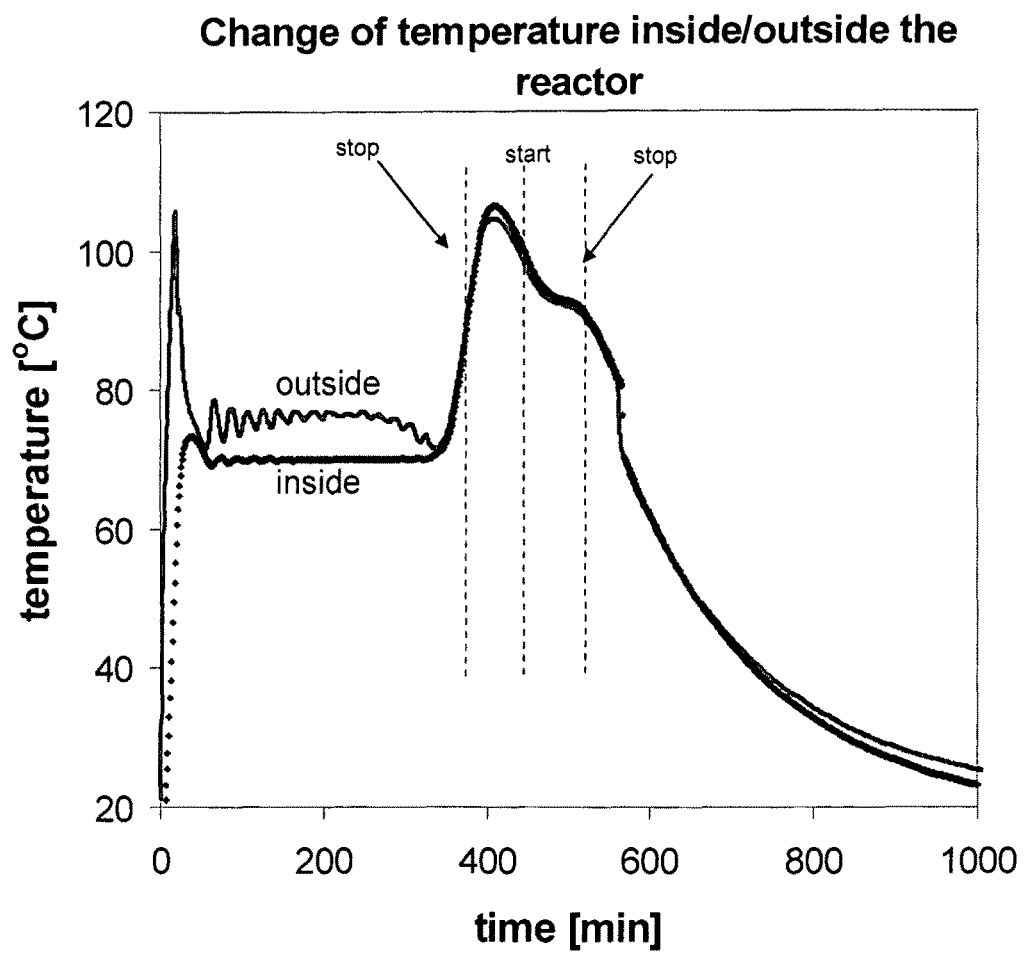
Figure 15:
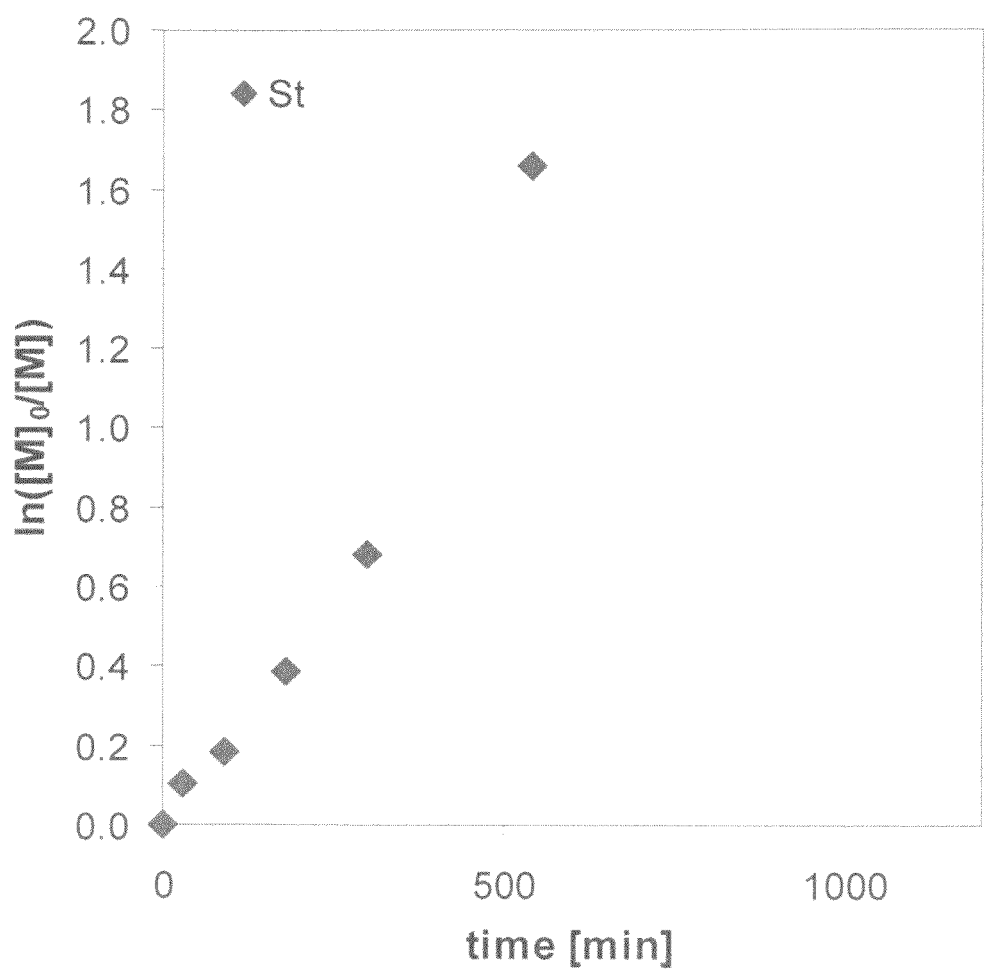
Figure 15:
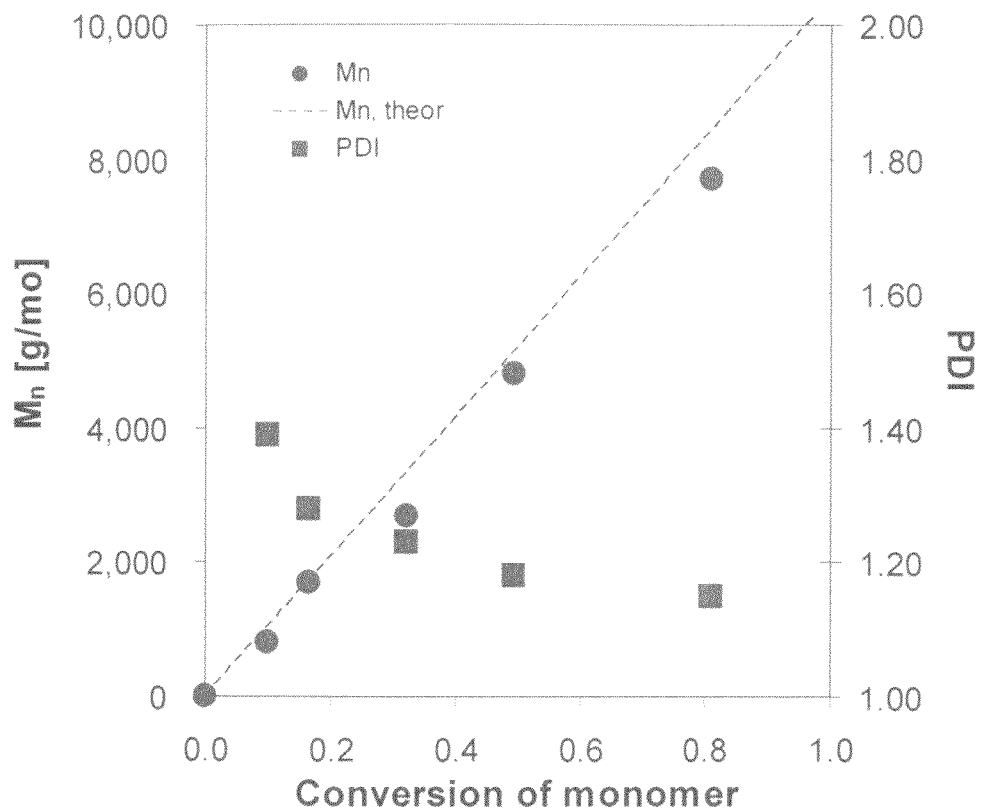
Figure 15:
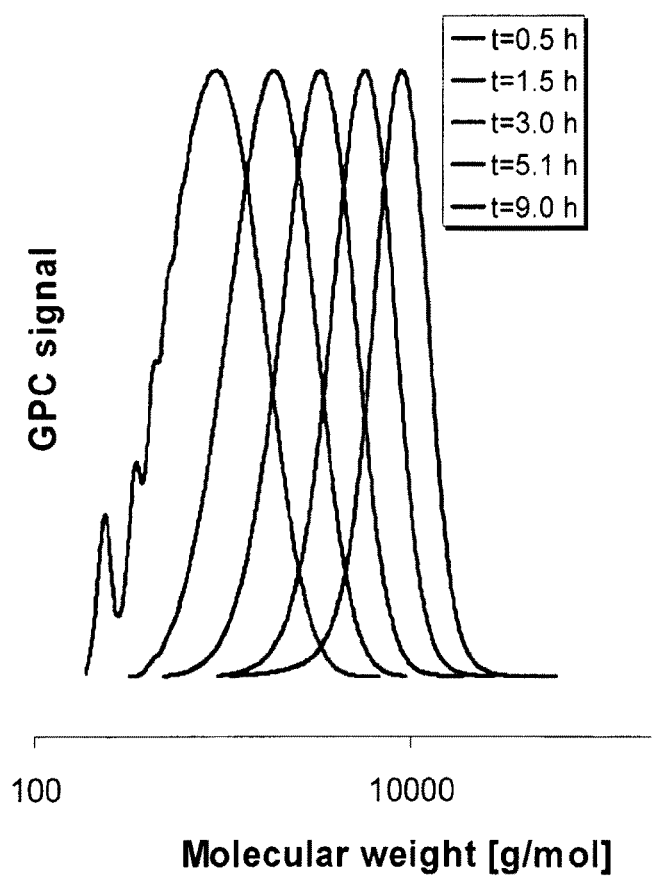

FIG. 12A. Kinetics plot for example 2A.
FIG. 12B. Molecular weight and PDI vs. conversion for example 2A.
FIG. 12C. GPC curves for example 2A.
FIG. 12D. Temperature profile for example 2A.
FIG. 13A. Kinetics plot for example 2B.
FIG. 13B. Molecular weight and PDI vs. conversion for example 2B.
FIG. 13C. GPC curves for example 2B.
FIG. 14. Temperature profile for run 08-006-194
FIG. 15. ICAR polymerization of styrene, wherein:
 FIG. 15A. is the kinetic plot,
 FIG. 15B. shows the molecular weight and the PDI vs. conversion; and FIG. 15C. is the GPC traces for ICAR ATRP of St with feeding of AIBN (experiment 08-006-192). Conditions: St/DEBMM/CuBr$_2$/TPMA/AIBN 100/1/0.005/0.1/0.005; in bulk [St]=8.31 mol/L, 50 ppm of Cu, T=100° C. Feeding rate slow: 0.008 mol equivalent of AIBN vs. DEBMM in 1 h (AIBN in 40 ml of solvent to 850 ml of the reaction solution).

Figure 16:
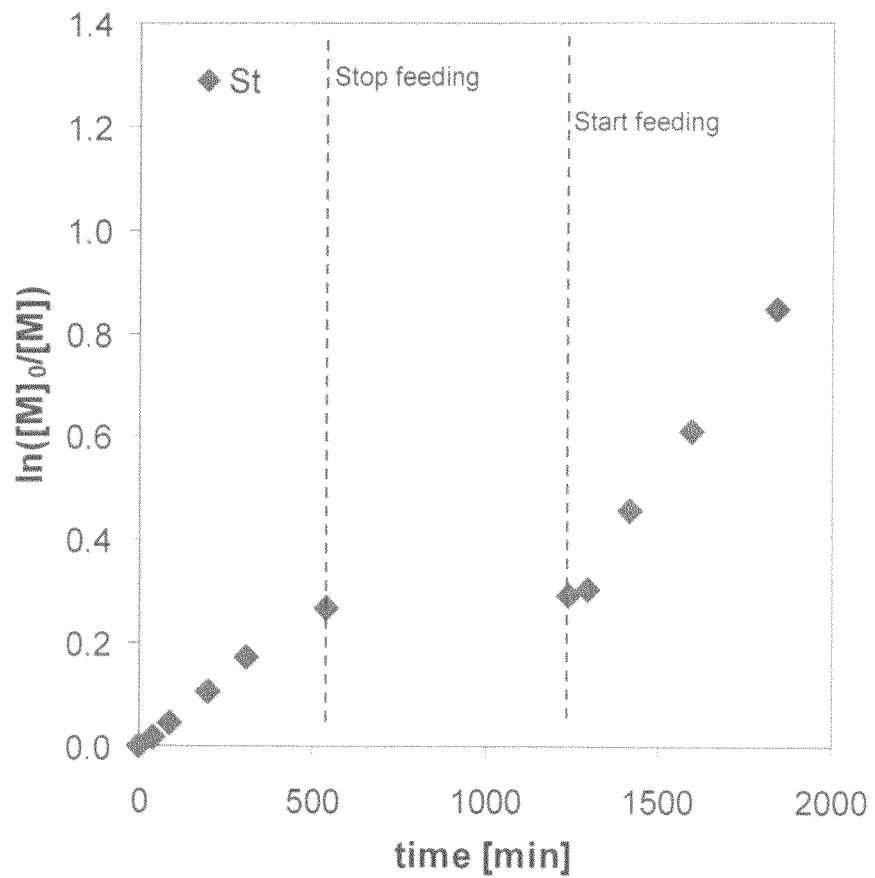
Figure 16:
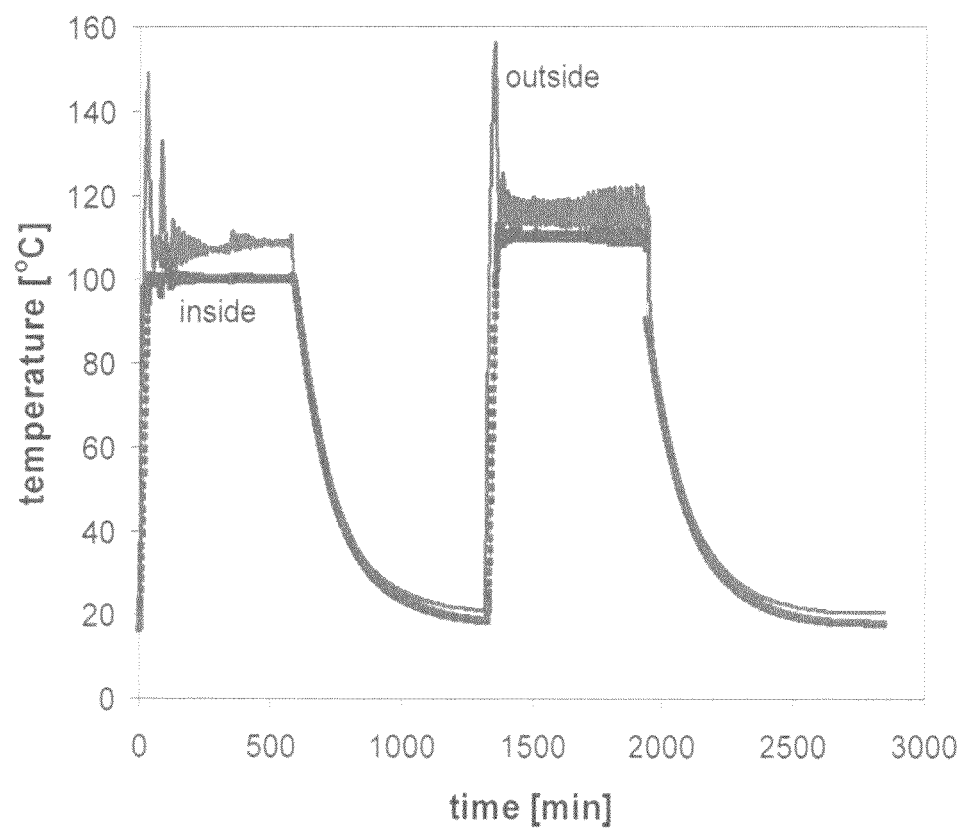

FIG. 16. Polymerization of St (high DP). Automation of process. ICAR ATRP of St with feeding of AIBN (experiment 08-006-193), wherein:

FIG. 16A is the molecular weight and PDI vs. conversion; and

FIG. 16B is the temperature profile. Conditions: St/DEBMM/CuBr$_2$/TPMA/AIBN 1000/1/0.05/0.15/0.025; in bulk [St]=8.31 mol/L. 50 ppm of Cu. T=100-110° C. Feeding rate slow: 0.008 mol equivalent of AIBN vs. DEBMM in 1 h (AIBN in 40 ml of solvent to 850 ml of the reaction solution).

Figure 17:
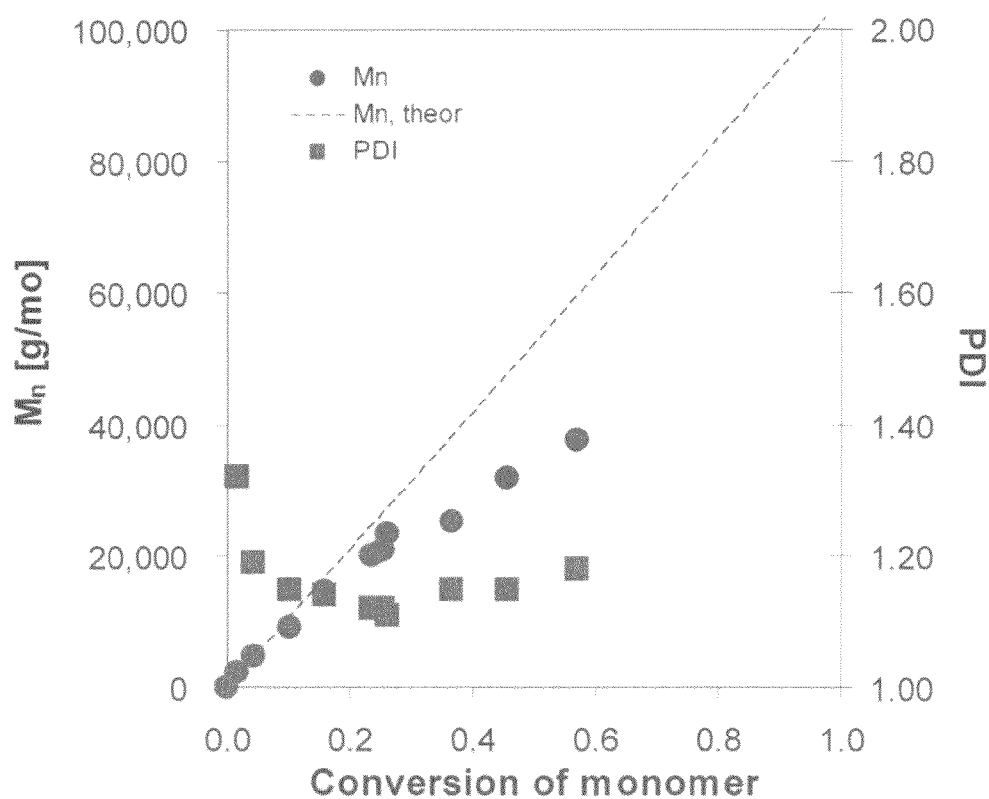
Figure 17:
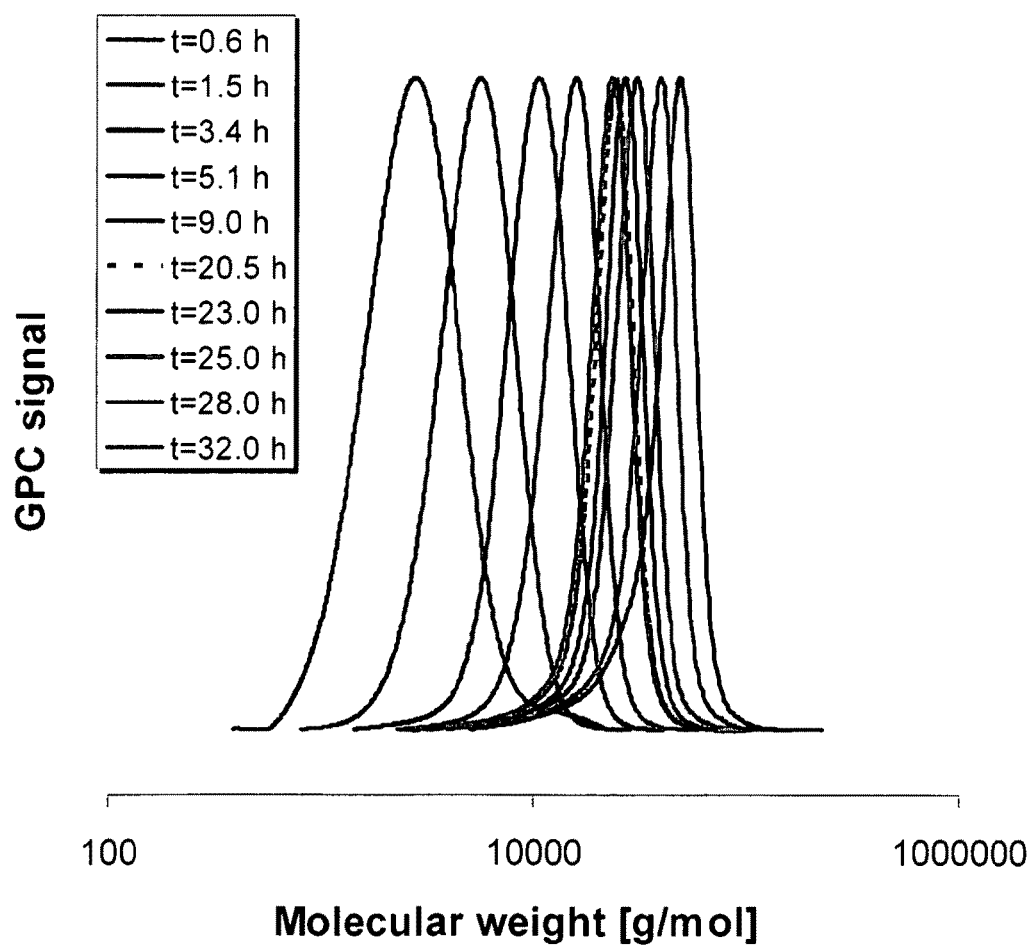

FIG. 17. Kinetics for ICAR ATRP of St with feeding of AIBN (experiment 08-006-193) targeting high DP, wherein:

FIG. 17A is the molecular weight and PIN vs. conversion; and

FIG. 17B is the GPC curves. Conditions: St/DEBMM/CuBr$_2$/TPMA/AIBN=1000/1/0.05/0.15/0.025; in bulk [St]=8.31 mol/L. 50 ppm of Cu, T=100-110° C. Feeding rate slow: 0.008 mol equivalent of AIBN vs. DEBMM in 1 h (AIBN in 40 ml of solvent to 850 ml of the reaction solution).

DESCRIPTION OF EMBODIMENTS OF THE INVENTION

Figure 1:
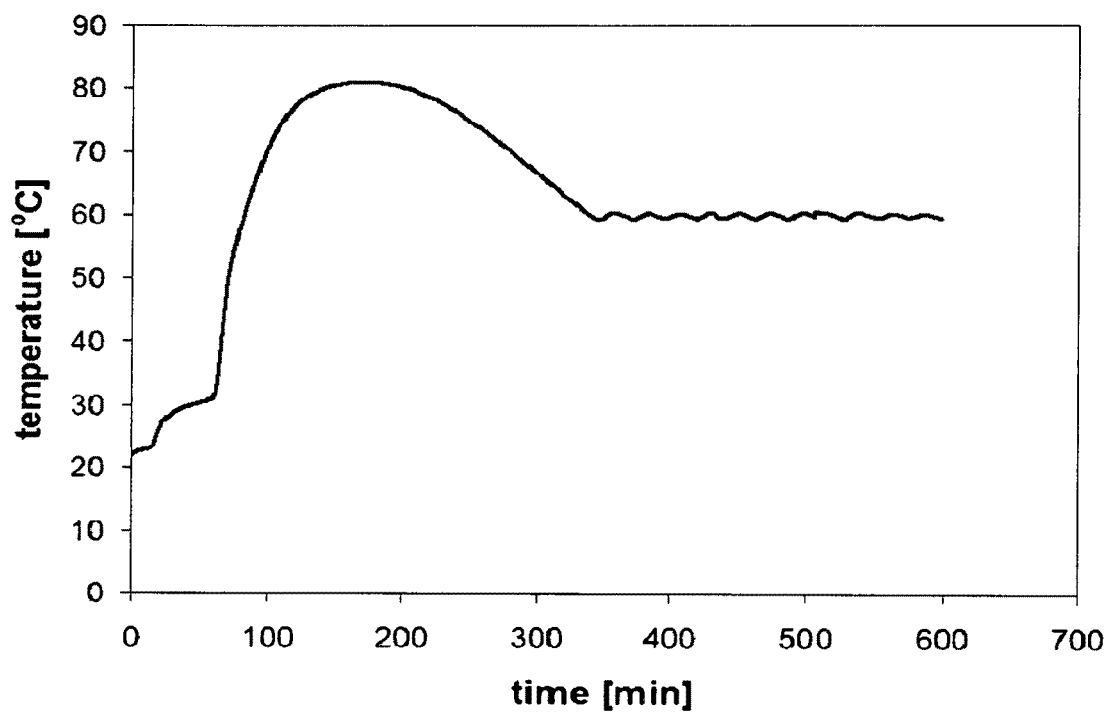
FIG. 1. Variation of temperature inside a 1 L batch reactor during ARGET ATRP of nBA. Experimental conditions: nBA/DEBMM/CuBr$_2$/TPMA/Sn(EH)$_2$=500/1/0.025/0.1/0.1, in bulk at 60° C.

As noted above even though ICAR and ARGET ATRP were successfully applied to the preparation of polymeric materials on the laboratory scale, unexpected problems were encountered when larger scale synthesis were conducted. These problems are exemplified by the following discussion involving scaling-up the ICAR system but are also relevant for ARGET ATRP, RAFT and NMP systems.

a) Precise temperature control throughout the reaction medium is required—if this is not achieved, an increase in temperature will cause the radical initiator which is present in the system to decompose at a faster rate and reduce all $Cu^{II}$ to $Cu^{I}$ species. The loss of $Cu^{II}$ deactivator from the system results in an uncontrolled polymerization in addition to a temperature exotherm. Moreover control over temperature in an exothermic polymerization reaction is challenging in large scale polymerization procedures due to inefficiencies in heat transfer processes in increasingly viscous media. In standard free radical polymerization systems viscous polymer solutions can lead to the Trommsdorf effect.

b) FIG. 1 presents a temperature profile that follows the reaction temperature during the polymerization of nBA using ARGET ATRP on a 1 liter scale. The stirred reaction mixture was heated to 60° C., but due to the exothermic polymerization process the temperature inside the flask increased above 80° C. The polymerization was not well controlled due to overheating. This indicates that the use of internal cooling (e.g., a cooling coil) may not be efficient enough to uniformly keep the temperature within a 2-3° C. temperature range.

c) Long reaction times:—due to lower temperatures used in the publications discussing ICAR/ARGET, and other CRP systems. Lower temperatures are targeted to allow a slow generation of radicals (ICAR) or slow reaction of the added reducing agent with the $Cu^{II}$ complex that had been added at the beginning of the reaction resulting in reaction times that are longer than desired for an economic industrial process.

d) Lower temperatures also increase the viscosity of the system and limit the range of monomers that can be polymerized to high conversion, for example monomers that form polymers with a glass transition temperature, Tg, close to or below the reaction temperature reach a glassy state at high conversion and control is lost e) Lack of easy automation of the whole process—as FIG. 1 illustrates there is no easy way to automate the ICAR/ARGET ATRP with the current experimental setup and the presence of an excess of radical initiator requires good temperature control.

f) Although small amounts of catalyst and radical initiator (or reducing agent) are used, a further reduction of the amount of copper catalyst and radical initiator is still desired.

g) Limited accessible molecular weights (MW) of the polymer. For many applications, it is essential to prepare high MW polymers; i.e., polymers with segments above the chain entanglement MW, therefore it is very important to minimize the effect of "side" reactions between the growing radicals and the catalyst that limit the attainable MW. ARGET and ICAR techniques can partially solve this problem due to the use of low catalyst concentration but the problems noted above with side reactions associated with transition metal, ligand and reducing agent have to be resolved by further reducing the concentration of one or more of the reagents.

The new disclosed method will alleviate/resolve all of the above stated limitations.

The new method relies on precise continuous control of the $Cu^{II}/Cu^{I}$ ratio during an ICAR/ARGET ATRP, or instantaneous concentration of radicals in RAFT polymerization, or targeted concentration of the persistent radical present in an NMP process, by feeding a radical initiator (or reducing agent) to the polymerization mixture at a controlled rate and optionally using multiple addition ports to evenly distribute the agent throughout the whole reaction medium. Feeding should occur at a such a rate that the amount of radical initiator (or reducing agent) added or generated can properly compensate for all the termination reactions that had occurred since the last addition and convert only the appropriate amount of $Cu^{II}$ to $Cu^{I}$ (Scheme 3a). Therefore, the amount of added radical initiator, or reducing agent, at any time of feeding should approximately equal to the number of terminated chains (Scheme 3b) formed since the previous addition.

Scheme 3 a) Equation used to calculate the number of terminated chains.

a) $-\Delta[Cu^{I}] = \Delta[P_t] = k_t[P^{\bullet}]^2 t = Slope \bullet k_t lk_p^2$ Scheme 3 b) Schematic showing the requirements for controlled atom transfer radical polymerization under starved feeding conditions of reducing agent or radical initiator.

b)

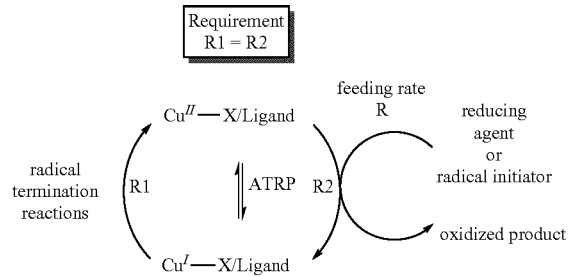

As disclosed herein if the initiator or reducing agents are slowly added throughout the reaction the amount of "excess" activator is controlled and any increase in the rate of decomposition or reduction is avoided. If the reaction temperature should rise stopping addition eventually stops the reaction. Suitable reducing agents are disclosed in incorporated references.

In contrast to the present ARGET and ICAR procedures the amount of initiator added in a single addition should be less than the stoichiometric amount required to reduce all of $Cu^{II}$ present in the reactor to $Cu^I$. This will be accomplished by the presence, or activation, of a very small amount of residual initiator (or reducing agent) in the reactor at any time. The amount of initiator fed to the reactor, or generated, should match the amount of termination that occurs since the previous addition/activation. If temperature would locally increase, due to a poor heat exchange or local overheating, the excess reduction of $Cu^{II}$ to $Cu^I$ is thereby easily contained and limited to only the amount of initiator locally present in the reaction medium. Thus, instead of adding the entire amount initiator/reducing agent at the beginning of the reaction and counting on fortuitous control over the rate of decomposition of the initiator to maintain control, only as much reducing agent/initiator as needed will be fed to the system, or instantaneously generated, during the entire process while limiting the effect of temperature fluctuations on the rate of reduction of $Cu^{II}$ to $Cu^I$.

If such conditions are fulfilled, 'starving conditions' for reducing agent or radical initiator during polymerization process will be achieved and will result in the desired ~constant $Cu^{II}$ to $Cu^I$ ratio. A sufficiently high amount of $Cu^{II}$ is a requirement for production of (co)polymers with narrow molecular weight distribution in a controlled ATRP process, equation 1.

$$\frac{M_w}{M_n} = 1 + \frac{1}{DP_n} + \left(\frac{[R-X]_o k_p}{k_{da}[X-Cu^{II}]}\right)\left(\frac{2}{p}-1\right) \quad 1$$

In one embodiment of the process after the desired ratio of $Cu^{II}/Cu^I$ is attained only a very small amount of radical initiator (or reducing agent) will be instantaneously present in any volume fraction of the polymerization system. As a result, the ratio of $Cu^{II}/Cu^I$ will be kept within the appropriate range to produce polymers with narrow molecular weight distribution, equation 1.

Several advantages accrue from the new 'feeding' method as a result of keeping the instantaneous concentration of radical initiator (or other reducing agent) very low in the polymerization system.
a) No need of precise temperature control—the only requirement will be to keep the temperature high enough to quickly decompose the added radical initiator, while still allowing sufficient time for distribution of the initiator throughout the targeted volume of the reaction mixture after addition. Multiple addition ports can be used for larger scale industrial equipment to minimize the time required for diffusion of the activator to all parts of the reaction medium or only sufficient light to decompose the required amount of photo-responsive initiators is pulsed into the reactor.
b) Safe process for exothermic reactions—the effect of an exothermic reaction will be diminished by very low instantaneous concentration of radical initiator (or reducing agent) since the added tiny amount of initiator/reducing reagent cannot overwhelm the excess $Cu^{II}$ present in the reactor. This means that in the absence of added initiator/activator only a controlled ATRP reaction can occur and this reaction will slow down if an increased concentration of $Cu^{II}$ is generated by termination reactions since excess $Cu^{II}$ acts to increase the rate of deactivation of any growing radical chains.
c) Shorter reaction times—due to the use of higher reaction temperatures, reactions can be much faster since the rate constant of propagation increases with temperature much more than that of termination thereby retaining a high mole fraction of "living" chains. Higher reaction temperature also results in lower viscosity systems at any particular conversion and hence the reaction can be driven to higher conversion as well as preparation of higher molecular weight polymers. The conversion of monomer to polymer can therefore exceed 80%, preferably exceed 90% and optimally exceed 95%.
d) Full automation possible—as only tiny amounts of radical initiator (or reducing agent) are present at any instant in the polymerization medium, the reaction should stop as soon as feeding/activation is stopped. Thus, the rate of polymerization is controlled by the rate of generation of radicals by decomposition of the radical initiator (or by the concentration of reducing agent) and is stopped in any emergency conditions simply by incorporating a feedback loop that stops addition of radical initiator, reducing agent or activation of an added photo-responsive initiator.
e) Continuous feeding of initiator/reducing agent in order to minimize steady state residual concentration of the radical initiator thereby reducing initiator based side reactions.
f) Lower amounts of transition metal and ligand are required in the reaction. An excess of ligand is normally used in ARGET and ICAR polymerizations to counteract possibility of formation of a monomer/transition metal complex.
g) Possible control over PDI by increasing the $Cu^I/Cu^{II}$ ratio and $k_p$, which depends on monomer type and temperature.
h) One pot synthesis of block copolymers since higher chain end functionality is retained.

Abbreviations Used in the Following Examples:
ATRP atom transfer radical polymerization
ARGET activator regenerated by electron transfer
ICAR initiator for continuous activator regeneration
DEBMM diethyl 2-bromo-2-methylmalonate
BrPN 2-bromopropionitrile
TPMA tris(2-pyridylmethyl)amine
AIBN 2,2'-azobis(2-methylpropionitrile)
V-70 2,2'-azobis(4-methoxy-2.4-dimethyl valeronitrile)

EXAMPLES AND DISCUSSION OF EXAMPLES

During the initial attempts to scale up ARGET/ICAR ATRP detailed below it became clear that the number of variables that have to be controlled are significantly greater than initially expected as the scale of the reactions was increased. Therefore in order to define optimal polymerization conditions for the new 'feeding' methods for ICAR ATRP, it was crucial to generate a set of parameters for the feeding rate of radical initiator that takes into account the specific type of monomer, reaction temperature, type of radical initiator, concentrations and ratios of all reagents, etc. Kinetic modeling was conducted to select initial conditions to reach synthetic targets and understand factors affecting control under many different conditions. In addition, some additional parameters such as rate of diffusion of the initiator fed to the solution, heat transfer related to the reactor design, viscosity of polymer solution at know conversion and others were taken into account.

The potential starting points generated by computer modeling of the critical process factors were investigated by performing experiments on 1 L scale with a single source of added reducing agent. All of these factors were carefully studied to achieve good control over the polymerization process and to provide the kinetic data required for further scale up to industrial scale equipment.

Computer Simulations

The synthetic conditions of the new 'feeding' method for ICAR ATRP were modeled via computer. Comparable software has been successfully applied to many polymerization systems including normal and ICAR ATRP [*Macromolecules* 2007, 40, 6464-6472.] and allows precise calculation of the concentration of all species (including intermediates) in a reaction versus time or conversion. It also permits one to estimate the molecular weight distributions of all polymeric species. All required parameters such as rate constants, initial concentrations of all reactant and the rate of feeding of radical initiator are entered in the workshop assistant of the software. Computer simulations are simple to perform and can be completed in a short period of time, thus a broad range of different variables can be studied to optimize the new 'feeding' method for an exemplary ICAR ATRP. Typical variations for specific monomers are discussed below. In ICAR it is crucial to correlate feeding/generation rate of the radical initiator (RI) with other parameters (temperature, type of radical initiator, etc.) in order to obtain good control over the polymerization process.

Computer Simulations for Polymerization of Methyl Methacrylate

Figure 2:
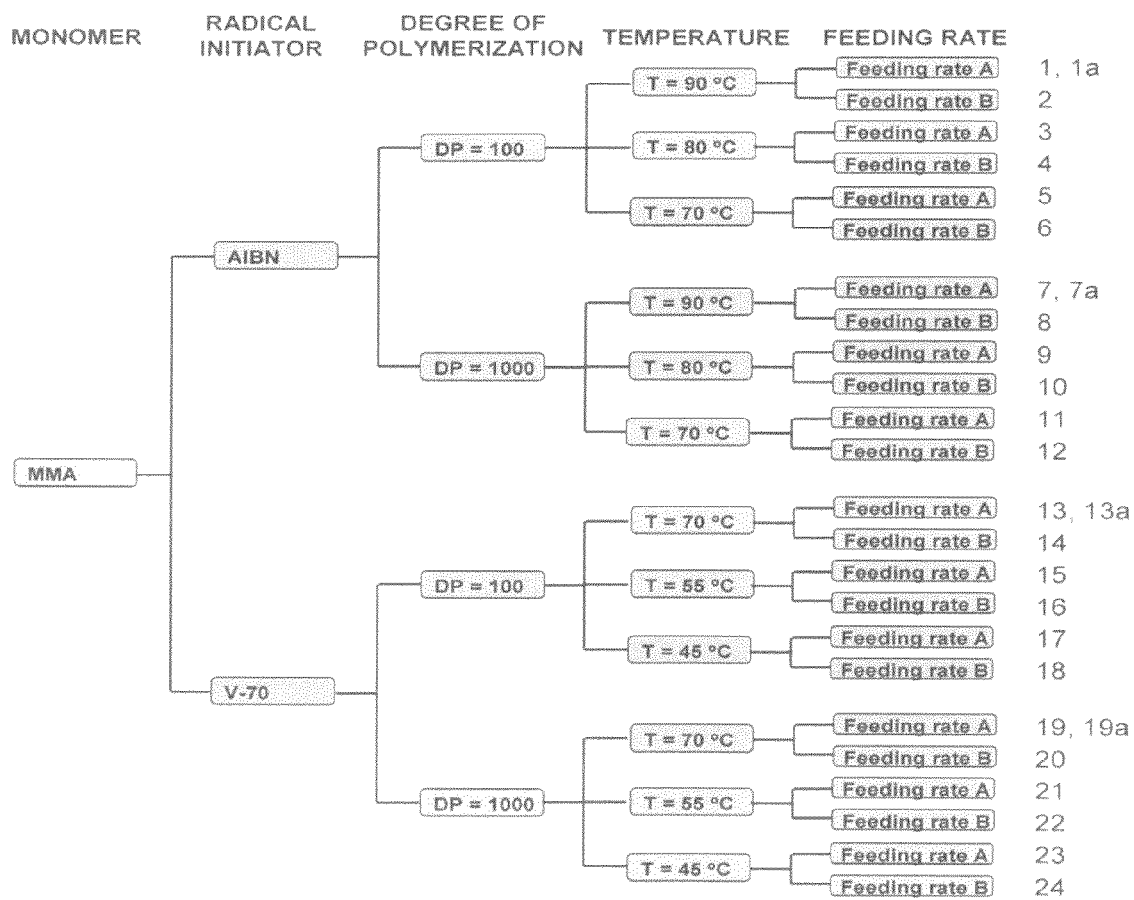
FIG. 2. Parameters employed for the computer simulation of the polymerization of MMA under a series of reaction conditions. The purpose: to find optimal conditions for new feeding method. Results: models were built and successful simulations were performed and optimal conditions were found. Concerns: heat transfer, side reactions, catalyst stability, etc. not taken into account.

FIG. 2 shows the initial set of parameters used for computer simulations conducted for polymerization of MMA with continuous feeding of two different radical initiators at a series of temperatures targeting different DP. Preliminary results from initial simulation of the proposed method suggested that this approach to process condition evaluation is possible.

The general ratio of reagents for one exemplary non-limiting example of the new 'feeding' method for ICAR ATRP with 50 ppm amount of Cu was: M/R-X/CuBr$_2$/ligand/RI=X/1/0.01/0.01/0.05 in bulk at temperature T (where M—monomer, R-X—alkyl halide initiator, RI—radical initiator, X=100, 500). Commercially available tris(2-pyridylmethyl)amine (TPMA) was used as the initial exemplary ligand and diethyl 2-bromo-2-methylmalonate (DEBMM) was used as an exemplary alkyl halide initiator in the polymerization systems. Other catalysts and initiators were also evaluated. The RI was fed to the reaction medium at two different rates and the targeted reaction time was set for either 6 or 24 hours.

Therefore the initial set of simulations for polymerization of MMA using the new 'feeding' method were conducted with 50 ppm amount of Cu and the ratio of reagents: MMA/DEBMM/Cu$^{II}$Br$_2$/TPMA/RI=X/1/0.01/0.01/0.05 in bulk. Two different radical initiators were used, 2,2'-azobis(2-methylpropionitrile) (AIBN), with a 10 hour half-life decomposition temperature at 65° C.) and 2,2'-Azobis(4-methoxy-2.4-dimethyl valeronitrile) (V-70), with a 10 hour half-life decomposition temperature at 30° C.). Different temperatures were applied for polymerizations with AIBN (70, 80, 90° C.) and V-70 (45, 55, 70° C.) as radical initiators. They provide half-life decomposition times of 300, 70, 20 minutes, and 60, 15, 3 minutes, correspondingly. Two different degrees of polymerizations will be chosen (DP=X=100, 1000) in order to cover a typical range of molecular weights accessible with the new method. The feeding rate of the radical initiator will be set for 6 and 24 h as a final time.

The overall volume of the solution of radical initiator that was fed to the reaction was less than 10% versus volume of monomer (reaction volume), i.e., while dilute solutions of the initiator were added the total added solvent will be within limits associated with "monomer" removal from a bulk polymerization. The final objective was to provide conditions for polymerization of a range of methacrylate monomers.

It is expected that a broad range of type I and type II photoinitiators can be employed and simulations will examine the effects of the rate/intensity of stimulation.

Other simulations designed to provide starting conditions for polymerization reactions examined periodic addition/formation of radical initiators or reducing agents for transition metal complexes studied a range of parameters including:

type of monomer (different rate constants of propagation and termination as well as activation and deactivation will be applied to different types of monomers and catalysts). Styrene, n-butyl acrylate and methyl methacrylate were the initial three exemplary monomers as they cover the three largest classes of radically polymerizable monomers.

Type of radical initiator (different rate constants of decompositions, also depending on temperature).

Type of catalyst (different rate constants of activation and deactivation).

Degree of polymerization (DP) (both low and high MW).

Temperature (change of decomposition rates of radical initiator and all other rate constants).

Rate and method of feeding for the radical initiator/activator (slow, fast and periodical).

Other parameters such as ratios and concentrations of reagents were initially kept constant but later were also varied in order to minimize the amount of copper and initiator and optimize polymerization rate.

Figure 3:
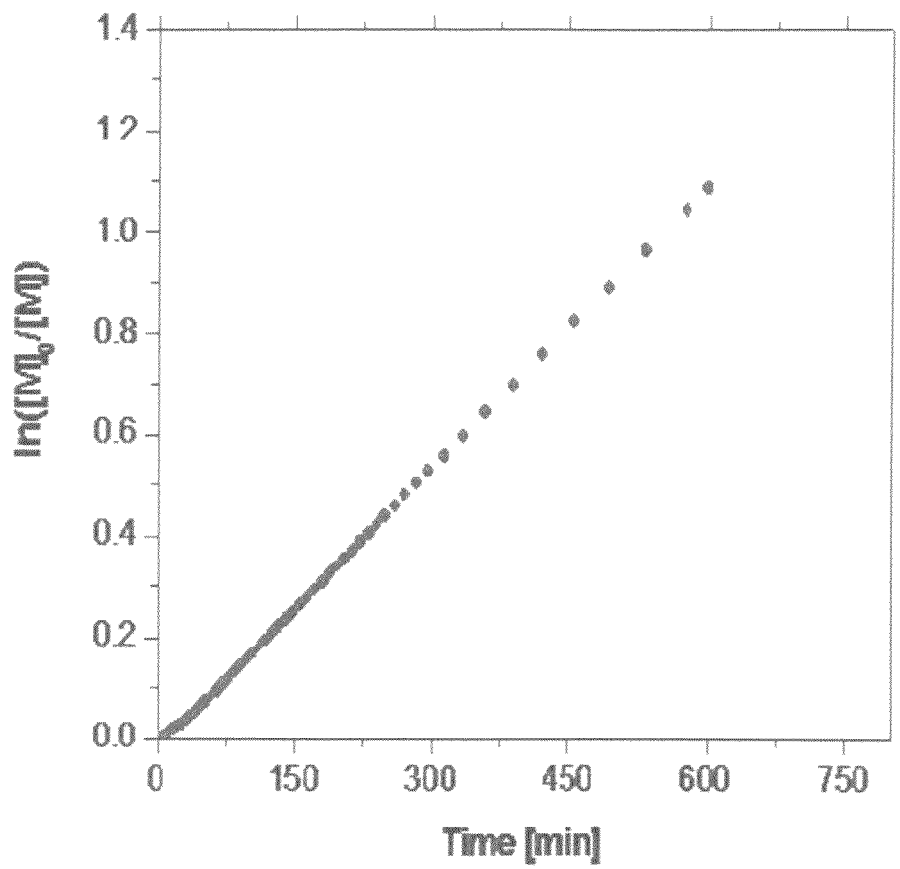
FIG. 3A Simulated kinetics plot.
FIG. 3B Simulated molecular weight and PDI vs. conversion
FIG. 3C Simulated GPC trace.
Figure 3:
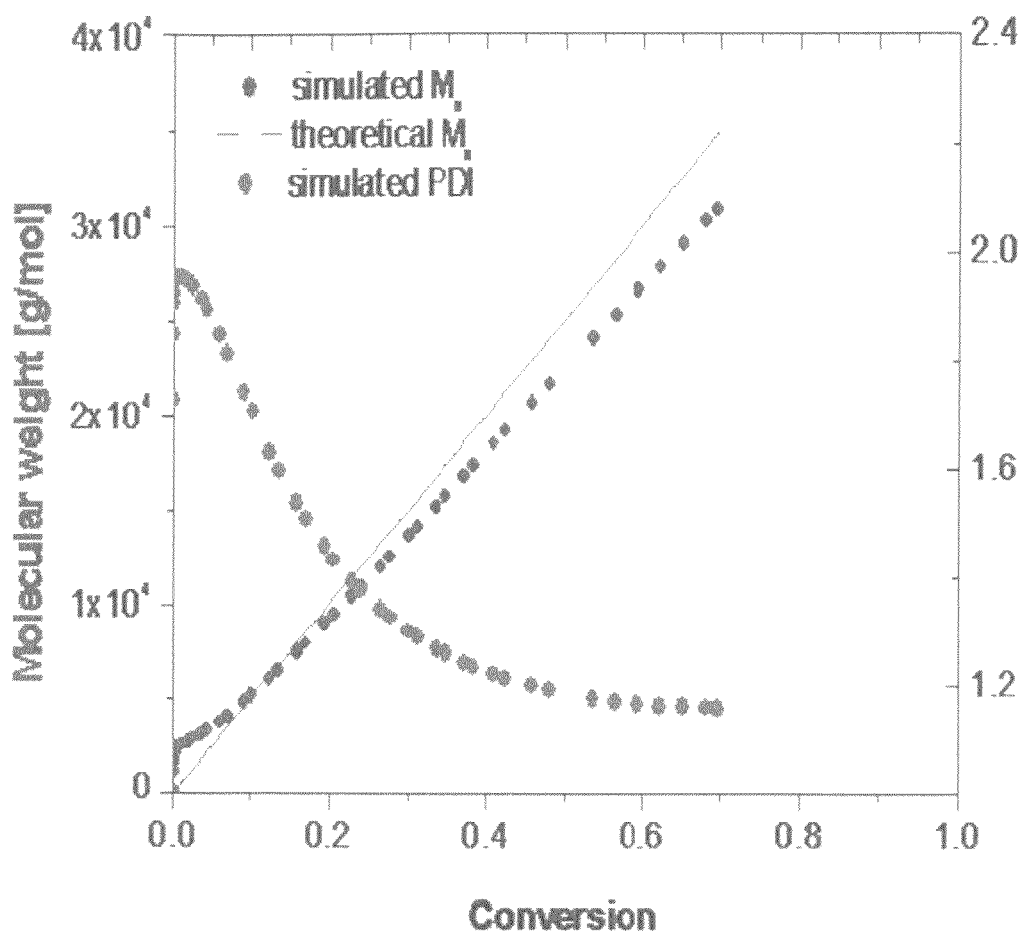
Figure 3:
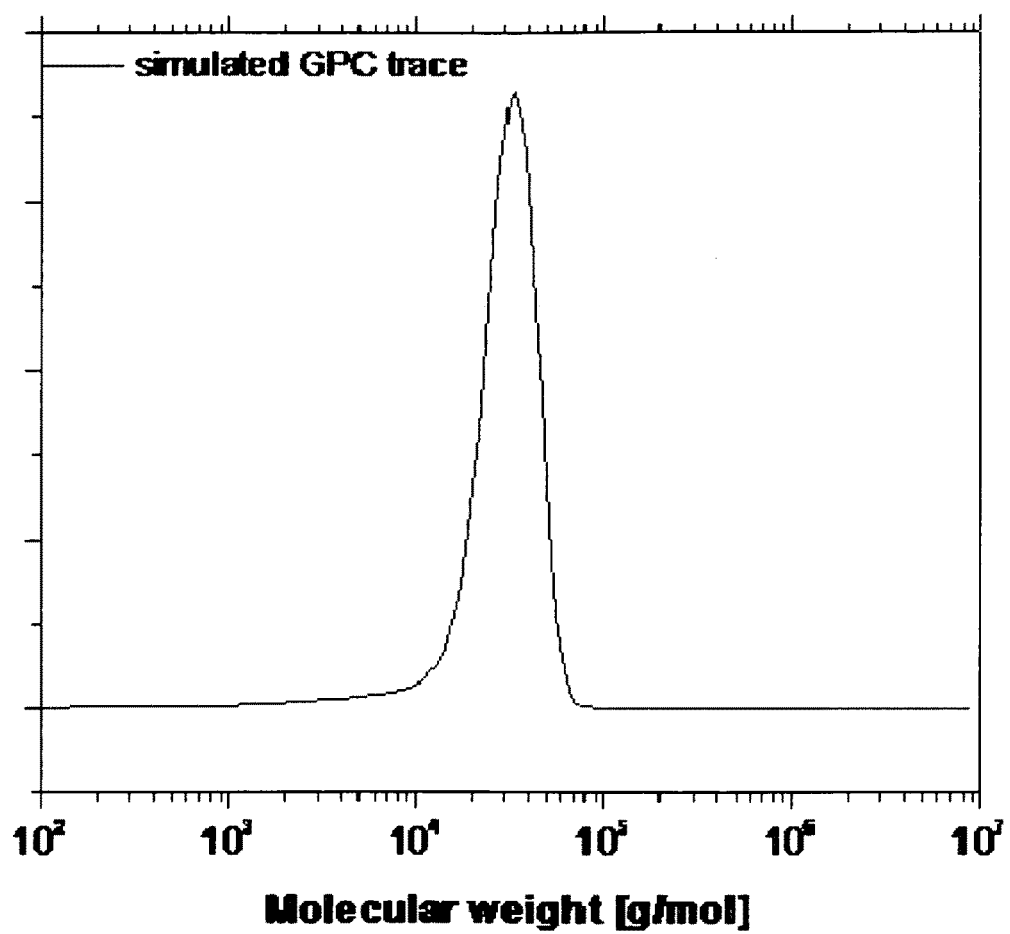

FIGS. 3A, 3B and 3C show the simulated kinetic plot, molecular weight and polydispersity (PDI) vs. conversion and GPC trace of PMMA prepared via the feeding method for ICAR ATRP, respectively. The results shown in FIG. 3 are for simulations done for experimental conditions: MMA/DEBMM/Cu$^{II}$Br$_2$/TPMA/AIBN=500/1/0.025/0.025/0.05 in bulk at 90° C., with a constant concentration of initiator added over a feeding time 10 h. The linear kinetics, good control over molecular weight, low PDI and monomodal distribution of molecular weight show that the polymerization could be well controlled.

A series of simulations were conducted using methyl methacrylate, butyl acrylate and styrene as exemplary monomers. The results from the initial series of simulations for these three monomers provided starting points for reactions conducted in a 1 L reactor. Based on the experimental results, some additional changes can be made in the simulation to fully optimize the investigated polymerization system.

A similar series of simulations will be conducted using a photoresponsive initiator to determine if the rate of radical formation can be controlled by controlled photo-stimulation.

A similar series of simulations will be conducted using a reducing agent to determine if ARGET ATRP con be conducted under "starved" feeding conditions and result in improved control.

Polymerization Experiments.

Polymerization experiments using the new 'feeding' method for ICAR ATRP were carried out for three representative monomers (MMA, nBA and St) at a 1 liter scale in a Ace Glass reactor equipped with a heating mantle, mechanical stirrer and thermocouple. At this scale of the reaction, challenges related with heat transfer and viscosity, as well as exothermicity, become important; as discussed the background section and shown in FIG. 1. These factors are not taken into account by computer modeling software. Thus, some adjustments were made in order to fully optimize the new 'feeding' method in the actual ICAR ATRP experimental examples.

Nonetheless, initially each monomer was polymerized with the conditions initially optimized via computer simulations. Additional adjustments were made in order to further increase control over the polymerization. These adjustments are specified for each monomer below.

The run numbers listed below were employed for internal tracking of the experiments and do not have any further significance.

Comparative Example C1

ARGET ATRP of MMA with Sn(EH)2 as reducing agent: Run 07-004-83. Scale: in 1 L reactor.
Conditions: MMA/DEBMM/CuBr$_2$/TPMA/Sn(EH)$_2$= 2200/1/0.015/0.06/0.1 in DMF (0.05 volume eq. vs. MMA), (7 ppm of Cu), T=65° C.

Figure 4:
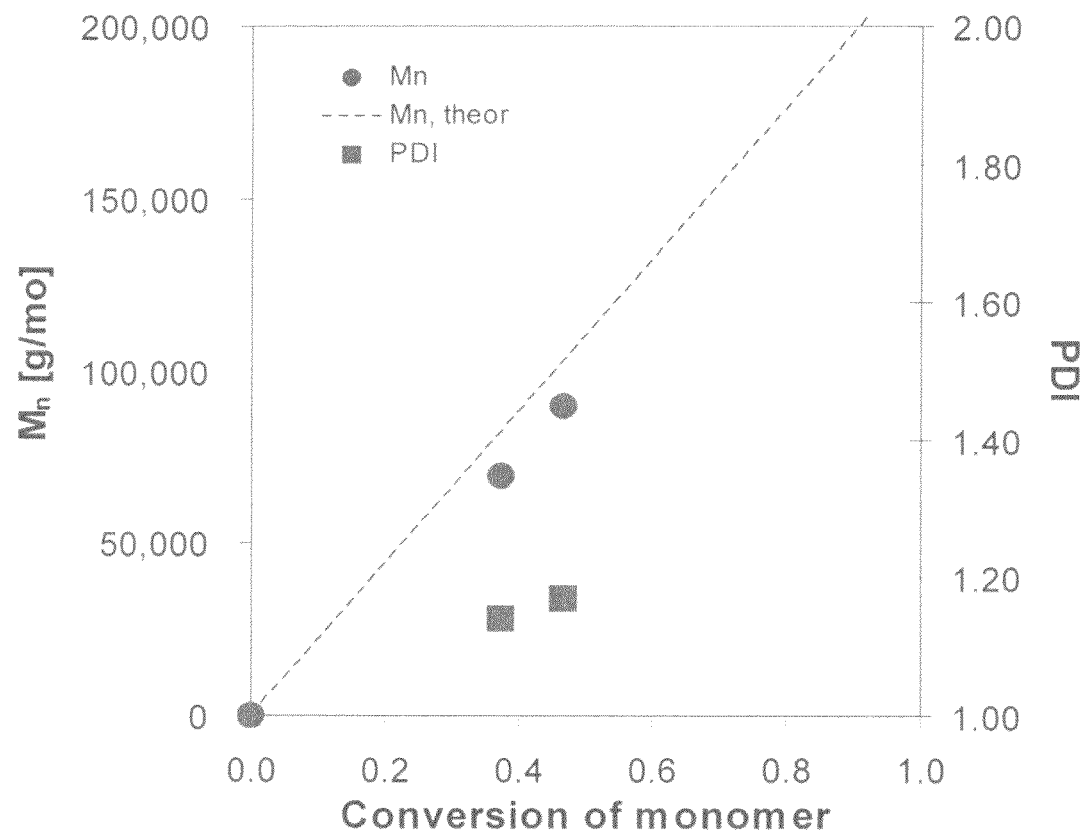
FIG. 4A. Molecular weight and PDI vs. conversion for example C1.
FIG. 4B. GPC curves for example C1.
Figure 4:
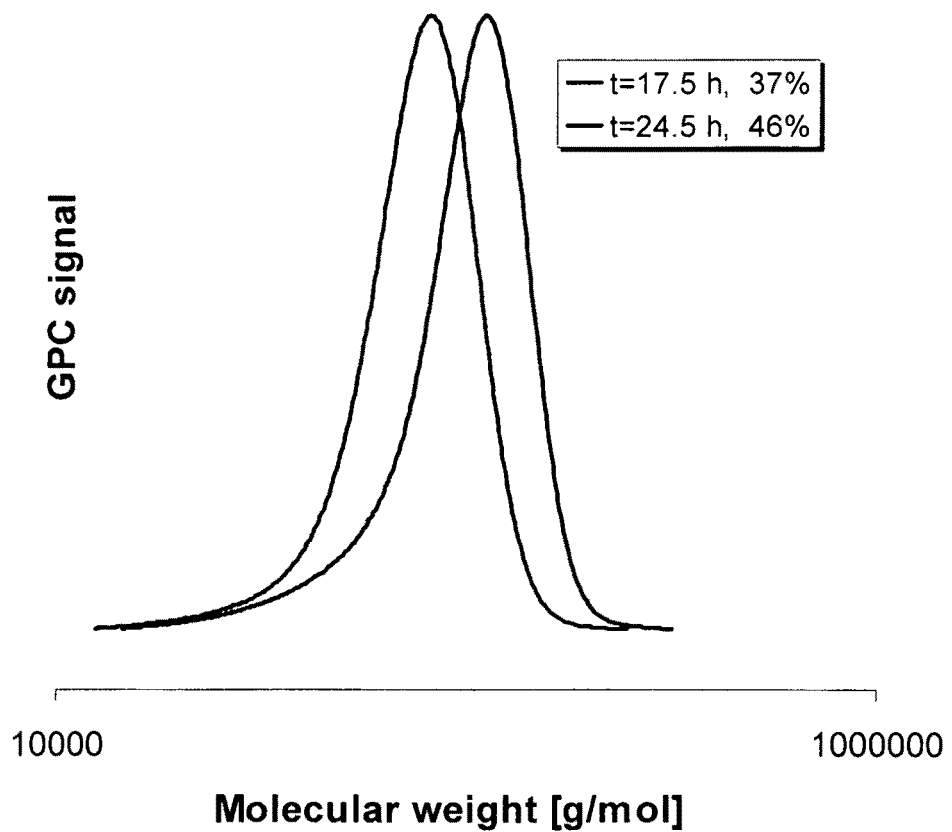

The polymerization was performed in bulk and at 65° C. The reaction was well controlled with Mn close to theoretical values and low PDI. The kinetics of the reaction and GPC results of the polymer samples taken during the experiment are shown in FIGS. 4A and 4B. After 27.6 hours the final degree of polymerization (DP) of the polymer was 890 and the $M_{n(GPC)}$=90,000 with a polydispersity of 1.17. A small tailing to the low molecular weight is visible on GPC traces.

Comparative Example C2

Chain extension of polymer prepared in example C1: Run 07-004-84. Scale: 25 mL Schlenk flask
Conditions: St/PMMA/CuBr$_2$/TPMA/Sn(EH)$_2$=5000/1/ 0.02/0.06/0.2 in anisole (0.1 volume eq. vs. St), (4 ppm of Cu) T=80° C. (07-004-83 as macroinitiator)

Figure 5:
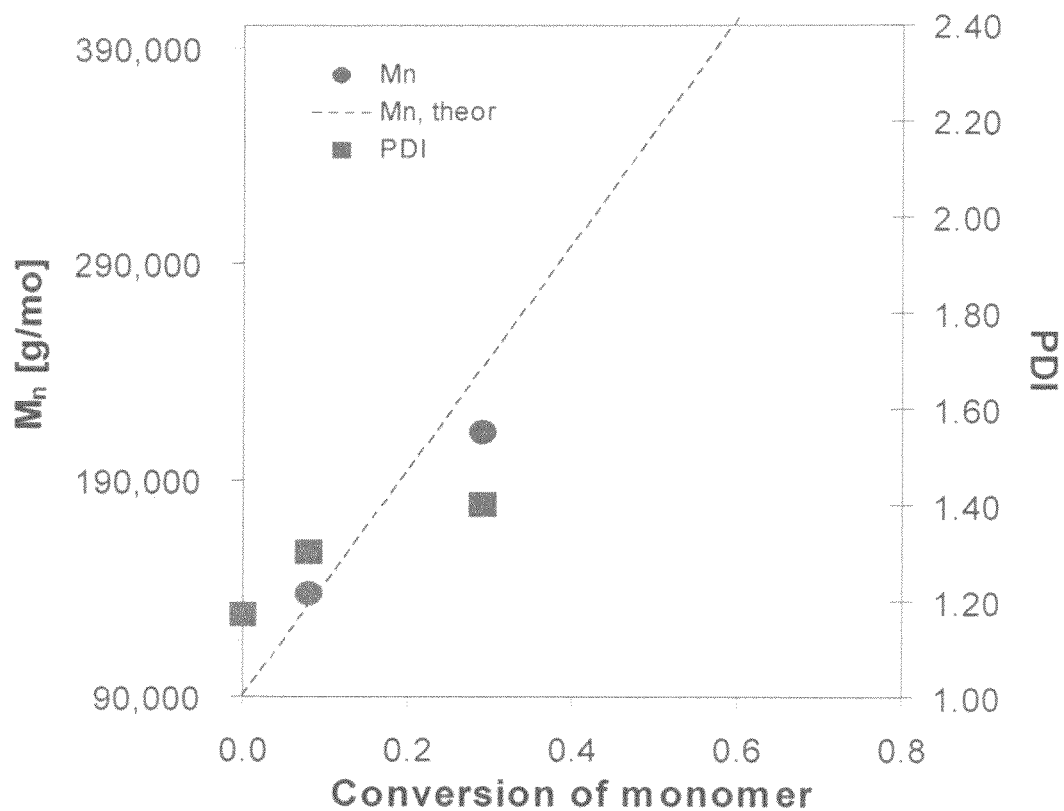
FIG. 5A. Molecular weight and PDI vs. conversion for example C2.
FIG. 5B. GPC traces for example C2.
Figure 5:
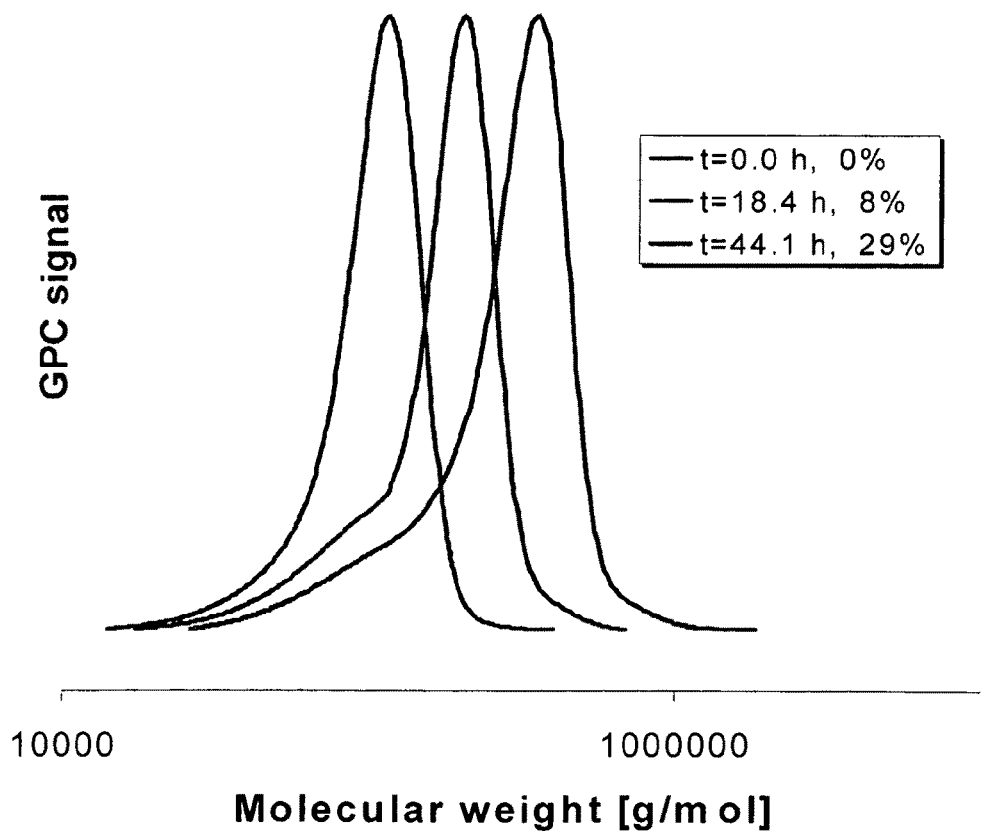

The kinetics of the reaction and GPC results of the experiment are shown in FIGS. 5A and 5B. The GPC results of the polymer samples taken during the experiment indicates that the chain extension of the PMMA macroinitiator formed in example C1 with St was not fully successful. One can conclude that despite the narrow PDI of the macroinitiator the chain-end functionality is not very high, after 4000 minutes reaction some of macroinitiator was still not chain extended resulting in bimodal molecular weight distribution.

One reason for low chain-end functionality is a transfer reaction of the growing radical to Sn(EH)$_2$ indicating that a different reducing agent has to be used in order to synthesize PMMA with high molecular weight and high chain-end functionality.

Comparative Example C3

ICAR ATRP of MMA with AIBN as radical initiator. Run: 07-004-85. Scale: 1 L reactor
Conditions: MMA/DEBMM/CuBr$_2$/TPMA/AIBN=2400/ 1/0.02/0.025/0.15 in anisole (0.03 volume eq. vs. MMA), (8 ppm of Cu), T=55° C.

Figure 6:
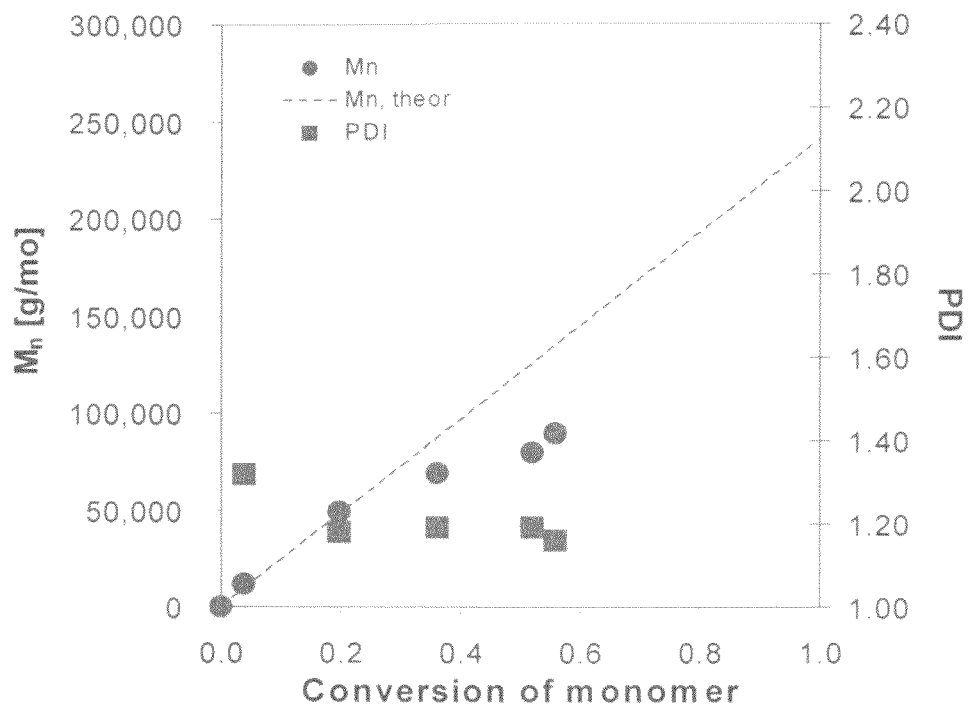
FIG. 6A. Molecular weight and PDI vs. conversion for example C3.
FIG. 6B. GPC curves for example C3.
Figure 6:
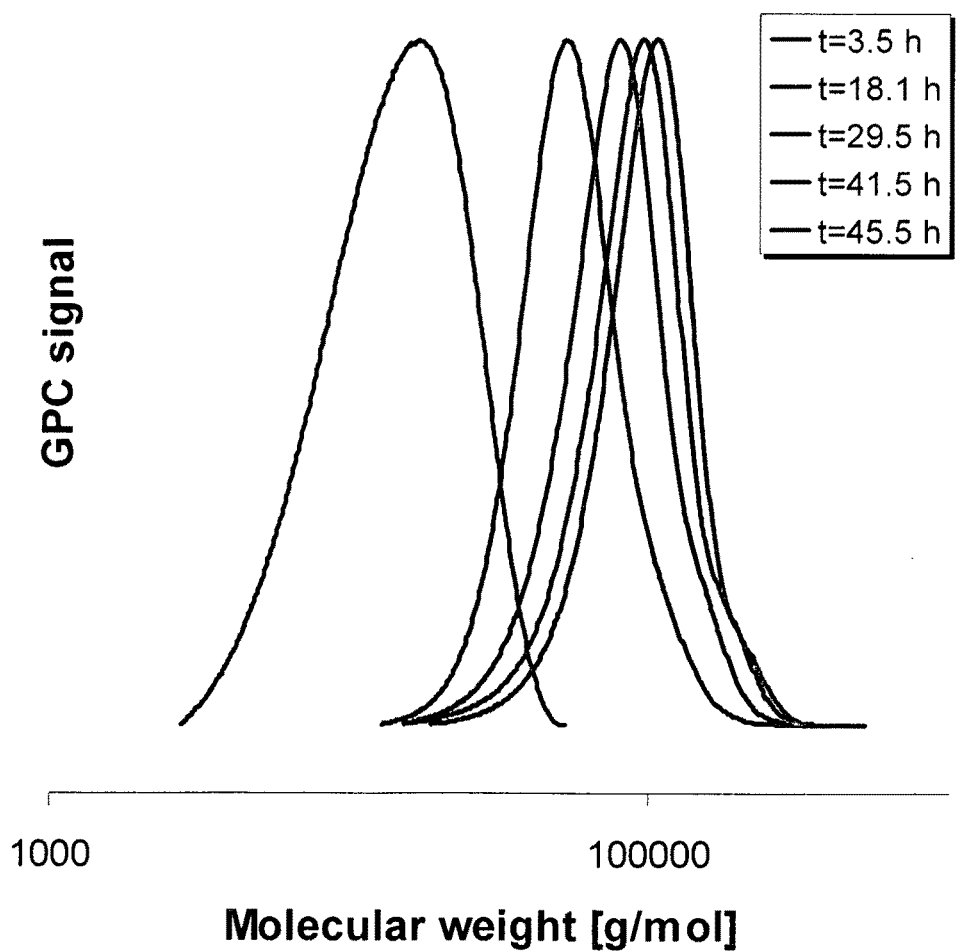

The kinetics of the reaction and GPC results of the polymer samples taken during the experiment are shown in FIGS. 6A and 6B. In this comparator example polymerization of MMA was performed in bulk at 55° C. in the presence of AIBN instead of Sn(EH)$_2$ to avoid transfer reactions to Sn(EH)$_2$ apparent during the chain extension reaction described in example C2. After 45.5 hours reaction the DP of the polymer was 894 and the MW 89,500 with $M_n$ close to theoretical values and low PDI indicating the polymerization was well controlled. No tailing is visible on GPC traces suggesting that no transfer reactions occurred during the polymerization process.

Comparative Example C4

Figure 7A:
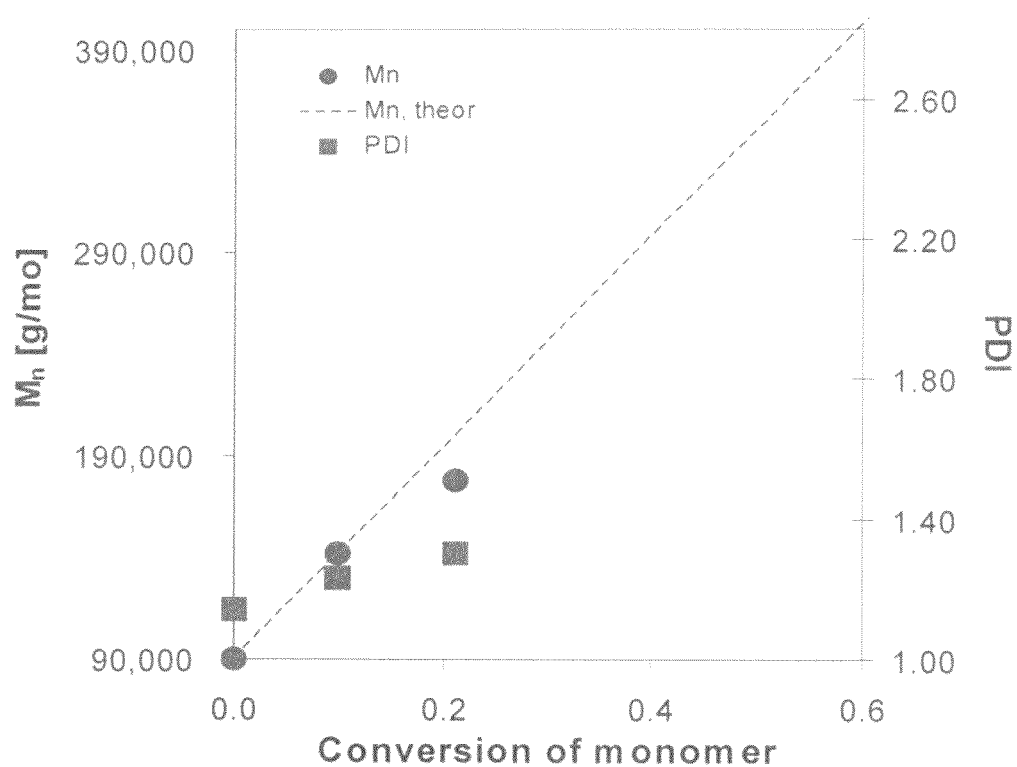
FIG. 7A. Molecular weight and PDI vs. conversion for example C4.
Figure 7:
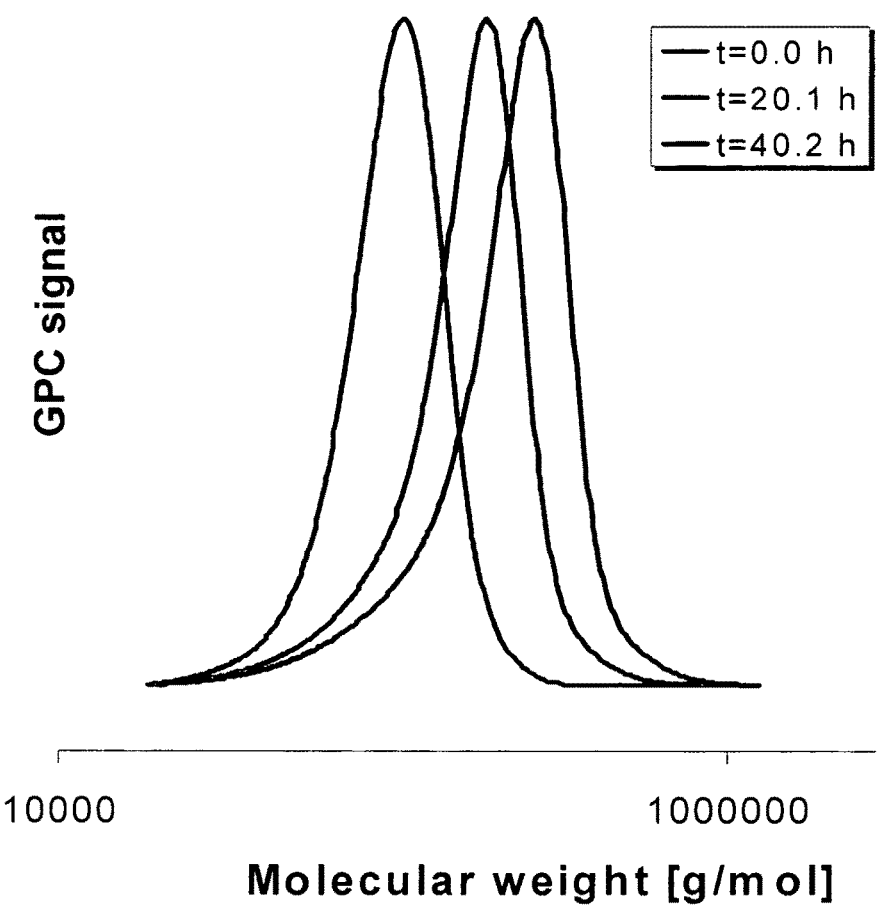
FIG. 7B. GPC curves for example C4.

Chain extension of polymer prepared in example C3. Run: 07-004-89. Scale: 25 mL Schlenk flask.
Conditions: St/PMMA/CuBr2/TPMA/Sn(EH)$_2$=5000/1/ 0.02/0.06/0.2 in anisole (0.1 volume eq. vs. St), (4 ppm of Cu), T=80° C., time=40.2 hr. Sample C3, 07-004-85 as macroinitiator The kinetics of the reaction and GPC results of the polymer samples during experiment are shown in FIGS. 7A and 7B. The chain extension of PMMA C3 with St was successful. Chain-end functionality of PMMA C3 is much higher than in PMMA C1, no bimodal distribution of molecular weight was observed after extension, only small tailing visible on GPC traces of the polymer samples taken during the experiment. This result proves that one reason of low chain-end functionality of PMMA C1 is the transfer reaction to Sn(EH)$_2$. Indicating that either ICAR ATRP or a non-transition metal based reducing agent has to be used in order to obtain PMMA with higher chain-end functionality Comparative Example C5

ICAR ATRP of MMA with AIBN as radical initiator. Run: 08-006-48. Scale: in 1 L reactor.
Conditions: MMA/DEBMM/CuBr2/TPMA/AIBN=2400/ 1/0.025/0.03/0.2 in bulk (anisole as internal standard), (10 ppm of Cu), T=55° C., time=41.6 hours.

Figure 8:
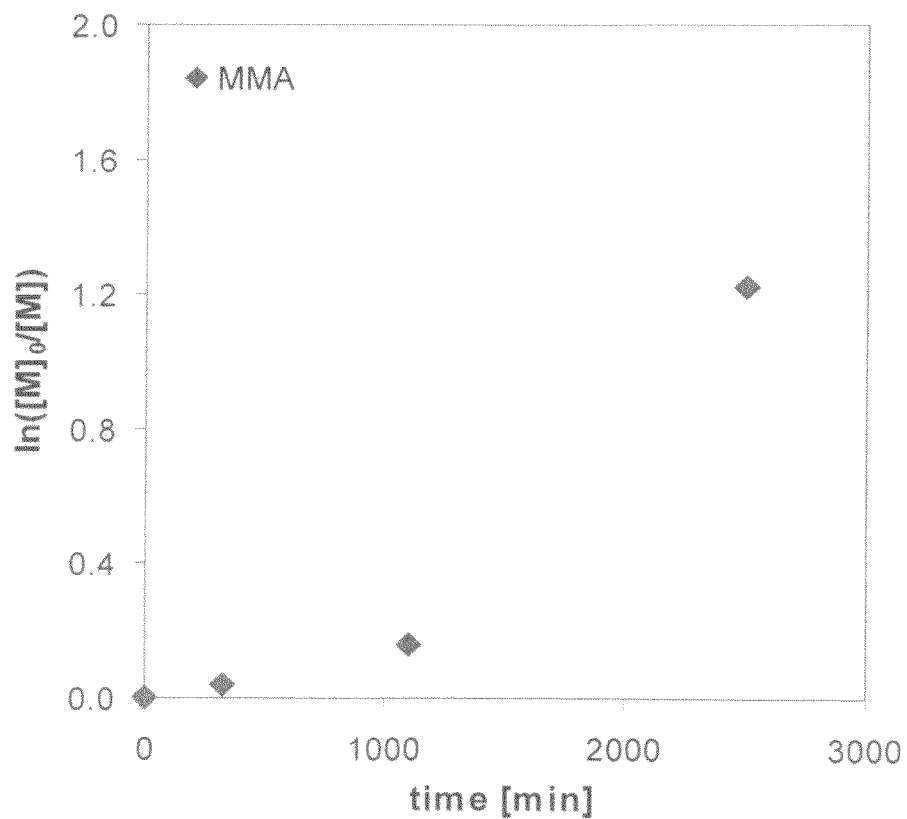
FIG. 8A. Kinetics plot for example C5.
FIG. 8B. Molecular weight and PDI vs. conversion for example C5.
FIG. 8C. GPC curves for example C5.
FIG. 8D. Temperature profile for example C5.
Figure 8:
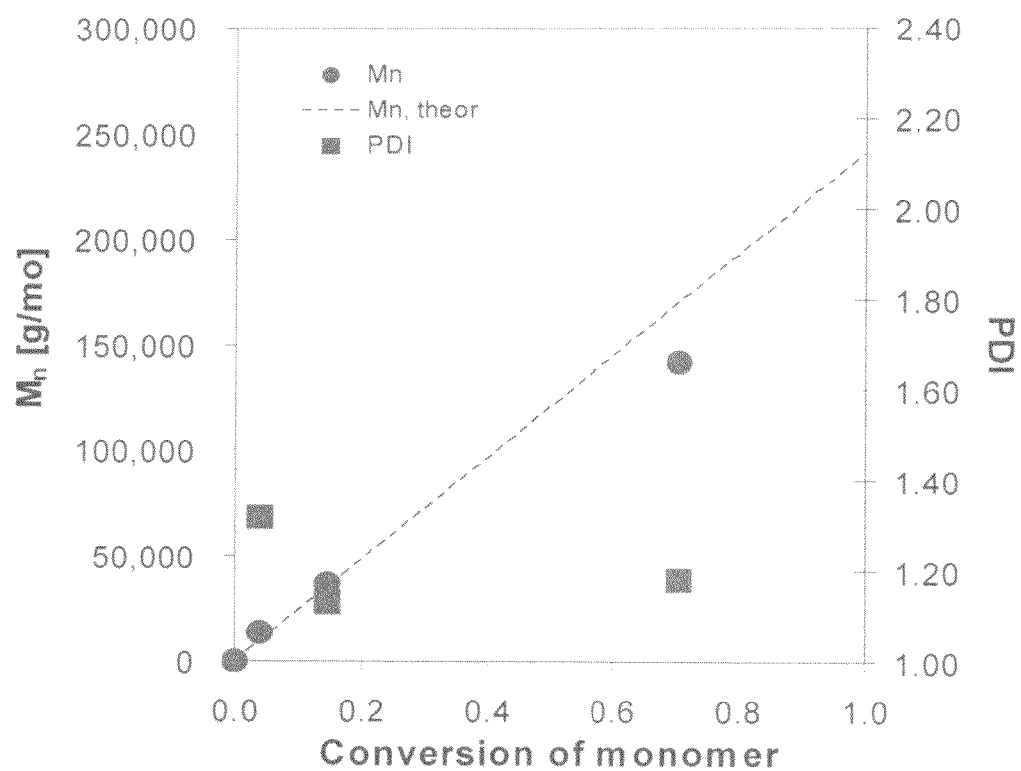
Figure 8:
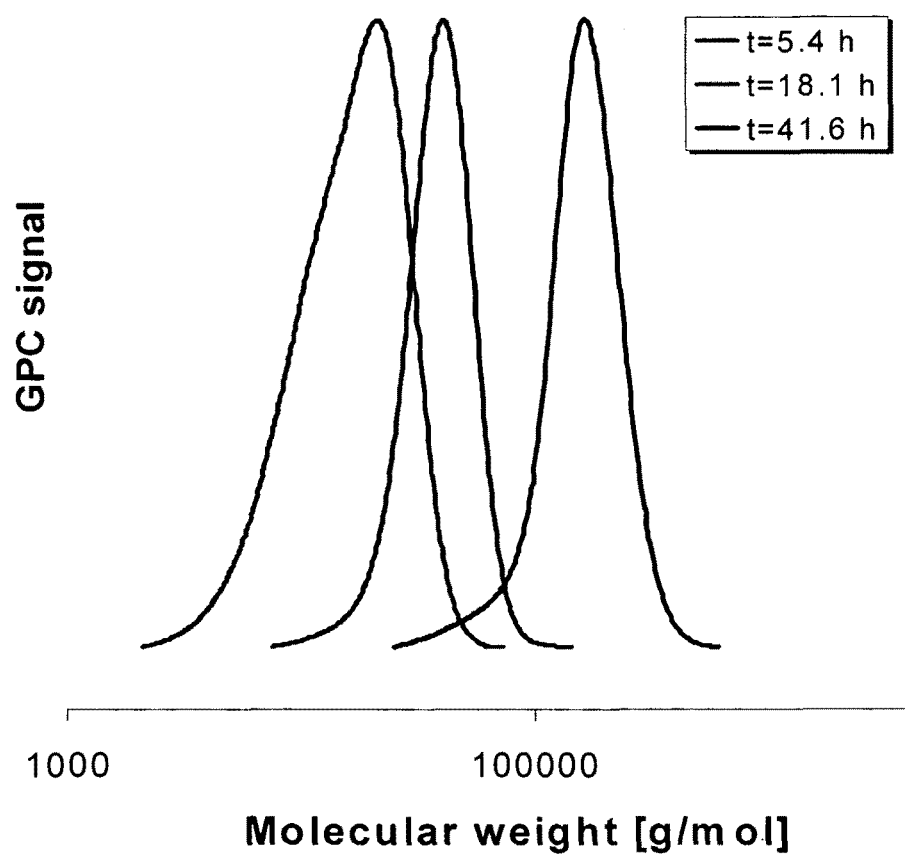
Figure 8:
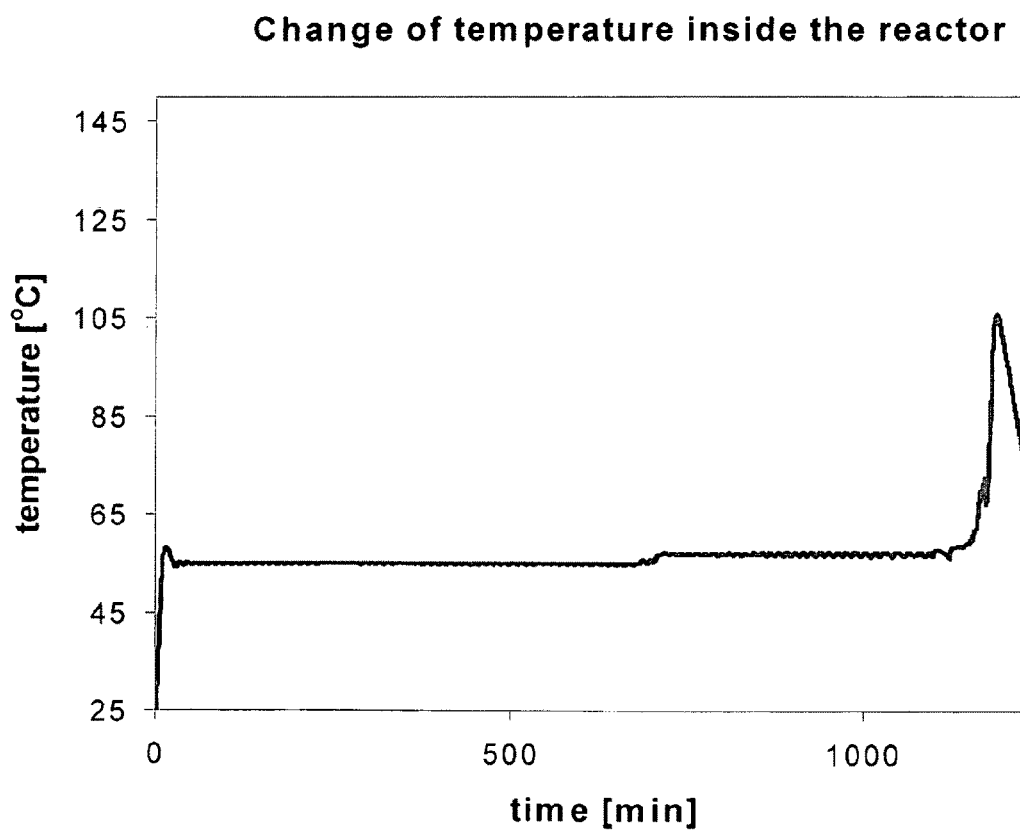

The kinetics of the reaction and GPC curves of the polymer samples taken during the experiment are shown in FIGS. 8A and 8B, indicating that the final polymer had a DP of 1414 and $M_{n(GPC)}$ 141,600. The polymerization was well controlled at the beginning. The final PDI, sample 3 was slightly higher than sample 2, but significant temperature fluctuations were encountered when higher conversion was attempted which indicates that the flask had been heated for too long resulting in an uncontrolled polymerization. This is a consequence of the high viscosity of the solution of the glassy polymer at low temperatures. Although high molecular weight was reached, chain-end functionality may be low due to overheated polymerization solution resulting in solid glassy polymer and a broken stirring rod.

Example 1

Polymerization of Methyl Methacrylate (MMA)

Polymerization of MMA was carried out first using the new 'feeding' method for ICAR ATRP. The best polymerization conditions were chosen from the computer modeling and tested in a 1 liter scale reactor. The temperature inside the reactor was followed using a thermocouple with a second thermocouple located outside the reactor, between the wall of the reactor and the heating mantle to provide additional information of the level of temperature control attained in the reaction. The difference in temperature between the two thermocouples can be related to the efficiency of heat transfer in this system. The efficiency of heat transfer may change significantly with viscosity and will affect the control of polymerization.

Another factor which computer modeling does not take into account is the rate of diffusion of the radical initiator after feeding into a viscous solution. The radical initiator should be evenly distributed before significant decomposition occurs. In order to investigate that, at different stages of the polymerization (when solution will become progressively more viscous), a colored dye will be injected and a time of its distribution will be evaluated (visually and/or spectroscopically). The results of this study will provide information on the distribution of injection sites required for optimal control in a large scale reactor.

Polymerization of MMA Using the Proposed Method

Figure 9:
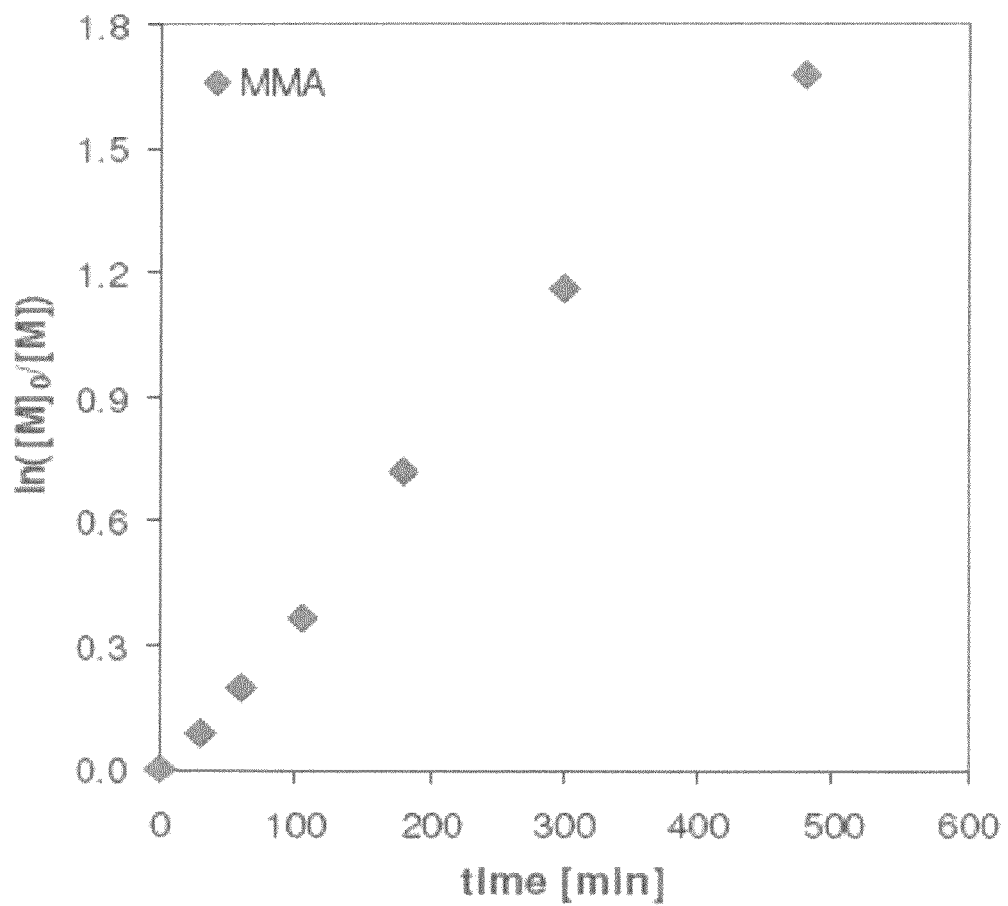
Figure 9:
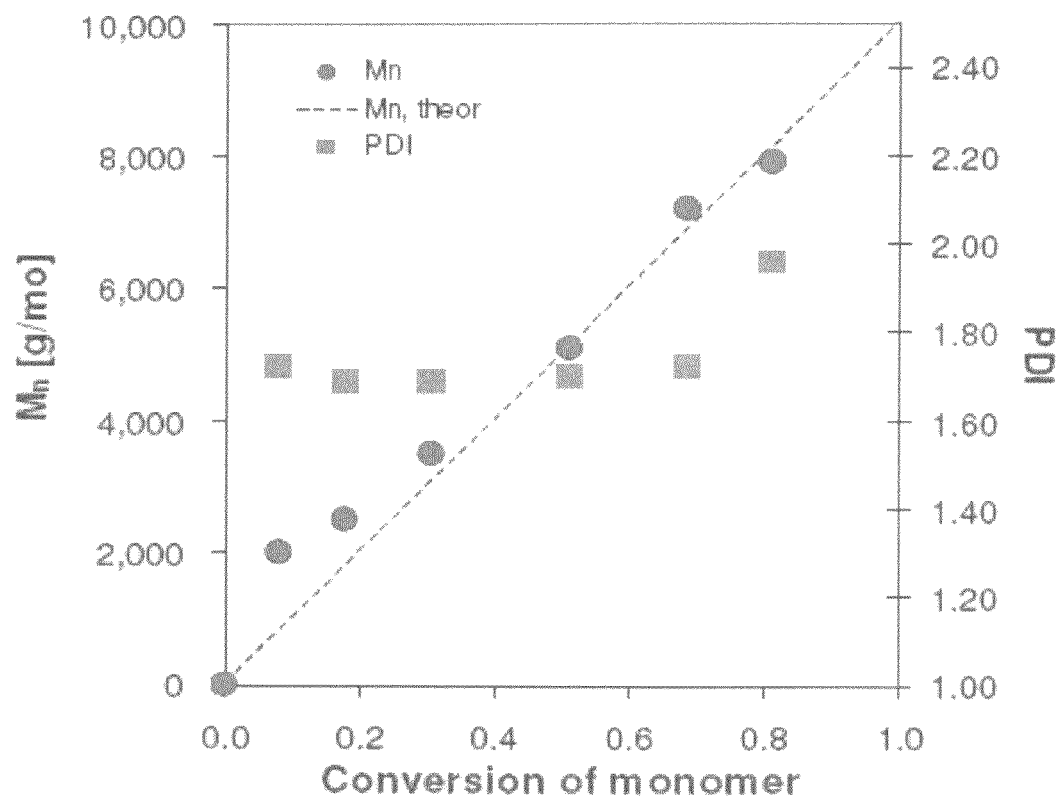
Figure 9:
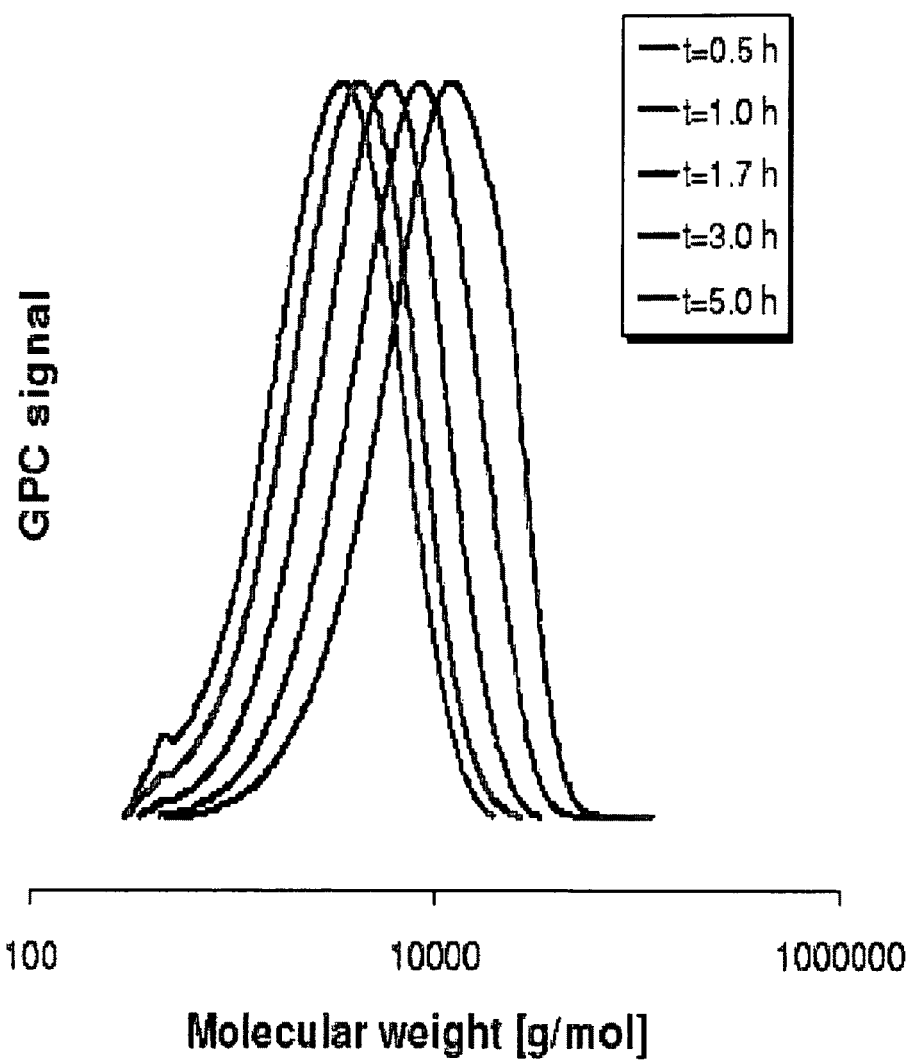
Figure 10:
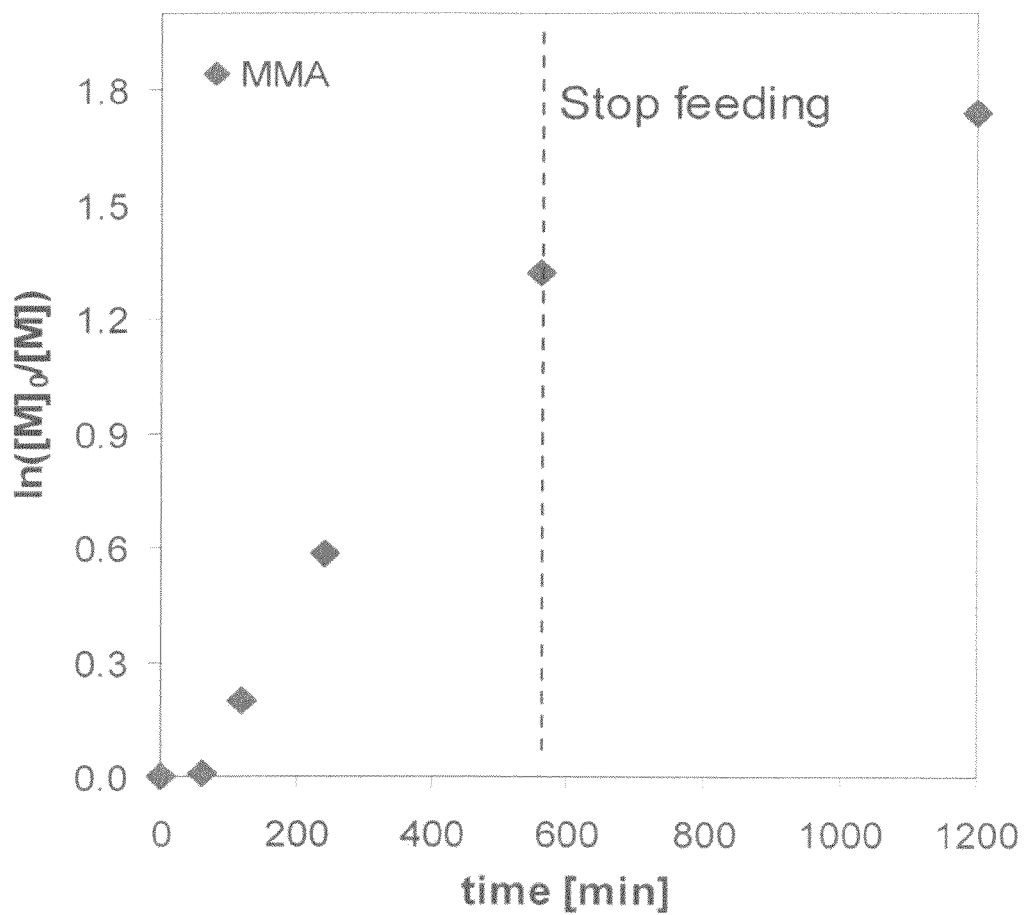
Figure 10:
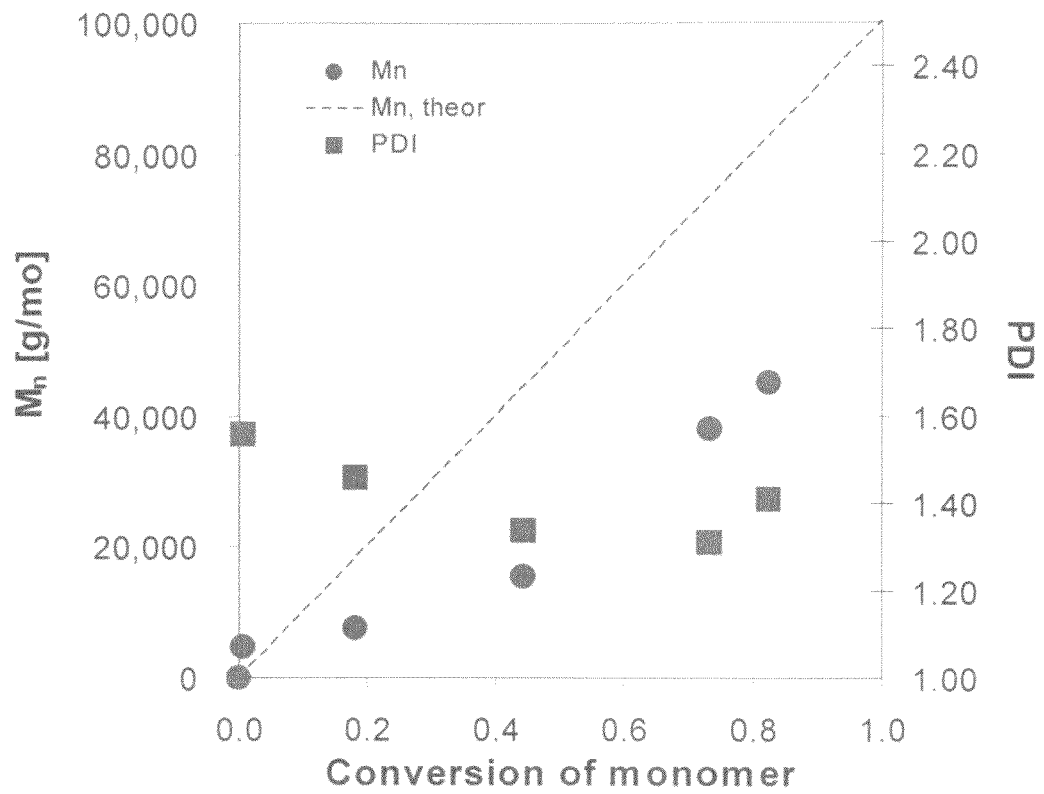
Figure 10:
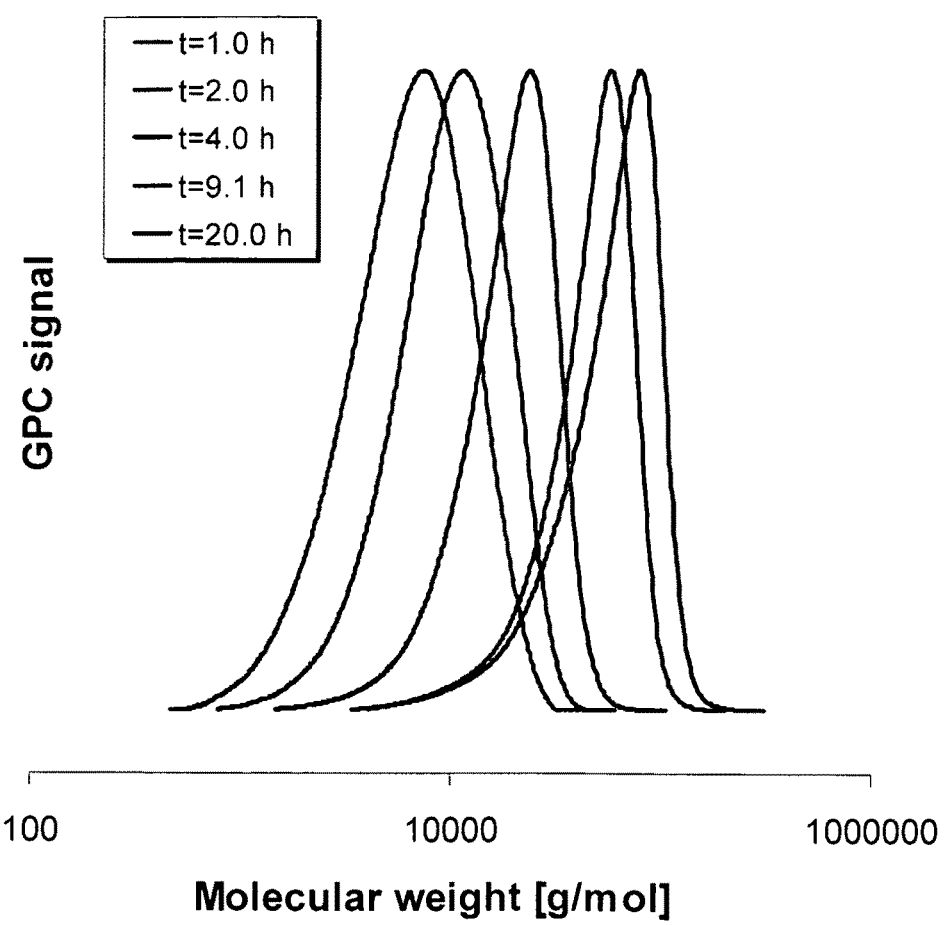

The results of the computer simulations were used as starting points for 10 test reactions. It was determined that an excess of ligand had to be used in order to get a controlled polymerization. Polymerizations revealed linear kinetics and molecular weights were close to theoretical values. However, when targeting low DP the PDI's remained quite broad, FIG. 9. Additional reactions were then performed to optimize synthesis of PMMA using the disclosed feeding method. The results and observations during the initial experiments indicated that the reason for poor results, broad PDI, is very low initiation efficiency of DEBMM in the ICAR ATRP system, a signal from the initiator was visible on GC traces even after several hours of reaction. For high DP polymers molecular weights were lower than theoretical values and PDI initially decreased with conversion but increased at high conversion, FIG. 10. Another observation was that the polymerization mixture was becoming cloudy with reaction time. This is probably the reason for loss of the control at the end of most of the polymerization reactions. It was determined that the selected ATRP initiator (DEBMM) was mostly responsible for side reaction and destabilization of the very low concentration of copper catalyst.

Therefore a more efficient initiator, BrPN, was tested in ICAR ATRP with feeding of AIBN and good results were obtained.

After performing the first reactions with MMA, the experimental and the simulated results were compared. Differences can be attributed to effects of heat transfer, viscosity, initiator diffusion, impurities, and the amount of air in the system. These observations indicate that the reactor should be equipped with a mechanical stirrer. In order to further reduce problems related to diffusion and heat transfer, reactions can be diluted (with monomer or solvent) and stopped at lower conversions (unreacted monomers (diluents) can be recovered and reused). Additional experiments were conducted in order to optimize the reaction conditions at this scale with a single source of added initiator. The parameters that were adjusted include: temperature, targeted DP, feed rate of radical initiator, concentration of reagents, and amount of Cu catalyst.

Example 2

Polymerization of n-Butyl Acrylate

Computer Simulations for Polymerization of N-Butyl Acrylate:

A computer model similar to that shown in FIG. 2 was built and then polymerization simulations were performed for n-butyl acrylate (nBA). The main goal of the simulations was to find starting conditions for real polymerization experiments by varying several different parameters in the software; type of radical initiator, degree of polymerization DP, feeding rate of radical initiator.

One of the goals for new polymerization method with controlled feeding of the initiator/activator was to make polymerization reactions as fast as possible and at the same time still have a controlled process. As in the case of PMMA, evaluation of simulated results for PnBA was based on these factors and new evaluation scale was introduced. The scale was slightly different than that for MMA due to relatively faster reactions for nBA type monomer.

Relative Control Scale Description:
Very good: conversion >99% after less than 6 hours reaction and PDI <1.15 and functionality >98%, with linear kinetics.
Good: conversion=95-99% after less than 10 hours reaction or PDI=1.15-1.20 or functionality=95-98%,
Intermed.: conversion=80-95% after less than 20 hour PDI=1.20-1.25 or functionality=85-95%,
Poor: conversion <80% after less than 20 hour or PDI >1.25 or functionality <85%.

All rates and rate constants were adjusted for each simulated polymerization as reported in Table 1 presented below.

TABLE 1

| Exp. | Relative control | Conv. [%] | Time [h] | PDI | Funct. [%] | Comments |
|---|---|---|---|---|---|---|
| 25 | Good | 99.2 | 1.7 | 1.13 | 99 | Induction period was observed |
| 25a | Poor | 99.2 | 0.5 | 1.38 | 99 | High PDI |
| 25b | Very good | 99.2 | 1.2 | 1.15 | 99 | Very short induction period was observed |
| 26 | Good | 99.2 | 3.3 | 1.14 | 99 | Induction period was observed |
| 27 | Good | 99.2 | 2.6 | 1.12 | 99 | Induction period was observed |
| 28 | Good | 99.2 | 4.8 | 1.09 | 99 | Induction period was observed |
| 29 | Good | 99.2 | 4.3 | 1.11 | 99 | Induction period was observed |
| 30 | Intermediate | 99.2 | 7.5 | 1.08 | 99 | Induction period was observed |
| 31 | Good | 99.2 | 4.5 | 1.07 | 99 | Induction period was observed |
| 31a | Poor | 99.2 | 0.9 | 1.38 | 97 | High PDI |
| 32 | Intermediate | 99.2 | 11.3 | 1.04 | 99 | Induction period was observed |
| 32b | Intermediate | 99.2 | 1.4 | 1.21 | 98 | Medium PDI |
| 33 | Good | 99.2 | 6.0 | 1.07 | 99 | Induction period was observed |
| 34 | Intermediate | 99.2 | 13.4 | 1.04 | 99 | Induction period was observed |
| 35 | Poor | 45.5 | 6.0 | 1.09 | 99 | Slow reaction |
| 36 | Intermediate | 99.2 | 18.6 | 1.04 | 99 | Induction period was observed |
| 37 | Good | 99.2 | 1.9 | 1.16 | 99 | Induction period was observed |
| 38 | Good | 99.2 | 4.1 | 1.10 | 99 | Induction period was observed |
| 39 | Good | 99.2 | 2.9 | 1.18 | 99 | Induction period was observed |
| 40 | Good | 99.2 | 5.7 | 1.11 | 99 | Induction period was observed |
| 41 | Good | 99.2 | 4.2 | 1.19 | 99 | Induction period was observed |
| 42 | Good | 99.2 | 7.8 | 1.12 | 99 | Induction period was observed |
| 43 | Good | 99.2 | 4.9 | 1.09 | 99 | Induction period was observed |
| 44 | Intermediate | 99.2 | 12.8 | 1.04 | 99 | Induction period was observed |
| 45 | Good | 99.0 | 6.0 | 1.11 | 98 | Induction period was observed |

TABLE 1-continued

| Exp. | Relative control | Conv. [%] | Time [h] | PDI | Funct. [%] | Comments |
|---|---|---|---|---|---|---|
| 46 | Intermediate | 99.2 | 14.9 | 1.05 | 99 | Induction period was observed |
| 47 | Good | 92.4 | 6.0 | 1.12 | 99 | Induction period was observed |
| 48 | Intermediate | 99.2 | 17.8 | 1.06 | 99 | Induction period was observed |

Figure 11:
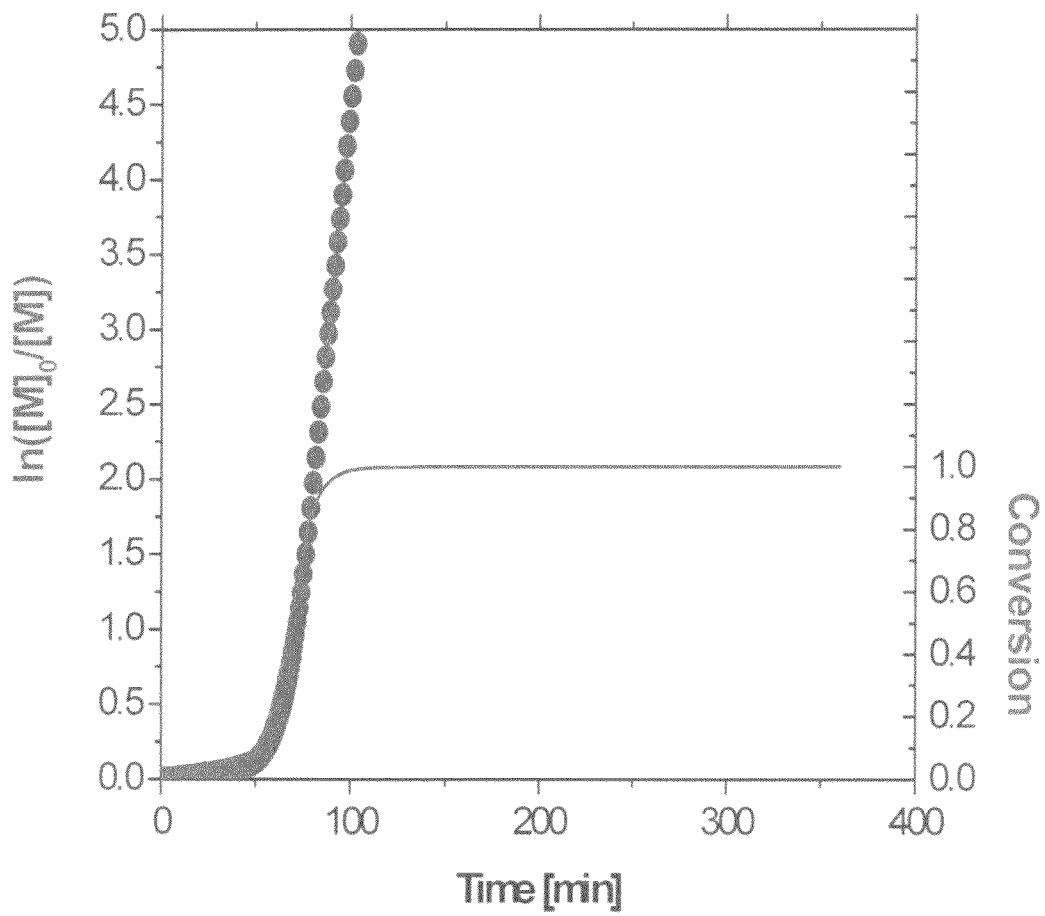
Figure 11:
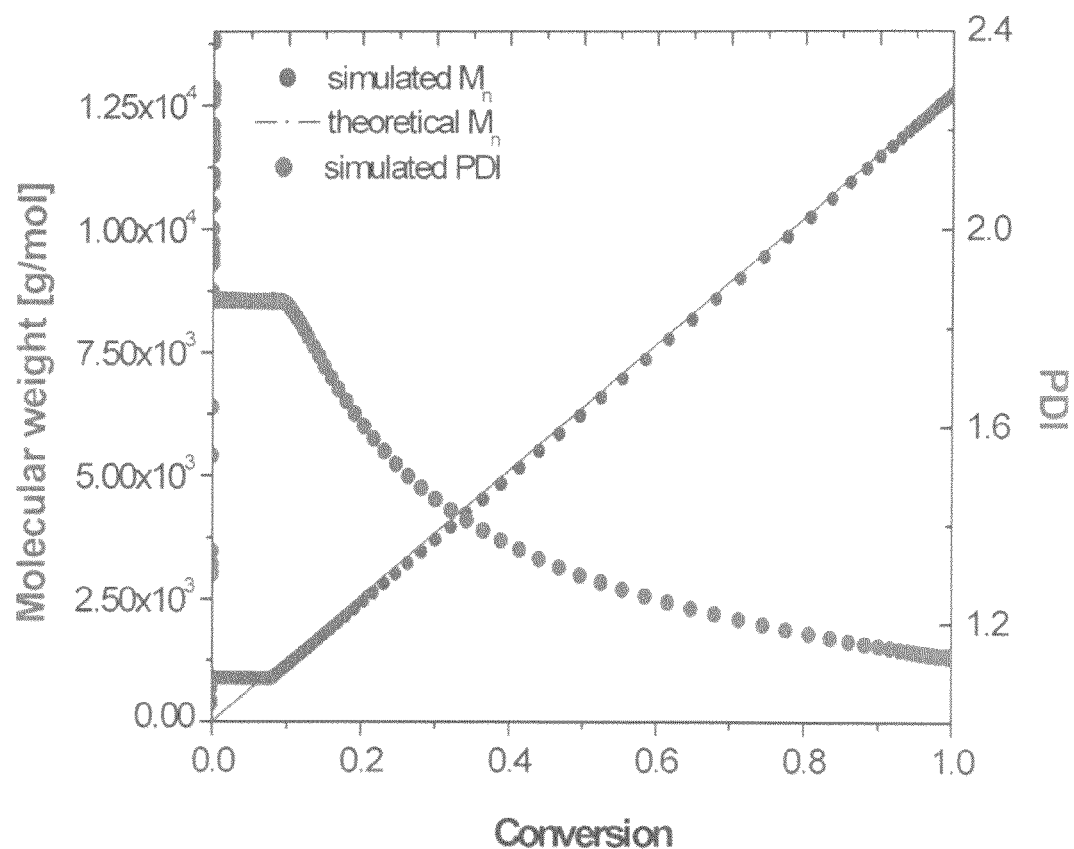
Figure 11:
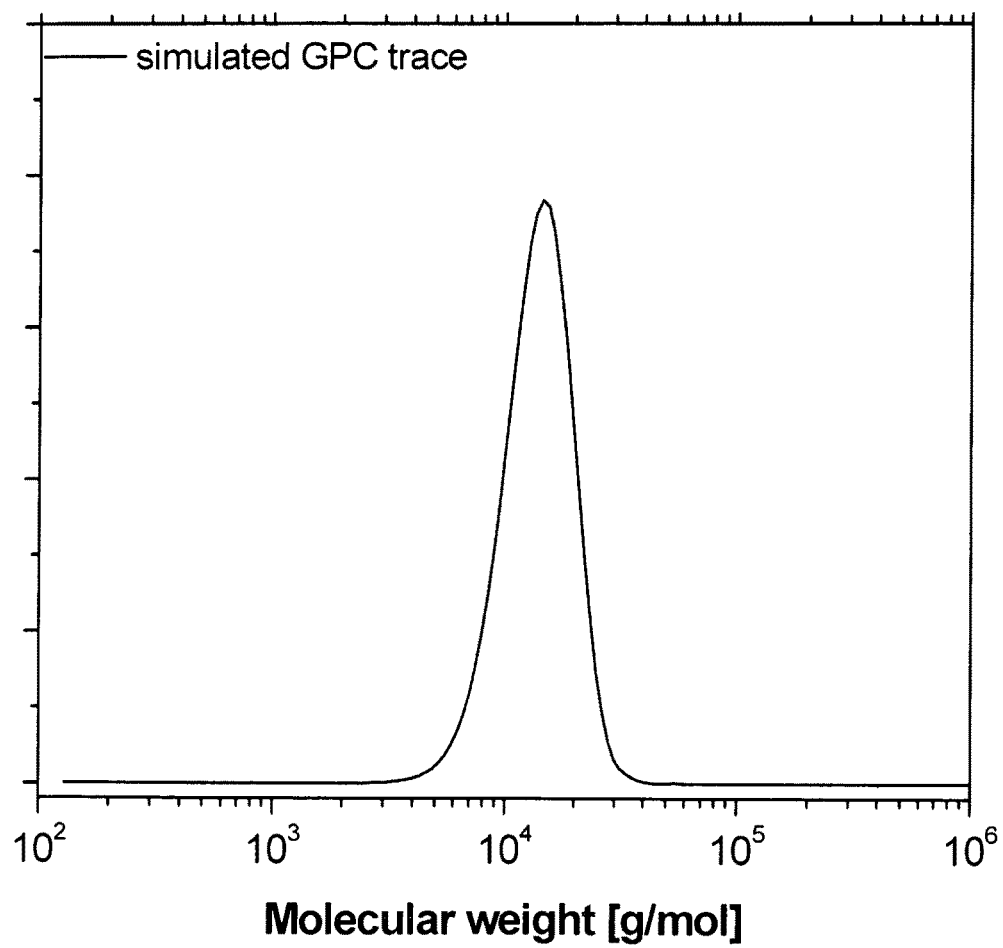
Figure 11:
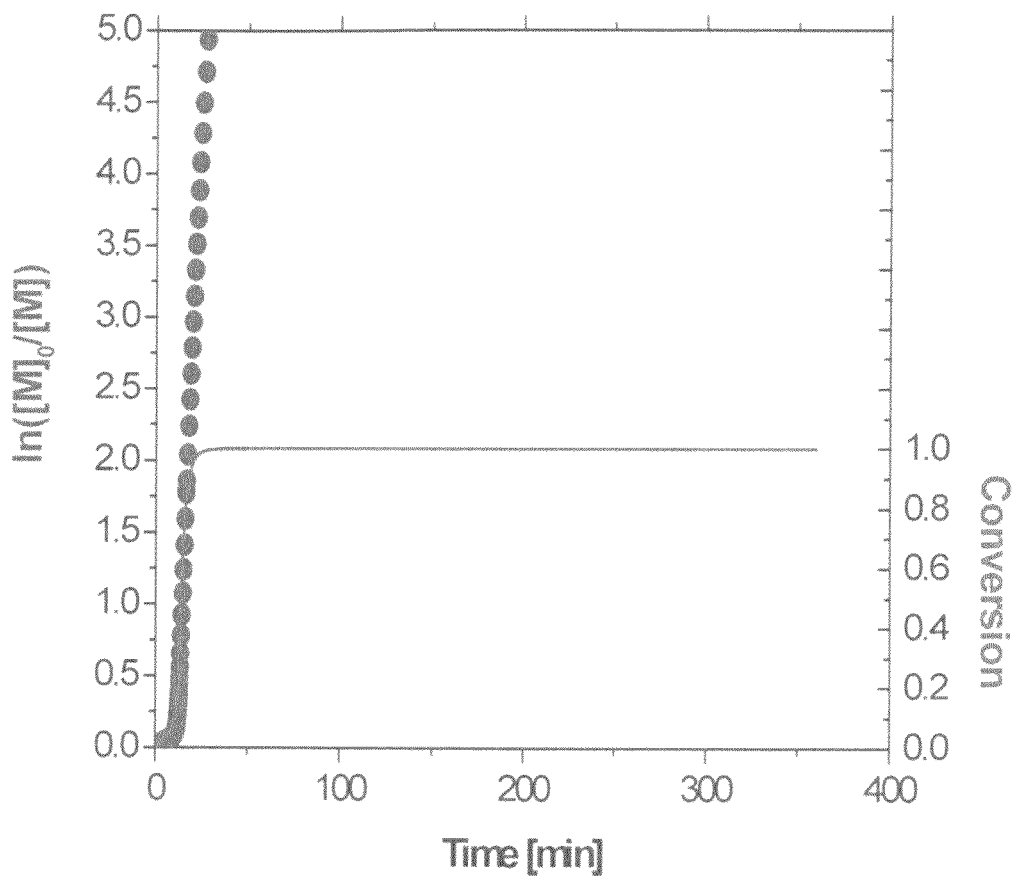
Figure 11:
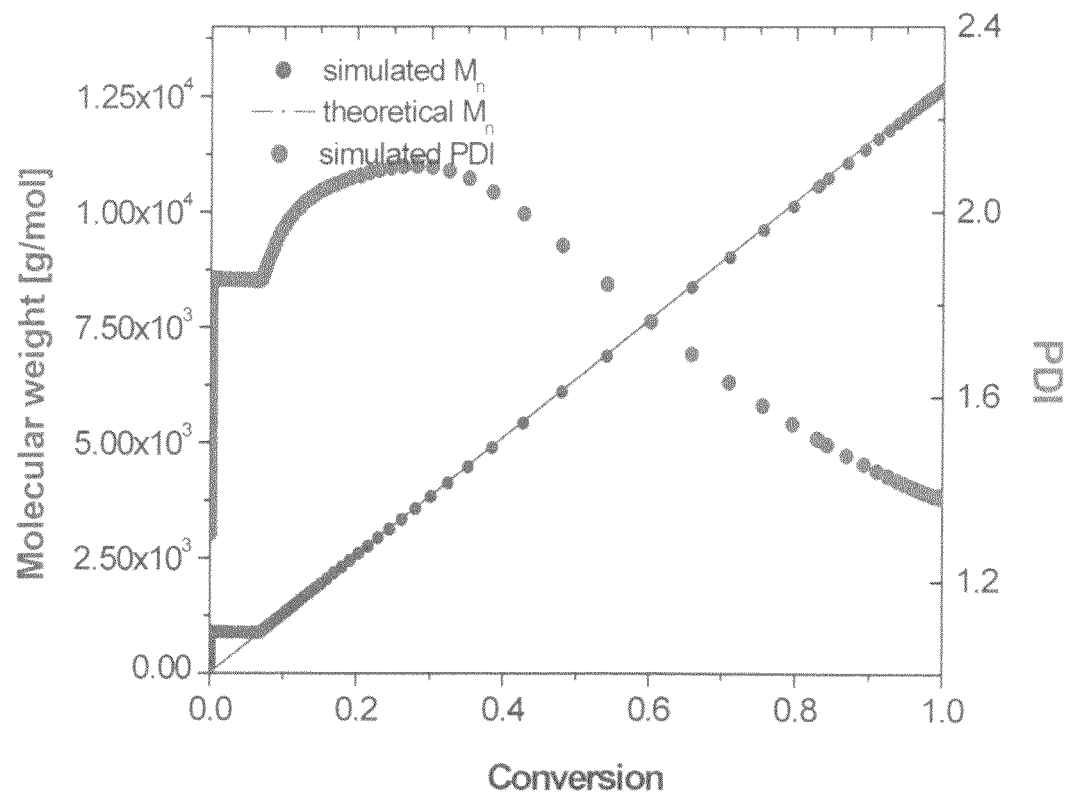
Figure 11:
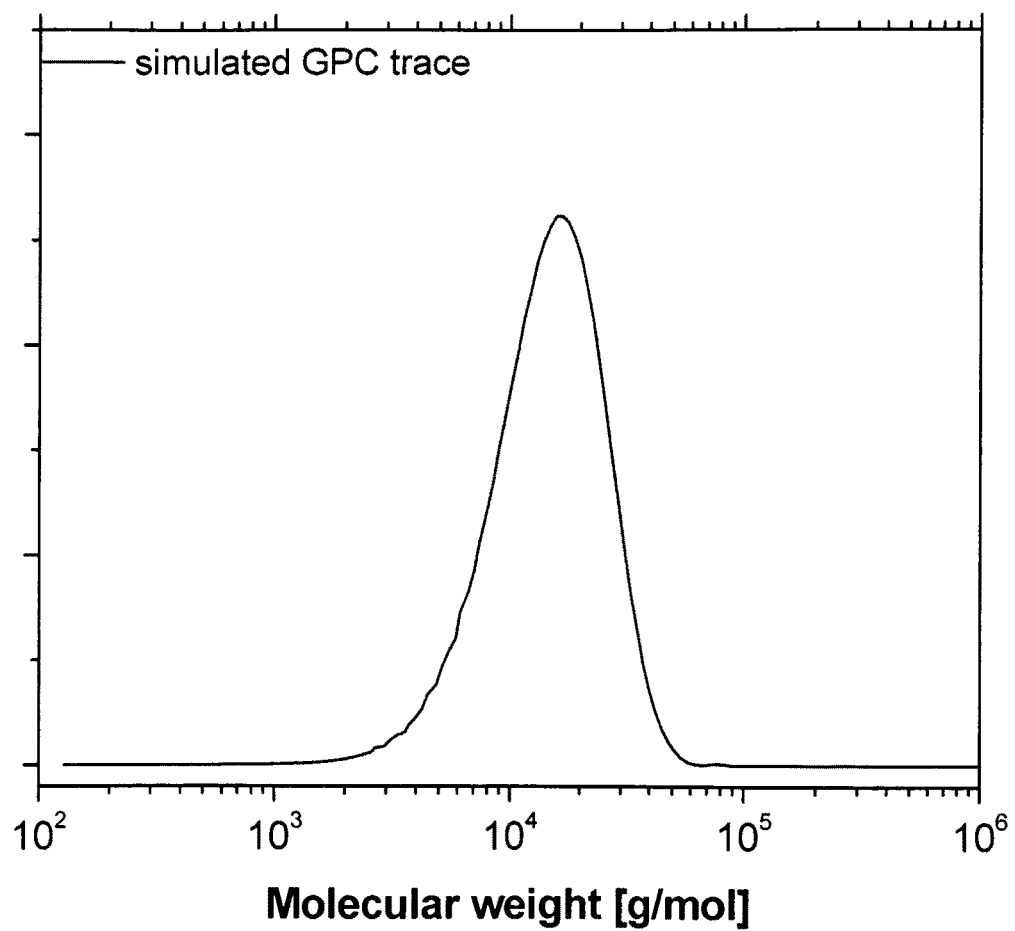

In almost all cases resulting polymers had low PDI, high chain-end functionality and molecular weights close to theoretical values. High polymerization rates were observed for most of the reactions (even for high DP) and that's why most of simulations are rated here as good since non-linear kinetics were observed. In conclusion simulations for polymerization of nBA using new 'feeding' method were successful and optimal conditions were found; e.g. Simulations 25, 25b, (see FIG. 11) 26-29, 31, 33, 37-43, 45, 47. Overall, there was not a significant difference in terms of control over the polymerization when using lower or higher T, different radical initiator or different feeding rate. As expected, reactions were faster with V-70, with higher T or faster feeding rate. The positive effect of feeding of radical initiator for acrylates is much higher than for MMA or St, discussed below. When no feeding is applied (simulation 25a), polymerization is uncontrolled for nBA (high PDI), FIG. 1.

Conditions optimized using the computer software simulations were used in experiments on 1 L scale. Results obtained during these experiments for nBA are reported below.

Example 2A

Preparation of PnBA Via Starved Feeding ICAR ATRP

Four of the best polymerization conditions were chosen from the modeling stage and first tested in a 1 liter scale reactor. The experimental set up had one difference in comparison with MMA system; the reactor was equipped with a cooling coil, needed for safety reasons—as reactions with acrylates are more exothermic. As discussed in the background, we anticipate much less exothermic effects for the "starved" feeding method. The parameters that were adjusted are: temperature, targeted DP, feed rate of radical initiator, concentration of reagents, and amount of Cu catalyst.
Run: 08-006-57
Scale: 1 L reactor
Conditions: nBA/DEBMM/CuBr$_2$/TPMA/AIBN=2000/1/0.02/0.04/0.04 in bulk (anisole as internal standard), (10 ppm of Cu), T=90° C., time=7.5 hours.

Figure 12:
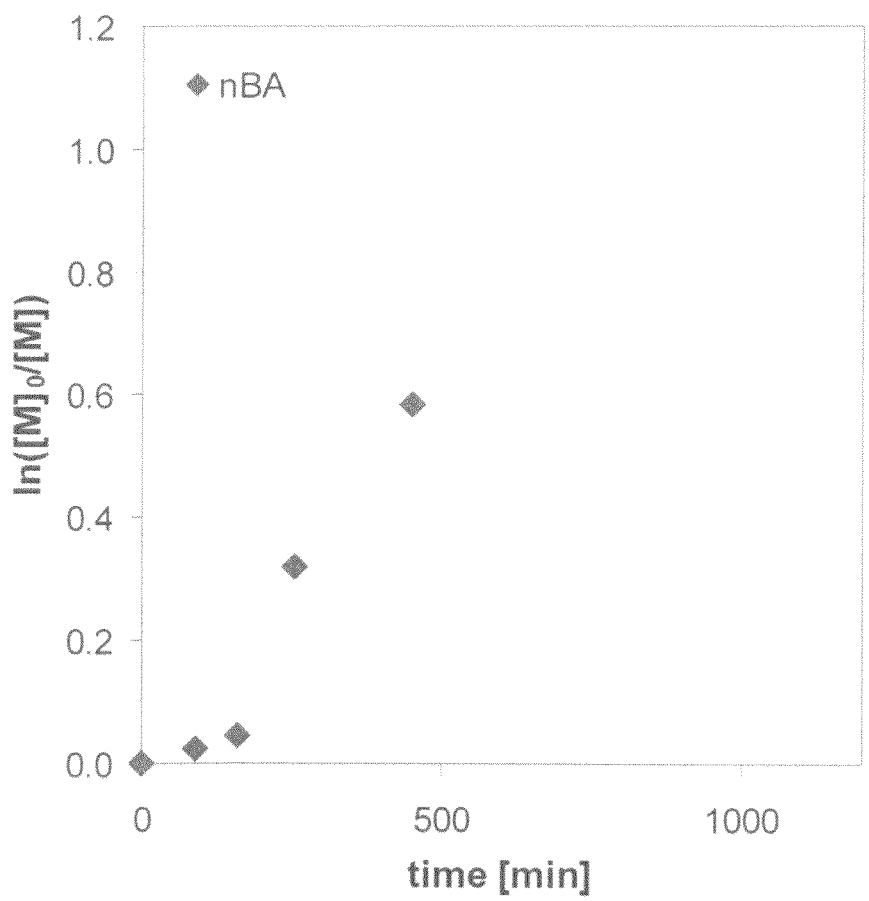
Figure 12:
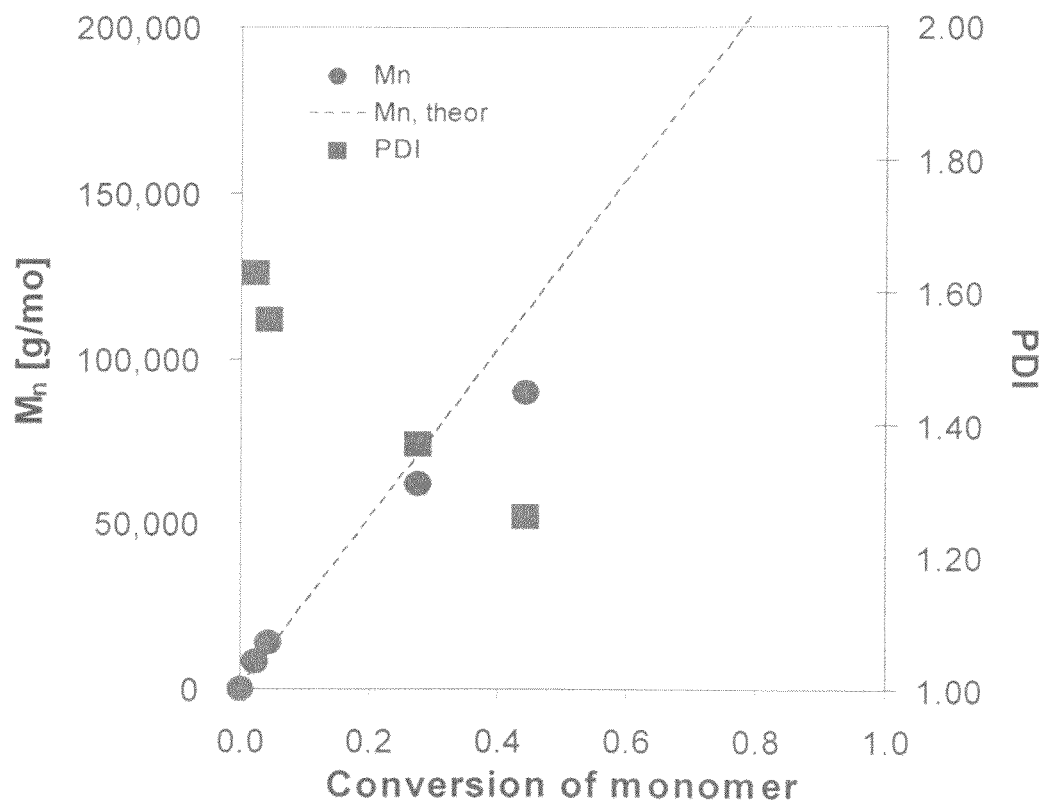
Figure 12:
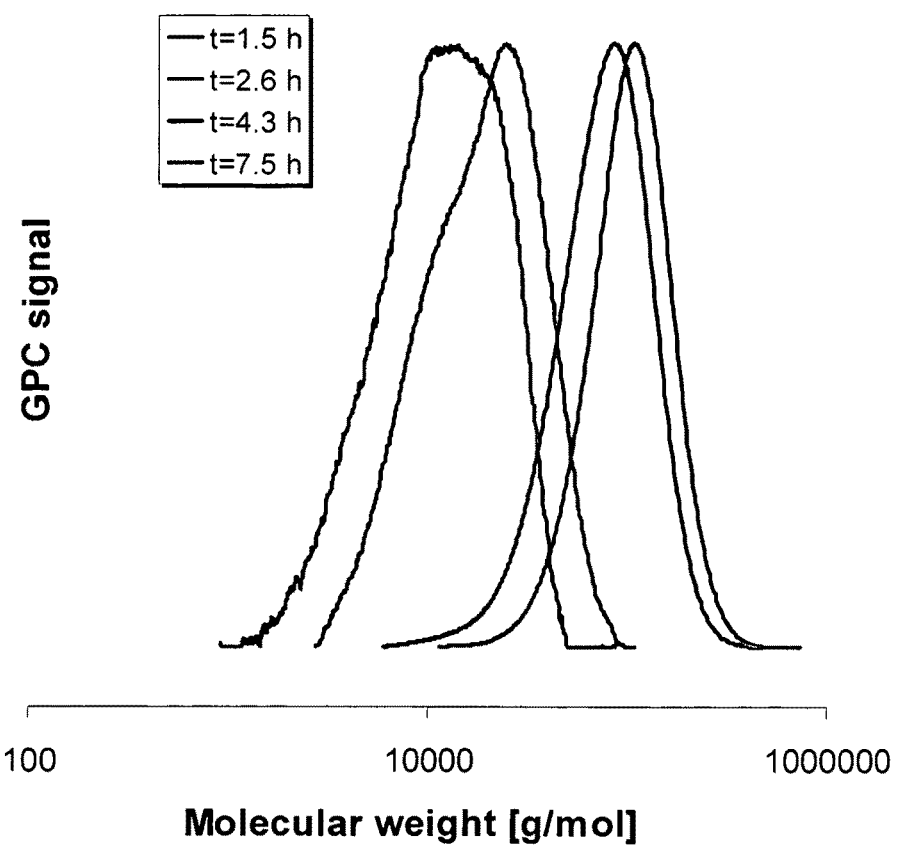
Figure 12:
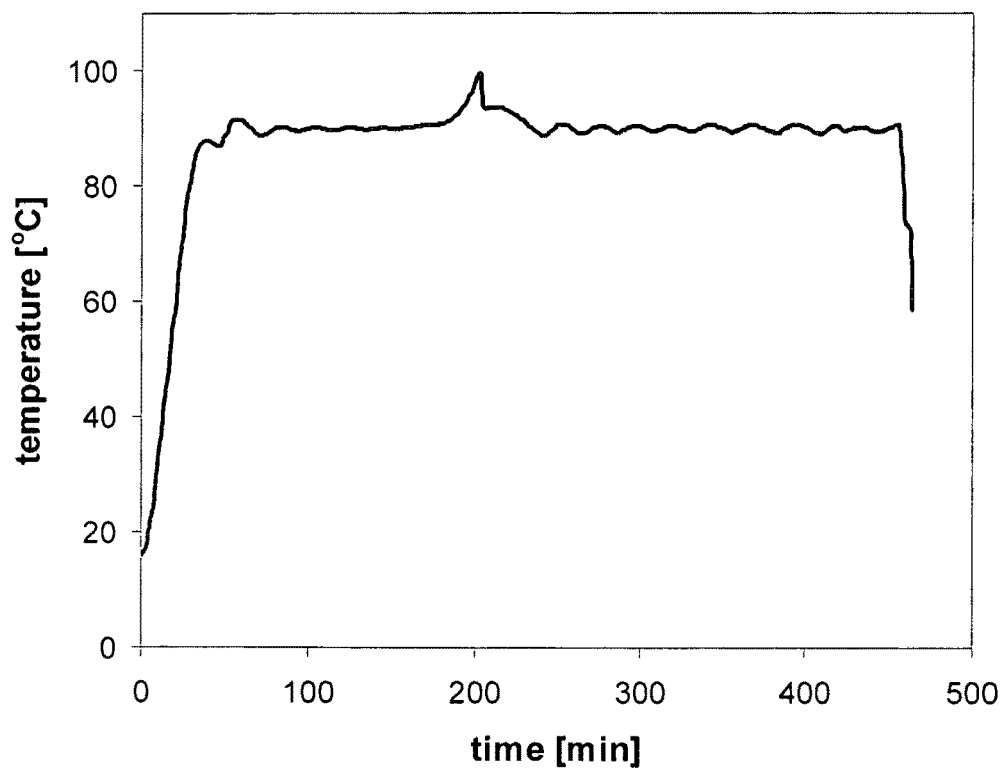

The rate of addition of the AIBN solution of 34.5 mg AIBN in 15 ml of toluene was 2 ml/h, which is equivalent to adding 0.01 eq. AIBN/h compared to the amount of ATRP initiator added. The initial volume of liquid in the reactor was 840 ml. After 3 hour and 10 minutes an exothermic reaction was noted in the temperature profile and addition of AIBN was stopped and cooling water started. Cooling was continued for one minute then stopped. The reaction temperature slowly returned to 90° C. and addition of the AIBN solution was resumed after 4 hours at a reduced rate of 1 ml/h and no further exothermic reaction was observed. The reaction was stopped after 7½ hours. The kinetics of the reaction and GPC results of the experiment are shown in FIG. 12 indicating that the final polymer had a DP of 700 and a M$_{n\,(GPC)}$ 89,900 with a final PDI of 1.26.

The most critical observation was that the temperature of the polymerization was well controlled and in contrast to the results shown in FIG. 1 this reaction was not excessively exothermic as a consequence of the low absolute amount of AIBN added over the initial 3 hour period and when the instantaneous concentration of initiator exceeded the concentration of the formed CuBr$_2$/TPMA catalyst due to termination reactions the resulting exotherm could be readily controlled by stopping addition of initiator. The slower rate of termination at higher conversion resulting from increased viscosity required slower rate of addition of AIBN.

Therefore in this example it was determined that the concept of "starved" feeding of an initiator did provide improved control.

Example 2B

Polymerization of nBA

Polymerization conditions from simulation 37 were taken as a starting point for run 08-006-194 with feeding of V-70 at 70° C. Polymerization was very slow at the beginning (induction period) and after 2 h rate of polymerization significantly increased. Conversion reached 96% after only 4 hours reaction. This fast polymerization process was not well controlled. Although molecular weights were close to theoretical values, PDI was high (>1.7) and did not decrease with conversion. The induction was also clearly visible on every simulation. These results suggest that a significant amount of initiator has to be consumed before there is an increase in the rate of polymerization. Therefore in run 08-006-195 nBA a higher monomer to initiator ratio (DP=1000) was employed. It can be seen from FIG. 13 that control over the polymerization was significantly improved. As in the previous case, the kinetic plot was not linear but molecular weights were close to theoretical values. GPC traces were monomodal and shifting with reaction time. Molecular weight distribution of synthesized polymer decreased during the polymerization from PDI=1.78 to 1.31. The induction period was around 5 h and after this time a strong exothermic effect was observed as shown in FIG. 14. Temperature increased from 70° C. to 110° C. The exothermic effect was controlled by stopping addition of V-70 to the reaction mixture. After stopping the addition, polymerization stopped as well as any further increase of temperature inside of the reactor.

This experiment proves that 'feeding' method is safe for exothermic polymerization reactions. The control of the exothermic effect may be of great importance in terms of safety as well as control over molecular weight, PDI and functionality of final polymer material.

Additional examples for polymerization of nBA also targeted a higher DP and a small amount of V-70 was added at the beginning of polymerization process to reduce induction period. Polymerization of nBA with lower DP was also repeated with higher amount of copper catalyst. In both reactions a well controlled polymerization was observed.

Example 3

Polymerization of Styrene (St)

The polymerization of styrene via the new 'feeding' method for ICAR ATRP was performed using the same strategy as for MMA monomer. Four of the best polymerization conditions were chosen from the computer modeling stage and tested in a 1 liter scale reactor. After preliminary results, detailed in Table 2, were obtained additional experiments were performed with improved conditions.

The parameters which were adjusted are: temperature, targeted DP, feed rate of radical initiator, concentration of reagents, and amount of Cu catalyst.

The polymerization kinetics were followed by measuring the rate of disappearance of monomer by gas chromatography (GC) and/or by nuclear magnetic resonance (NMR). The synthesized polymers will be characterized by gel permeation chromatography (GPC). Successful polymerization of monomer M should result in polymer P(M) with monomodal and narrow molecular weight distribution (PDI <1.4). Molecular weight of the synthesized polymers should be close to theoretical values as predicted from equation 2:

$$M_{n,theo} = ([M]_0/[R-X]_0) \times conversion \times M_{monomer}. \qquad 2$$

Examples for Polymerization of St Using the Proposed Method

The computer model was build and then polymerization simulations were performed for styrene (St). Table 2 presents all of the results for polymerization of St using ICAR ATRP with feeding of AIBN. In experiment WJ-08-008-190 St was polymerized in the presence of DEBMM as initiator with 50 ppm of $CuBr_2$ and excess of TPMA. Polymerization was carried at 100° C. and AIBN was fed at 0.004 eq. vs. DEBMM per hour. Polymerization reached 56% conversion in 10.5 h.

Linear kinetics, were observed and molecular weights were very close to the theoretical values. In this experiment PDI decreased during the reaction time from 1.35 to 1.16. Overall, the process was fully controlled.

In the second reaction, WJ-08-006-192, FIG. 15, a higher addition rate of AIBN was applied in order to accelerate rate of polymerization. In addition, a small amount of AIBN was added at t=0 to the reaction mixture in order to reduce most of Cu(II) to Cu(I) at the beginning stage of polymerization. Polymerization was almost two times faster reaching 81% conversion in 9 hour. The kinetic plot has linear dependence and molecular weights are close to theoretical values. GPC traces are monomodal and are shifting with reaction time. Molecular weight distribution of synthesized polymers decreased during polymerization from 1.39 to 1.15. This data proves that process was fully controlled.

In final reaction reported in Table 2, reaction (WJ-08-006-193), polymerization of St was performed targeting a higher DP. St was polymerized in the presence of DEBMM as initiator with 50 ppm of CuBr2 and excess of TPMA. Polymerization was carried at 100° C. and AIBN was fed at 0.008 eq. vs. DEBMM per hour. FIG. 16 shows kinetic plot for this reaction. After 9 h the addition of AIBN was stopped and heating was turned off. It can be seen from FIG. 16 that the polymerization process stopped immediately after stopping addition of the initiator. The reactor was allowed to cool down overnight (no cooling system applied) and heated again after 21.6 h up to 110° C. At this time feeding of AIBN was restarted with the same addition rate. It can be seen from the kinetic plot, FIG. 17 and molecular weights vs. conversion plot FIG. 16, that this reaction was restarted in fully controlled way.

Due to higher temperature in second phase of the reaction the rate of polymerization was higher. FIG. 16 also shows temperature inside as well as outside of the reactor, thermo-

TABLE 2

Experimental conditions and properties of PSt prepared by ICAR ATRP with feeding of AIBN or thermal initiation.[a]

| Run No. | T [° C.] | St | In | Cu [ppm] | $CuBr_2$ | Ligand | AIBN | AIBN Feeding rate [eq./h] | Time (min) | Conv. (%) | $M_{n,theo}$[b] | $M_{n,GPC}$ | $M_w/M_n$ |
|---|---|---|---|---|---|---|---|---|---|---|---|---|---|
| 08-006-185 (old result) | 120 | 100 | 1 DEBMM | 50 | 0.005 | 0.1 TPMA | 0.0025 | 0 Thermal initiation | 60 | 0.11 | 1100 | 1100 | 1.28 |
|  |  |  |  |  |  |  |  |  | 120 | 0.20 | 2100 | 1700 | 1.27 |
|  |  |  |  |  |  |  |  |  | 240 | 0.36 | 3700 | 2800 | 1.27 |
|  |  |  |  |  |  |  |  |  | 520 | 0.47 | 4900 | 3500 | 1.27 |
|  |  |  |  |  |  |  |  |  | 640 | 0.48 | 5000 | 3600 | 1.27 |
| 08-006-190 | 100 | 100 | 1 DEBMM | 50 | 0.005 | 0.1 TPMA | 0 | 0.004 (3.33 ml/h) | 40 | 0.02 | 200 | 500 | 1.35 |
|  |  |  |  |  |  |  |  |  | 90 | 0.05 | 500 | 900 | 1.28 |
|  |  |  |  |  |  |  |  |  | 180 | 0.12 | 1300 | 1400 | 1.25 |
|  |  |  |  |  |  |  |  |  | 300 | 0.27 | 2800 | 3200 | 1.20 |
|  |  |  |  |  |  |  |  |  | 630 | 0.56 | 5600 | 6100 | 1.16 |
| 08-006-192 | 100 | 100 | 1 DEBMM | 50 | 0.005 | 0.1 TPMA | 0.005 | 0.008 (3.33 ml/h) | 30 | 0.10 | 1000 | 800 | 1.39 |
|  |  |  |  |  |  |  |  |  | 90 | 0.17 | 1700 | 1700 | 1.28 |
|  |  |  |  |  |  |  |  |  | 180 | 0.32 | 3300 | 2700 | 1.23 |
|  |  |  |  |  |  |  |  |  | 300 | 0.49 | 5100 | 4800 | 1.18 |
|  |  |  |  |  |  |  |  |  | 540 | 0.81 | 8400 | 7700 | 1.15 |
| 08-006-193 | 100 | 1000 | 1 DEBMM | 50 | 0.05 | 0.15 TPMA | 0.025 | 0.008 (3.33 ml/h) | 40 | 0.02 | 1600 | 2300 | 1.32 |
|  |  |  |  |  |  |  |  |  | 90 | 0.04 | 4600 | 4700 | 1.19 |
|  |  |  |  |  |  |  |  |  | 200 | 0.10 | 10600 | 9200 | 1.15 |
|  |  |  |  |  |  |  |  |  | 310 | 0.16 | 16600 | 14700 | 1.14 |
|  |  |  |  |  |  |  |  |  | 540 | 0.24 | 24500 | 20100 | 1.12 |
|  |  |  |  |  |  |  |  |  | 1240 | 0.25 | 26400 | 20900 | 1.12 |
|  |  |  |  |  |  |  |  |  | 1300 | 0.26 | 27200 | 23300 | 1.11 |
|  |  |  |  |  |  |  |  |  | 1420 | 0.37 | 38100 | 25200 | 1.15 |
|  |  |  |  |  |  |  |  |  | 1600 | 0.46 | 47500 | 31900 | 1.15 |
|  |  |  |  |  |  |  |  |  | 1840 | 0.57 | 59500 | 37700 | 1.18 |

[a]polymerizations were performed in bulk in 1 L reactor with overall volume of 850 ml and with 5% of DMF as the internal standard;
[b]$M_{n,theo} = ([M]_0/[In]_0) \times$ conversion.

couples were placed inside polymerization mixture and on the outer wall of the reactor. The temperature profile indicates good heat transfer as the difference in temperature from both thermocouples is similar and does not increase at any time during the reaction.

This set of data proves that the new 'feeding' process can be fully automated and that ICAR ATRP with controlled feeding can be successfully applied in synthesis of PSt with low as well high DP's.

Therefore in one embodiment of the invention we disclose how the rate of decomposition of the added free radical initiator is one factor controlling the rate of the CRP and the level of control over the molecular weight, molecular weight distribution and chain end functionality in the formed (co)polymer.

In another embodiment of the invention we disclose that if the temperature of the reaction medium moves above the target temperature and the addition of the initiator/reducing agent is terminated there is no further exotherm and once the temperature drops to the target temperature the feeding of the initiator/reducing agent can be started to reinitiate the polymerization reaction.

Another embodiment of the disclosed process is directed towards continuous control over the concentration of the persistent radical in a NMP. In this embodiment the rate of decomposition of the added initiator is selected to match the rate of radical/radical termination reactions that would otherwise build up the concentration of the stable free radical and reduce the rate of propagation.

A further embodiment of the disclosed process concerns RAFT polymerizations. In a RAFT polymerization the rate of polymerization is controlled by the rate of added initiator. Normally all of the initiator is added to the reaction at the beginning of the reaction and this could lead to an increased rate of initiator decomposition if the temperature of the reaction is not well controlled throughout the polymerization vessel during each stage of the reaction.

In another embodiment of the invention a photoresponsive initiator is employed and the rate of radical generation is controlled by intermittent controlled photo-stimulation.

The invention claimed is:

1. A polymerization process, comprising:
    polymerizing free radically (co)polymerizable monomers in the presence of a reducing agent and a polymerization medium initially comprising:
        at least one transition metal catalyst; and
        an atom transfer radical polymerization initiator; and
    wherein:
        i) the molar ratio of the transition metal catalyst to the atom transfer radical polymerization initiator is less than 0.10; and
        ii) the reducing agent is continuously added to regenerate the at least one transition metal catalyst at a rate commensurate with the rate of radical-radical termination reactions.

2. The polymerization process of claim 1, wherein the reducing agent is a free radical initiator.

3. The polymerization process of claim 2, wherein the free radical initiator comprises 2,2'-azobis(2-methylpropionitrile (AIBN) or 2,2'-azobis(4-methoxy-2,4-dimethyl valeronitrile) (V-70).

4. The polymerization process of claim 2, wherein the rate of addition of the free radical initiator is continuously adjusted to allow the conversion of the (co)polymerizable monomers to polymer to exceed 90%.

5. The polymerization process of claim 2, wherein the rate of addition of the free radical initiator is continuously adjusted to allow the conversion of the (co)polymerizable monomers to polymer to exceed 95%.

6. The polymerization process of claim 2, wherein the rate of addition of the free radical initiator is continuously adjusted to allow the conversion of the (co)polymerizable monomers to polymer to exceed 99%.

7. The polymerization process of claim 2, wherein the rate of addition of the free radical initiator is continuously adjusted to maintain a targeted rate of polymerization.

8. The polymerization process of claim 2, wherein the rate of continuously adding the free radical initiator maintains a targeted temperature of the reaction.

9. The polymerization process of claim 1, wherein the reducing agent reacts with the higher oxidation state transition metal complex of the at least one transition metal catalyst in a non-radical forming, and a non-ATRP initiator, forming reaction.

10. The polymerization process of claim 9, wherein the reducing agent comprises a stable organic molecule including sulfites, bisulfites, thiosulfites, mercaptans, hydroxylamines, amines, hydrazine ($N_2H_4$), phenylhydrazine ($PhNHNH_2$), hydrazones, hydroquinone, food preservatives, flavonoids, beta carotene, vitamin A, α-tocopherols, vitamin E, propyl gallate, octyl gallate, propionic acids, ascorbic acid, sorbates, reducing sugars, sugars comprising an aldehyde group, glucose, lactose, fructose, dextrose, potassium tartrate, nitrites, dextrin, aldehydes, glycine, or antioxidants.

11. The polymerization process of claim 9, wherein the reducing agent reduces the concentration of the higher oxidation state transition metal formed by radical-radical termination reactions to a concentration close to the concentration present in the system after the addition of the immediately previous addition of the reducing agent.

12. The polymerization process of claim 1, wherein the reducing agent is a photoresponsive radical initiator; and
    wherein a fraction of the added photoresponsive radical initiator is periodically decomposed by a pulse of light wherein the intensity and duration of the photo-stimulation is commensurate with the moles of radical-radical termination reactions that occurred since the immediately previous pulse of light.

13. The polymerization process of claim 1, wherein the polymerization is conducted in a bulk polymerization process; is performed in the presence of a solvent; is conducted from solid surfaces; or is conducted in a biphasic polymerization process.

14. The polymerization process of claim 1, wherein the (co)polymerizable monomers comprise styrene, n-butyl acrylate, or methyl methacrylate.

15. The polymerization process of claim 1, wherein the transition metal of the at least one transition metal catalyst comprises copper.

16. The polymerization process of claim 15, wherein the copper is present in an initial amount of 50 ppm.

17. The polymerization process of claim 15, wherein the copper is present in an initial amount of 10 ppm.

18. The polymerization process of claim 15, wherein the at least one transition metal catalyst is $CuBr_2$.

19. The polymerization process of claim 1, wherein the atom transfer radical polymerization initiator comprises diethyl 2-bromo-2-methylmalonate(DEBMM) or 2-bromopropionitrile (BrPN).

20. The polymerization process of claim 1, wherein the polymerization process is conducted at a temperature of 45° C. to 110° C.

* * * * *